(12) United States Patent
DeSantola et al.

(10) Patent No.: US 11,594,049 B2
(45) Date of Patent: Feb. 28, 2023

(54) IMAGE-BASED DRIVE-THRU MANAGEMENT SYSTEM

(71) Applicant: Agot Co., Pittsburgh, PA (US)

(72) Inventors: Evan DeSantola, Pittsburgh, PA (US); Alex Litzenberger, Pittsburgh, PA (US); Rassoul Mesbah, Aukland (NZ); Prashasti Sar, Pittsburgh, PA (US)

(73) Assignee: Agot Co., Pittsburgh, PA (US)

( * ) Notice: Subject to any disclaimer, the term of this patent is extended or adjusted under 35 U.S.C. 154(b) by 0 days.

(21) Appl. No.: 17/542,251

(22) Filed: Dec. 3, 2021

(65) Prior Publication Data

US 2022/0292618 A1 Sep. 15, 2022

Related U.S. Application Data

(60) Provisional application No. 63/160,668, filed on Mar. 12, 2021.

(51) Int. Cl.
*G06V 20/68* (2022.01)
*G06Q 50/12* (2012.01)
(Continued)

(52) U.S. Cl.
CPC .............. *G06V 20/68* (2022.01); *G01B 11/22* (2013.01); *G01S 17/89* (2013.01); *G06F 3/0482* (2013.01);
(Continued)

(58) Field of Classification Search
CPC ...... G06V 20/52; G06V 20/54; G06V 10/443; G06V 10/758; G06V 20/625;
(Continued)

(56) References Cited

U.S. PATENT DOCUMENTS 9,324,070 B1 4/2016 Bekmann et al.
10,009,780 B2 6/2018 Awiszus
(Continued)

FOREIGN PATENT DOCUMENTS

CA 2851688 A1 11/2014
EP 2055146 B1 11/2013

OTHER PUBLICATIONS

Adenilma da Silva Farias et al. "Food Safety Conditions in Home-Kitchens: A Cross-Sectional Study in the Federal District/Brazil"; International Journal of Environmental Research and Public Health; Jul. 7, 2020, 12 pages.
(Continued)

*Primary Examiner* — Masum Billah
(74) *Attorney, Agent, or Firm* — Lowenstein Sandler LLP

(57) ABSTRACT

The subject matter of this specification can be implemented in, among other things, methods, systems, computer-readable storage medium. A method can include receiving, by a processing device, image data including one or more image frames indicative of a current state of a drive-thru area. The processing device determines a vehicle disposed within the drive-thru area based on the image data. The processing device receives order data with a pending meal order. The processing device determines a first association between the vehicle and the pending meal order based on the image data. The processing devices determine a meal delivery procedure associated with the based on the association between the vehicle and the pending meal order. The processing device performs may perform the meal delivery procedure. The processing device may provide the meal delivery procedure for display on a graphical user interface (GUI).

19 Claims, 18 Drawing Sheets

(51) Int. Cl.

| | | |
|---|---|---|
| G06V 10/764 | (2022.01) | |
| G06V 20/00 | (2022.01) | |
| G06T 7/70 | (2017.01) | |
| G06V 20/52 | (2022.01) | |
| G06Q 10/0631 | (2023.01) | |
| G06V 10/70 | (2022.01) | |
| G06T 7/20 | (2017.01) | |
| H04N 5/247 | (2006.01) | |
| H04N 7/18 | (2006.01) | |
| G06N 20/00 | (2019.01) | |
| G06V 20/20 | (2022.01) | |
| G06V 20/64 | (2022.01) | |
| G06F 3/0482 | (2013.01) | |
| G06K 9/62 | (2022.01) | |
| G06T 7/11 | (2017.01) | |
| G01B 11/22 | (2006.01) | |
| G01S 17/89 | (2020.01) | |
| G06Q 20/20 | (2012.01) | |

(52) U.S. Cl.
CPC .......... *G06K 9/6256* (2013.01); *G06N 20/00* (2019.01); *G06Q 10/063112* (2013.01); *G06Q 20/20* (2013.01); *G06Q 50/12* (2013.01); *G06T 7/11* (2017.01); *G06T 7/20* (2013.01); *G06T 7/70* (2017.01); *G06V 10/70* (2022.01); *G06V 10/765* (2022.01); *G06V 20/20* (2022.01); *G06V 20/36* (2022.01); *G06V 20/52* (2022.01); *G06V 20/64* (2022.01); *H04N 5/247* (2013.01); *H04N 7/18* (2013.01); *G06T 2200/24* (2013.01); *G06T 2207/10028* (2013.01); *G06T 2207/20081* (2013.01); *G06T 2207/30232* (2013.01); *G06V 2201/08* (2022.01)

(58) Field of Classification Search
CPC ...... G06V 40/172; G06V 10/10; G06V 20/62; G06V 2201/08; G06Q 50/12; G06Q 10/087; G06Q 10/04; G06Q 20/203; G06Q 30/06; G06Q 10/06312; G06Q 10/06315; G06Q 10/02; G06Q 10/10; G06Q 30/0635
USPC .......................................................... 705/15
See application file for complete search history.

(56) References Cited

U.S. PATENT DOCUMENTS

| | | |
|---|---|---|
| 10,140,602 B2 | 11/2018 | Kelly et al. |
| 10,185,928 B2 | 1/2019 | Quezada |
| 10,252,419 B2 | 4/2019 | Fritz et al. |
| 10,289,989 B2 | 5/2019 | Kelly et al. |
| 10,304,147 B2 | 5/2019 | Kelly et al. |
| 10,387,945 B2 | 8/2019 | Burry et al. |
| 10,467,559 B1 | 11/2019 | Svenson et al. |
| 10,600,041 B2 | 3/2020 | Kelly et al. |
| 10,860,995 B2 | 12/2020 | Kelly et al. |
| 11,200,575 B2 | 12/2021 | Seo et al. |
| 11,228,700 B2 | 1/2022 | Rajhansa et al. |
| 11,285,878 B2 | 3/2022 | Sigle |
| 11,345,040 B2 | 5/2022 | Oleynik |
| 2006/0213904 A1 | 9/2006 | Kates |
| 2007/0150371 A1 | 6/2007 | Gangji |
| 2008/0178749 A1 | 7/2008 | Stutman |
| 2010/0274633 A1 | 10/2010 | Scribano et al. |
| 2011/0075192 A1 | 3/2011 | Kumamoto |
| 2015/0086179 A1 | 3/2015 | Hurst et al. |
| 2015/0088594 A1 | 3/2015 | Hurst et al. |
| 2015/0220935 A1 | 8/2015 | Iwai |
| 2015/0228062 A1 | 8/2015 | Joshi et al. |
| 2015/0356668 A1 | 12/2015 | L'Heureux et al. |
| 2016/0180381 A1 | 6/2016 | Kaiser et al. |
| 2017/0221296 A1 | 8/2017 | Jain et al. |
| 2017/0323370 A1* | 11/2017 | Burry ................ H04N 7/181 |
| 2018/0196403 A1 | 7/2018 | Lagares-Greenblatt et al. |
| 2018/0324908 A1 | 11/2018 | Denker et al. |
| 2019/0291277 A1 | 9/2019 | Oleynik |
| 2020/0019861 A1 | 1/2020 | Jeong |
| 2020/0043156 A1 | 2/2020 | Fox |
| 2020/0159750 A1 | 5/2020 | Shadrokh et al. |
| 2020/0175564 A1 | 6/2020 | Kulasooriya |
| 2020/0175673 A1 | 6/2020 | Wen et al. |
| 2020/0202462 A1* | 6/2020 | Muyskens ............ G06V 20/52 |
| 2020/0249660 A1 | 8/2020 | Rao et al. |
| 2020/0028619 A1 | 9/2020 | Roy |
| 2020/0286192 A1 | 9/2020 | Roy et al. |
| 2020/0294018 A1 | 9/2020 | Wolter |
| 2020/0334628 A1 | 10/2020 | Goldberg et al. |
| 2020/0351557 A1 | 11/2020 | Drake |
| 2020/0363778 A1 | 11/2020 | Mahapatra |
| 2021/0022559 A1 | 1/2021 | Zito et al. |
| 2021/0027485 A1 | 1/2021 | Zhang |
| 2021/0192329 A1 | 6/2021 | Shin et al. |
| 2021/0248637 A1 | 8/2021 | Ramos et al. |
| 2021/0251263 A1 | 8/2021 | Knightson et al. |
| 2021/0366033 A1 | 11/2021 | Yamamoto et al. |
| 2021/0374430 A1 | 12/2021 | Siemer et al. |
| 2021/0383302 A1 | 12/2021 | Covell et al. |
| 2022/0012801 A1 | 1/2022 | Maddalo et al. |

OTHER PUBLICATIONS

Zaric, N. et al. "Design of a Kitchen-Monitoring and Decision-Making System to Support AAL Applications"; Sensors Jun. 29, 2021, 27 pages.

* cited by examiner

IMAGE-BASED DRIVE-THRU MANAGEMENT SYSTEM

RELATED APPLICATIONS

The present application claims the benefit under 35 U.S.C. § 119(e) of U.S. Provisional Patent Application No. 63/160,668 filed Mar. 12, 2021, which is incorporated by reference herein. This application is also related to U.S. patent application Ser. No. 17/499,795 filed Oct. 12, 2021, entitled "Image-Based Kitchen Tracking System with Order Accuracy Management," and is also related to U.S. patent application Ser. No. 17/499,797 filed Oct. 12, 2021, entitled "Image-Based Kitchen Tracking System with Anticipatory Preparation Management," and is also related to U.S. patent application Ser. No. 17/690,537 filed Mar. 9, 2022, entitled "Image-Based Kitchen Tracking System with Dynamic Labeling Management" and is also related to U.S. patent application Ser. No. 17/690,539 filed Mar. 9, 2022, entitled "Image-Based Kitchen Tracking System with Metric Management and Kitchen Display System (KDS) Integration."

TECHNICAL FIELD

The instant specification generally relates to monitoring a kitchen and/or drive-thru of a restaurant. More specifically, the instant specification relates to using image acquisition, data processing, and machine learning to produce a representation of the state of the restaurant and to manage order accuracy based on the state of the restaurant.

BACKGROUND

Restaurants, or eateries, are businesses that prepare and serve meals (e.g., food and/or drinks) to customers. Meals can be served and eaten on-site of a restaurant, however some restaurants offer a take-out (e.g., such as by implementing a drive-thru) and/or food delivery services. Restaurant food preparation can involve developing systems for taking orders, cooking, and/or serving a collection of items typically organized on a menu. Some food preparation systems involve preparing some ingredients in advance (e.g., cooking sauces and/or chopping vegetables), and completing the final steps when a customer orders an item (e.g., assembly of an order). Menu items are often associated with a series of preparation steps that involve ingredients and actions to be performed in association with those ingredients (e.g., cook a hamburger or apply salt to the French fries). Food preparation systems can depend on knowing precisely how long it takes to prepare each menu item and planning tasks so that the menu items are prepared efficiently and accurately.

SUMMARY

In some embodiments, a method includes receiving, by a processing device, image data including one or more image frames indicative of a current state of a drive-thru area. The processing device determines a vehicle disposed within the drive-thru area based on the image data. The processing device receives order data with a pending meal order. The processing device determines a first association between the vehicle and the pending meal order based on the image data. The processing devices determine a meal delivery procedure associated with the based on the association between the vehicle and the pending meal order. The processing device performs may perform the meal delivery procedure. The processing device may provide the meal delivery procedure for display on a graphical user interface (GUI).

In some embodiments, a system can include a first camera. The first camera captures first image data. The first image data may include one or more image frames with a first field of view of a drive-thru area. The one or more image frames may indicate a current state of the drive-thru area. The system may further include a memory and a processing device coupled to the memory. The processing device may be designed to receive the first image data from the first camera. The processing device may determine a vehicle disposed within the drive-thru area based on the first image data. The processing device may receive order data indicative of a pending meal order. The processing device may determine a first association between the vehicle and the pending meal order based on the first image data. The processing device may determine a meal delivery procedure associated with the vehicle based on the first association. The processing device may cause performance of the meal delivery procedure. The processing device may provide the meal delivery procedure for display on a graphical user interface (GUI).

In some embodiments, a non-transitory machine-readable storage medium include instructions that. The instructions, when executed by the processing device may cause the processing device to perform operations that include receiving the first image data from the first camera. The processing device may determine a vehicle disposed within the drive-thru area based on the first image data. The processing device may receive order data indicative of a pending meal order. The processing device may determine a first association between the vehicle and the pending meal order based on the first image data. The processing device may determine a meal delivery procedure associated with the vehicle based on the first association. The processing device may cause performance of the meal delivery procedure. The processing device may provide the meal delivery procedure for display on a graphical user interface (GUI).

BRIEF DESCRIPTION OF THE DRAWINGS

Aspects and implementations of the present disclosure will be understood more fully from the detailed description given below and from the accompanying drawings, which are intended to illustrate aspects and implementations by way of example and not limitation.

DETAILED DESCRIPTION

Figure 1:
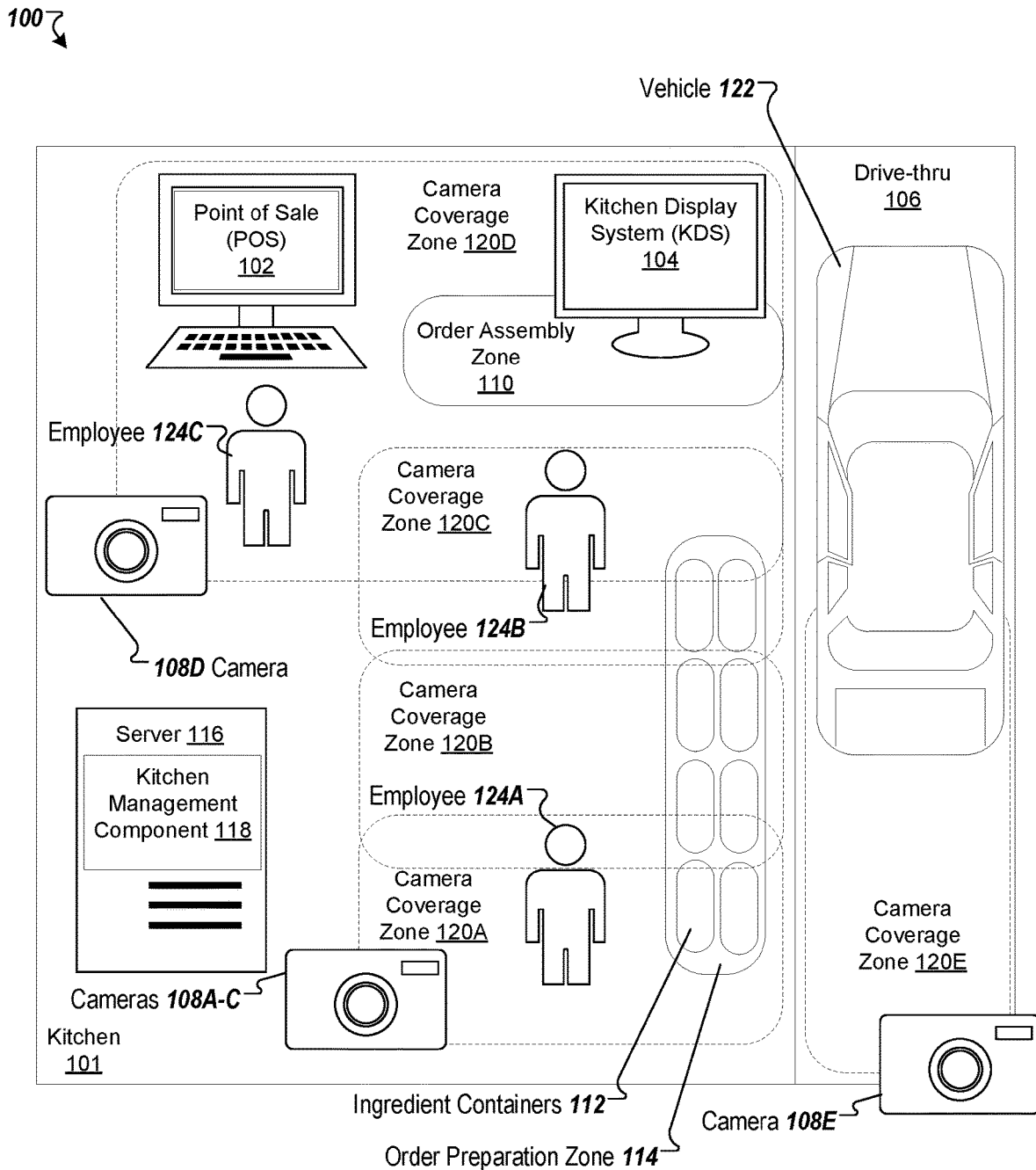
FIG. 1 depicts an image-based kitchen tracking system, in which implementations of the disclosure may operate.

The growing digitization of live operation data in restaurants has led to increased tracking, analysis, and prediction of future data (e.g., future sales data). The increasing digitization of restaurant data has led to an increasing use of digital point of sale (POS) systems, where data is digitized and processed for sales analysis. Conventional POS systems often track orders as they come in and communicate to a display (e.g., a kitchen display system (KDS)) order data (e.g., a queue of upcoming orders) and can communicate with a kitchen interface (e.g., a "bump bar") to receive inputs from users (e.g., employees, chefs, etc.) to update the order data (e.g., advance order queue, delete and order, mark as completed and/or partially completed, etc.).

Advancements in digital technology like POS systems have further increased the efficiency of restaurant preparations operations. However, even in the presence of digital technology, like POS systems, restaurants run the risk of delivering inaccurate orders (e.g., incorrect and/or incomplete orders), late orders, and/or otherwise deficient orders. The deficient orders may be caused by various rationale, for example, employee mistakes when preparing an order, lack of inventory for a given menu item, delays in preparing ingredients used for a given menu item, and/or the like. Identifying the reasons for erroneous orders can be time consuming and inefficient. However, if left uncorrected, orders may continue to be prepared incorrectly, which can lead to customer dissatisfaction. Restaurants often take remedial action (e.g., complimentary items, refunds, remaking menu items, etc.) responsive to deficient orders; however, these actions come at a cost to the restaurant. Additionally, there may exist other restaurant procedures that can be updated and/or improved that may result in increased order accuracy and/or efficiency. However, identifying these updates and/or improvements can be difficult and costly.

Other common deficiencies and/or difficulties in carrying out restaurant operations involve a drive-thru area. Restaurant drive-thru areas may include a queue system including one or more driving lanes that direct a series of vehicles through various stages (e.g., order zones, payment zones, meal pickup zones, e.g.) of a meal preparation and delivery process. Common challenges of conventional drive-thru systems and methodologies includes efficiently and accurately filling meal orders to vehicles in the drive thru area. For example, some orders may slow down the meal preparation and delivery process by taking an above average amount of time to prepare and deliver the order (e.g., leaving quickly filled orders to wait upon vehicles associated with slower, longer to fill orders). In some cases, a drive-thru area employ multiple routes through a drive-thru area (e.g., multiple order kiosks to acquire pending meal orders). A drive-thru area may incorporate merging of lanes that can lead to vehicles arriving at payment and/or meal delivery areas in a different order than expected (e.g., different order from the order in which pending meal orders are received). The variable order of vehicles may lead to some customers paying for incorrect meals and/or receiving incorrect meals. Additionally, customers may be required to verify or otherwise declare order association at a payment area and/or meal delivery area which can take time and be a negative experience (e.g., annoyance to customers having to verify order associations).

Aspects and implementations of the present disclosure address these and other shortcomings of the existing technology by providing methods and systems for monitoring a state of a kitchen and/or drive-thru of a restaurant. The present disclosure includes cameras designed to capture images of the kitchen disposed throughout a food preparation area, ordering area, order payment area and/or order delivery area (e.g., a drive-thru). The cameras are configured to acquire image-based data of the restaurant in one or more of the various areas previously described. The image data received from the cameras can be processed (e.g., in a distributed fashion) through models (e.g., machine learning models) associated with one or more of performing object detection, action recognition, tracking, volumetric estimation, and/or geometric methods.

The results from the processing models can be post processed into various useful data points such as, for example, action times (e.g., what time was chicken added to a taco), durations (e.g., how long was the chicken being breaded), locations (e.g., which preparation station), meal assembly tracking (i.e., understanding what is in what meal at a given time), and bin fill levels. These data points can be consumed by individual applications or subsystems, which may combine multiple types of data points (e.g., action times and locations). For example, an order accuracy subsystem may consume meal assembly tracking data points, while a drive-thru management subsystem may consume data regarding what is currently available in the kitchen, what is being actively prepped, the number of cars in the drive-thru line, and data about average preparation times.

The outputs based on process of the image data can be assumed to assist in one or more drive-thru operations. For example, the processed image data may be leveraged to identify vehicles in image(s), track vehicles across frames, associate pending meal orders with the vehicles, track proximity of vehicles to a meal payment zone and/or a meal delivery zones and compare the proximity to meal readiness of an associated order. Processed image frames may indicate relative locations of cameras disposed within a drive thru area and relative position of vehicles within the drive-thru area. In other examples, the processed image data may be consumed to determine a routing of vehicles to particular lanes and/or waiting bays based on order readiness, vehicles tracking and order associated in single and multi-lane scenarios, and in lanes state adjustment scenarios (e.g., merging and/or splitting of lanes and the like).

The outputs based on processing of the image data can be consumed in a number of ways to assist with live correction of order accuracy. In an exemplary embodiment, a processing system can consume outputs using an order accuracy tool that is designed to improve accuracy of orders. In some embodiments, the outputs may be used to determine inaccurate ingredients, missing order items, incorrect packaging, and incorrect numbers of items, incorrect quantity of items, and the like.

In an exemplary embodiment, the outputs may be consumed by an anticipatory prep system that is designed to provide indications regarding which ingredients should be prepared and when. For example, a state of the kitchen such as inventory analysis (e.g., to determine whether a restaurant is running low on a prepared ingredient) may be performed and compared against a current and/or predicted volume of orders coming in.

In an exemplary embodiment, a drive-thru routing tool that coordinates routing of vehicles in a drive-thru may consume the one or more outputs of one or more trained ML models. For example, the drive-thru routing tool may consume data associated with the state of items currently available in the kitchen. The system may prompt an employee to direct a car to a waiting bay or alternate route for delivery of an order.

In an exemplary embodiment, a gamification tool may consume an output of processing the image data. Conventional tracking of employee metrics is limited to drive-thru throughput. However, more detailed and targeted metrics can be obtained from the processed image-data to promote efficiency and order accuracy through incentives or remedial action. This targeted data can allow for targeted improvement at a cheaper cost than that of a full-scale incentive and/or remedial action program.

Aspects of the present disclosure provide various technological advantages and improvements over conventional systems. As previously outlined, the kitchen management system can structure kitchen operation video into data that is consumable by a number of applications. Additionally, a drive-thru management system may structure drive-thru video into data that is consumable by a number of applications. These may be the same or different applications from those that consume the information on the kitchen operation. This data can be presented to employees to improve the efficiency of the restaurant and improve metrics such as order accuracy, preparation speed, mean drive-thru time, drive-thru wait time, and the like. For in-store interactive solutions, data can be presented to in-store employees through the existing Kitchen Display System (KDS). Targeted corrections and/or improvement may increase the efficiency of a restaurant as well as provide additional details that can be used for post-mortem analysis for larger restaurant operational decisions and changes. The system further can provide live corrections to prevent erroneous orders from being filled.

FIG. 1 depicts a kitchen tracking system 100, in which implementations of the disclosure may operate. As shown in FIG. 1, the kitchen tracking system 100 may be associated with a kitchen 101 and/or a drive-thru 106. The kitchen 101 may include an order preparation zone 114 where food and/or drinks are prepared. For example, the order preparation zone 114 may include food preparation equipment such as ovens, mixers, ingredient containers 112, and the like. The food and/or drinks can be associated with an order that includes a collection of food and/or drinks to be prepared. The kitchen may include an order assembly zone 110 where orders are to be assembled. In some embodiments, the order assembly zone 110 is designed to assemble prepared food and/or drinks that was prepared at the order preparation zone 114.

The kitchen tracking system may include one or more cameras 108A-E capable of capturing images of the kitchen 101 and/or drive-thru 106. The cameras 108A-E may be associated with camera coverage zones 120A-E within the kitchen 101 and/or drive-thru 106. The cameras 108A-E may include video cameras. For example, the cameras 108A-E may include closed-circuit televisions (CCTV) cameras. In some embodiments, one or more of the cameras may include depth sensors such as using a light detection and ranging (LIDAR) camera.

One or more of the cameras 108A-E may be disposed overhead to capture images of the kitchen from a downward looking perspective. One or more of the cameras 108A-E may capture images associated with the state of the kitchen. For example, the cameras may capture employees 124A-C performing food preparation, assembly, and/or delivery functions. In some embodiments, the cameras 108A-E may be associated with camera coverage zones 120A-E. In some embodiments, at least some of the camera coverage zones 120A-E overlap.

As shown in FIG. 1, the kitchen tracking system 100 may include a point of sale (POS) system 102. The POS system 102 may include one or more devices that carry out day-to-day restaurant operations and functionality. For example, the POS system 102 may include an order input device such as a computer and/or register used to enter data associated with upcoming orders. In some embodiments, the POS system 102 includes information associated with each of the menu items. For example, POS system 102 may include ingredient lists, preparation and assembly instructions, prices, meal delivery instructions and the like for one or more menu items.

As shown in FIG. 1, the kitchen tracking system 100 may include a kitchen display system (KDS) 104. The kitchen display system 104 may be integrated with or otherwise communicate with POS system 102. The KDS 104 can be designed to display kitchen data such as upcoming order, status of currently/partially prepared orders, meal delivery instructions and/or other kitchen data received from the POS system 102 and/or the kitchen management component 118. In some embodiments, multiple KDS's 104 are used. For example, a KDS 104 may be assigned to a given food preparation station and may display data indicative of order statuses and/or preparation steps associated with a given food preparation stations. For example, the KDS 104 may be associated with an order assembly station and/or display data indicative of what packaging should be used to assemble the order.

In some embodiments, the KDS 104 may display which order/meal items to delivery to a driver at a window of the drive-thru. As will be discussed later, a drive-thru area may include multiple lanes and order kiosks and may be processing multiple order simultaneously. The KDS 104 may provide clarity to an employ which order is associated with the vehicle currently in a meal delivery zone.

As shown in FIG. 1, the kitchen tracking system 100 may include a server 116 with a kitchen management component 118. The kitchen server may receive image-based data from one or more of cameras 108A-E associated with the state of the kitchen. The kitchen management component 118 may include instructions that cause a processor to perform image-processing methodology, as described herein.

In some embodiments, the kitchen management component 118 can perform one or more order accuracy functions. The kitchen management component 118 may receive image data associated with upcoming orders and order data from the POS system 102. The kitchen management component 118 may process the image data to determine inaccuracies in the order preparation. For example, inaccuracies can include inaccurate ingredients (e.g., missing an ingredient or too much or too little of an ingredient), incorrect item (e.g., incorrect drink), inaccurate packaging (e.g., used a packaging for a menu item when a second menu item packaging should be used), incorrect number of items (e.g., five pieces of chicken when an order calls for four pieces of chicken), missing miscellaneous item (e.g., missing sauce packets, utensils, etc.), incorrect quantity of an item (e.g., too little or too much special sauce), and/or missing or incorrect sets of items in a completed order (e.g., missing or incorrect items in a combination menu item).

In some embodiments, the kitchen management component 118 may determine and/or detect inaccuracies in order preparation and alert one or more employees 124A-C through an auditory and/or visual indicator. For example the kitchen management component 118 may send data indicative of the error to the KDS 104 to be displayed to employees 124A-C.

The employees 124A-C can check the flagged instance of order inaccuracy and/or improper use of the kitchen tracking system 100 and either rectify the inaccuracy or otherwise indicate (e.g., using an input on the KDS 104) that the determined order inaccuracy was incorrect. In the case in which there is no inaccuracy, either on the part of the system or in the preparation, no intervention is made and the meal preparation process proceeds as it would in the absence of the flagged error. In the case of a kitchen management component 118 inaccuracy, the data from the instance of detected inaccuracy may then be used to further train the kitchen management component 118 and associated data processing models. For example, the kitchen management component 118 may perform functionality that includes creating labels that can be used to retrain the system to further improve the kitchen management component's 118 accuracy. In another example, the kitchen management component 118 may generate tags for new food items or limited time offers that the kitchen management component 118 has now seen before.

In the case of an order inaccuracy being correctly determined, the KDS 104 can provide further information associated with rectifying the order accuracy. For example, the KDS 104 may display the changes needed (or course of action to be taken) in order to rectify the mistake or a list of possible alternatives from the POS associated with the menu item that was made incorrectly. In some embodiments, an intervention can be made to preempt any potential order inaccuracy. For example, an intervention can be applied before an incorrectly scooped ingredient is placed on a meal, potentially saving the ingredient and meal from being wasted and/or having to be remade.

In some embodiments, the kitchen management component 118 can perform one or more anticipatory preparation functions. For example, the kitchen management may indicate (e.g., through the KDS 104) to the employees 124A-C which items the system anticipates should be prepared and when. The kitchen management component 118 may include one or more models, as will be discussed later, that process image data received from cameras 108A-E to determine factors indicative of future preparation times (e.g., state of the kitchen, customer ingress (e.g., vehicles 122 in drive-thru and customers in line to order), delivery drivers available or soon to be available, and other factors indicative of the states of the kitchen.

In some embodiments, as mentioned previously, one or more cameras include LIDAR cameras capable of acquiring depth data. The kitchen management component 118 can receive image-depth including depth data and recognize and distinguish between different dishes and/or meal items in a restaurant. In some embodiments, the kitchen management component 118 can determine how much product is left in a given container 112. In some embodiments, the kitchen management component can track how long a product has been in the container 112. In some embodiments, the kitchen management component 118 can track when containers are replaced and/or relocated and determine when new inventory needs to be prepared.

In some embodiments, the kitchen management component 118 can perform one or more drive-thru management functions. In one embodiment, a separate drive-thru tracking system receives image data (e.g., frames of videos) from one or more cameras that are external to the restaurant and directed at a drive-thru 106, parking lot, surrounding streets, etc. and processes the image data to determine information about vehicles in the drive-thru. The drive-thru tracking system may be a sub-component of the kitchen tracking system or a separate system that interfaces with the kitchen tracking system in embodiments.

As shown in FIG. 1, one or more cameras (e.g., camera 108C) may include a camera coverage zone 120C associated with the drive-thru 106. The kitchen management component 118 may combine data indicative of the state of the kitchen 101, as previously described, with data indicative of the drive-thru (e.g., vehicle 122 ingress, current wait times, etc.). The data indicative of a state of the drive-thru may be received by the kitchen management component 118 from a drive-thru tracking system in embodiments. The kitchen management component 118 may determine how to route vehicles (e.g., to most efficiently service each order). One or more alternative drive-thru routes may be used, such as a waiting bay for vehicles associated with orders that are determined to be filled after a wait time that is above a threshold wait time or an alternate lane for multi-lane drive-thrus. For example, the kitchen management component may determine that a first meal item (e.g., French fries) are low in stock and will need extra time to prepare. This increased wait time may be flagged by the kitchen management component (e.g., through the KDS 104) and an employee may instruct a vehicle to a waiting bay which may allow a queue of vehicles to continue while the vehicle is in the waiting bay until the associated order is filled. The vehicle may be identified, associated with an order (e.g., the order that includes the first meal item), and tracked by the drive-thru tracking system as discussed in greater detail below. Some restaurants that use a single food delivery window for the drive-thru may make use of a waiting bay and/or parking spot designed as an alternate delivery method for longer orders.

In some embodiments, the kitchen management component 118 can perform one or more kitchen gamification functions. The kitchen management component 118 may process image data from cameras 104A-C to evaluate and determine metrics associated with the state of the kitchen. For example, the kitchen management component 118 can determine preparation times for various meal items, preparation times for a given preparation station, order fill times, ingredient preparation times, and so on. The image data can be processed to determine more granular metrics that can be used as a form of gamification and/or incentive system. The system can evaluate various granular efficiencies for a myriad of kitchen tasks and/or responsibilities (e.g., time to prepare a meal item, time to take an order, time to deliver orders, accuracy of order preparation, amount of waste attributed to an employee, and so on). The kitchen management component 118 may use a scoring system that evaluates individual employees, shifts, menu items, ingredient preparation, and the like.

As noted in some embodiments, the outputs generated based on processing the image data by the kitchen management component 118 may be consumed and/or utilized in a live environment such as to correct orders and inaccuracies as they arise. In other embodiments, the kitchen management component 118 may process images to generate data to be consumed post-mortem or after the system has run for a period of time. For example, analytics data on drive-thru queue time may be evaluated. In another example, analytics data on average pacing of employees per shift for specific actions (e.g., pacing chicken preparation) may be evaluated. Such data can be used in time-sliceable aggregate analytics (e.g., how long did employees spend prepping dough on Monday between 9 am and 11 am). Pacing and accuracy data may be used to improve throughput, employee accountability, and operational efficiency.

Figure 2:
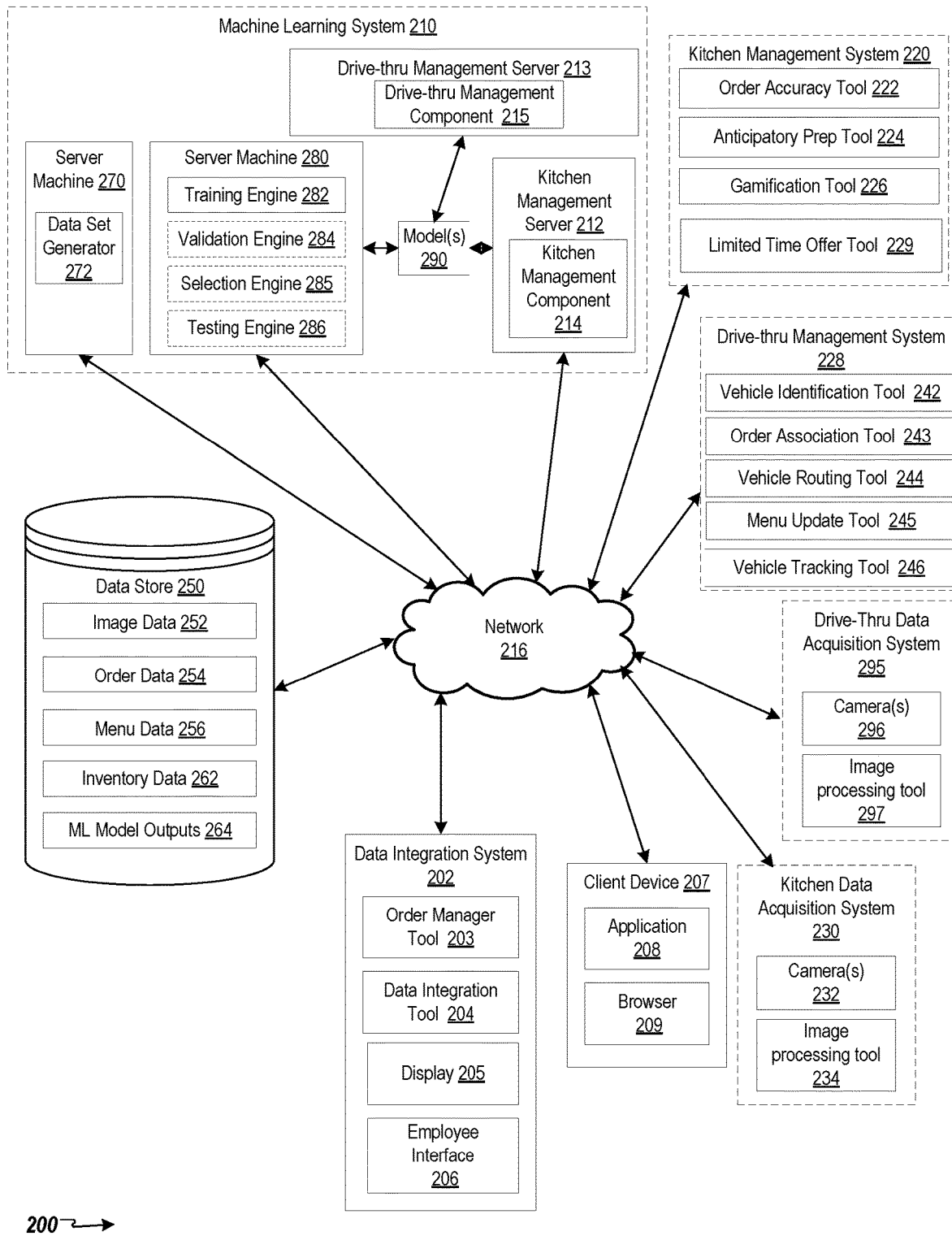
FIG. 2 is a block diagram illustrating an exemplary data acquisition system architecture in which implementations of the disclosure may operate.

FIG. 2 is a block diagram illustrating an exemplary system architecture of system 200, according to certain embodiments. The system 200 includes a data integration system 202, a client device 207, a kitchen management system 220, a kitchen data acquisition system 230, a kitchen management server 212, a drive-thru management server 213, a drive-thru data acquisition system 295, a drive-thru management system 228, and a data store 250. The kitchen management server 212 and/or drive-thru management server 213 may be part of a machine learning system 210 (or may be parts of separate machine learning systems). Kitchen management server 212 may correspond to server 116 of FIG. 1 in embodiments. The machine learning system 210 may further include server machines 270 and 280.

The kitchen data acquisition system 230 may include one or more data acquisition devices, such as camera(s) 232. The one or more camera(s) 232 may include closed-circuit television (CCTV) cameras, light detect and ranging (LIDAR) enabled cameras, and/or other image acquisition devices. The cameras may be disposed through a kitchen preparation area, a customer ordering area, and/or an order delivery area (e.g., a drive-thru). The camera may provide a continuous stream of images associated with food preparation and delivery. The cameras may be disposed in an orientation and/or configuration to overlap image acquisition areas. For example, a first image capture area of a first camera may also be partially captured by a second camera. The data may be spliced and/or further processed and analyzed together, as will be discussed in other embodiments. The image-processing tool 234 may include processing logic that receives image based data acquired by the camera(s) 232 and performs a feature extraction to identify features (e.g., inventory data, recipe data, current order performance, etc.) associated with the state of the kitchen. As will be discussed in more detail below, the image-processing tool 234 may employ one or more machine learning models (e.g., using machine learning system 210) to perform the feature extraction.

The drive thru data acquisition system 295 may include one or more data acquisition devices, such as camera(s) 296. The one or more camera(s) 232 may include closed-circuit television (CCTV) cameras, light detect and ranging (LIDAR) enabled cameras, and/or other image acquisition devices. The cameras may be disposed within a various portions of a drive-thru such as an order placement area, an order payment area, and/or meal delivery area. The camera may provide a continuous stream of images associated with states of the various drive-thru area (e.g., location of vehicles, quantity of vehicles, vehicles movement within the drive-thru area, etc.). The cameras may be disposed in an orientation and/or configuration to overlap image acquisition areas. The data integration system 202 includes one or more of a server, client devices, and/or data stores housing operational data and/or processing instructions associated with a restaurant's operations (e.g., a restaurant's operations system (e.g., a point of sale (POS) system 102 of FIG. 1) server. The data integration system 202 may include an order manager tool 203 that manages a menu and collection of upcoming orders. In some embodiments, the order manager tool 203 maintains data associated with upcoming orders (e.g., a list of upcoming orders). The order manager tool 203 may also include menu recipe data. For example, each menu item may be broken down to individual menu items (e.g., combinations of items such as an entrée and a beverage) and recipe items (e.g., a hamburger may include buns, meat, vegetables, condiments, etc.). The order manager tool 203 may further include additional data associated with the preparation, cooking, and/or assembly of menu items (e.g., cooking duration, quantity of a first ingredient, packaging instructions, etc.)

The data integration system 202 may include a data integration tool 204 that includes hardware and/or processing logic associated with connecting and communicating with external devices. For example, the data integration tool 204 may include an application programming interface (API) configured to connect with the kitchen management system 220 and transmit data (e.g., data associated with the order manager tool 203) between the systems (e.g., using network 216).

The data integration tool 204 may include a display 205 (e.g., a kitchen display system (KDS)). Display 205 may communicate and/or otherwise work with order manager tool 203 to display upcoming orders and associated menu items and recipes for the upcoming orders. In some embodiments, multiple displays 205 are used. For example, a display 205 may be associated with a particular station (e.g., cooking station, assembly station, etc.) and order steps associated with that particular station are displayed. In some embodiments, the data integration system 202 further includes an employee interface 206. The employee interface may include data input devices (e.g., buttons, keyboards, touch screens) capable of applying an input to the data integration system 204. For example, an employee at a particular station may press a button when a portion of a recipe associated with that particular station is completed for an associated order. The interface 206 may communicate or otherwise work with the display 205 to advance orders as they are completed. In some embodiments, additional data may be received from employees through interface 206 such as deleting orders, flagging orders, completing orders, modifying orders, and so on.

In some embodiments, the display 205 may present a current status of a pending meal order. For example, a meal order may include a set of meal items. During preparation of the meal order one or more of the meal items of the set of meal items may be completed before other items and a status indicative of partial completion of the set may be displayed in association with the completed items (e.g., by affirmatively indicating one or more tasks as completed) and/or the incomplete item (e.g., by providing an indications of the tasks needed to be performed to complete a pending meal order).

In some embodiments, the display 205 may present the orders in a priority order. The order may be based on a temporal association between the orders (e.g., oldest order is displayed with the highest priority (i.e., first on the list)) and/or based on a position in one or more drive-thru line of vehicles associated with orders. In some embodiments, the employee interface may receive input that alters a current display state of the pending meal orders on the display 205. The employee interface 206 may receive input (e.g., from an employee) associated with an order. For example, the employee interface may receive an input that a first preparation stage of a meal item has been completed and can update a status of a pending meal order based on the received input by the employee interface 206. The employee interface 206 may receive input associated with altering a priority of one or more pending meal orders presented on the display 205 of the data integration system 202. For example, a sequence of pending meal orders may be adjusted based on input received by the employee interface 206. The display may update a state and/or manner of display based on an input received by the employee interface 206. For example, the display 205 may present one or more tasks remaining to complete an order and can update the list of remaining tasks based on the input received by the employee interface 206.

The client device 207 may be or include any personal computers (PCs), laptops, mobile phones, tablet computers, netbook computers, network connected televisions ("smart TV"), network-connected media players (e.g., Blue-ray player), a set-top-box, over-the-top (OOT) streaming devices, operator boxes, etc. The client device 207 may include a browser 209, an application 208, and/or other tools as described and performed by other system of the system architecture 200. In some embodiments, the client device 207 may be capable of accessing the data integration system 202, the data acquisition system 230, data drive-thru data acquisition system the kitchen management system 220, the drive-thru management system 228, machine learning system 210, and data store 250 and communicating (e.g., transmitting and/or receiving) data associated with the state of the kitchen. For example, data from kitchen management system may be transmitted to client device 207 for displaying, editing, and/or further processing. Client device 207 may include an operating system that allows users to one or more of generate, view, or edit data (e.g., data stored in data store 250).

In some embodiments, as will be discussed later, the client device 207 may employ an application 208 and/or a browser 209 capable of processing transactions associated with one or more pending meal orders. For example, an order manager tool 203 may receive orders and process payments associated with pending meal orders (e.g., orders associated with vehicles in a drive-thru area).

The kitchen management system 220 may include an order accuracy tool 222, an anticipatory prep tool 224, a gamification tool 226, a drive-thru management tool 228, and/or a limited time offer tool 229. The order accuracy tool 222 may receive output data generated based on processing of image data such as detected objects and order data, such as data managed by order manager tool 203 and determine inaccuracies between what is being prepared in the kitchen (e.g., detected in the images) and what steps are to be performed (e.g., following recipes and predetermined order preparation instructions). In some embodiments, the order accuracy tool may include flagging or otherwise indicating an error to an employee. For example, the order accuracy tool 222 may communicate with the display 205 of the data integration system 202 to display a visual indication of the error. In another example, the data integration system may include an auditory device (e.g., a speaker) that may indicate the error to an employee through an auditory alert.

In some embodiments, the order accuracy tool 222 may include a tracking tool that uses data from multiple processed images to detect and follow an order, as it is prepared. For example, the tracking tool may follow and order and store the last action performed on an order to ensure an order is prepared properly. In some embodiments, the order accuracy tool 222 determines compound actions based on the image data 252.

The anticipatory prep tool 224 may receive ML model outputs 264 associated with objects detected (ingredients, menu items, packaging, etc.). The detected objects may be associated with a current inventory of the kitchen. For example, the image data 252 may be processed to determine how much of a given ingredient is available. The kitchen data may be monitored over a period of time and a model may be generated to predict when more of a given ingredient needs to be prepared. For example, the rate of consumption of a first ingredient (e.g., grilled chicken) will be monitored over a series of outputs generated based on processing image data. The anticipatory prep tool 224 may include a model that predicts, based on the image data 252 and/or ML model outputs 264, future preparation times and quantities. For example, to ensure a restaurant has a given ingredient available, the anticipatory prep tool 224 may indicate to an employee a future prep time and/or quantity of the given ingredient.

The gamification tool 226 includes methodology and subsystems that provide targeted, specific metrics associated with a restaurant's food preparation and delivery services. In some embodiments, image data is processed to determine preparation times of given employees, menu items, and/or preparations steps. The gamification tool 226 may determine preparation and/or delivery times of individual employees, shifts, stations, and/or menu items. For example, conventional systems may rely on sales data or start to end inventory changes. However, the gamification tool 226 may provide for more granular metric measurements such as those metrics previously described. The gamification tool 226 may then provide incentives to increase one or more metrics for individuals, shifts, restaurants, and so on. The incentives may be tailored to specific metrics that may have values lagging expected and/or target values for those metrics.

The limited time offer tool 229 may receive one or more outputs generated based on processing image data, where the outputs may be associated with object detection. A large amount of the detected objects may be associated with an item identified by the data integration system 202 (e.g., through the order manager tool 203). However, in some cases, a restaurant may introduce new recipes, menu items, ingredients, etc. Conventional machine learning systems often require extensive retraining in order to perform novel object detection. However, the limited time offer tool 229 may perform clustering of image process data to determine multiple instances of an undetectable object. Based on the clustering of image process data, the limited time offer tool 229 determines that a novel unknown item (e.g., ingredient, menu item, combination of menu items) exists. In some embodiments, the novel item is indicated and/or flagged to an employee through the data integration server or the client device 207. Limited time offer tool 229 may update a training of one or more other tools to teach them to recognize the new item using properties (e.g., feature vectors) of the determined cluster for the novel item. User input or additional data may be used to assign labels to the new menu item (e.g., indicating a name for the new menu item, ingredients of the new menu item, and so on).

The drive-thru management system 228 may include a vehicle identification tool 242, an order association tool 243, a vehicle routing tool 244, a menu update tool 245, and a vehicle tracking tool 246. The drive-thru management system 228 may receive outputs generated based on processing image data from cameras 296, the outputs associated with a state of the drive-thru of a restaurant. Drive-thru management system 228 may additionally receive outputs associated with a state of the kitchen. For example, the vehicle identification tool 242, may identify vehicles by determining a visual indicator (e.g., license plate, make/model of the vehicle). The vehicle identification tool 142 may include a database of vehicles indicating an order history associated with each identified vehicle. The order association tool 234 may associate a vehicle disposed within the drive-thru area with a pending meal order. For example, the order association tool 243 may determine that a vehicle is associated with a pending meal order based on proximity of the vehicle to an order placement kiosk when the pending meal order is submitted to the POS system.

The vehicle routing tool 244 may direct vehicles through a drive-thru area. For example, the drive-thru management system 228 may receive data indicative of current availability of items in the kitchen (e.g., inventory analysis). The system may track the order fill rate, monitor wait time of the vehicles in the drive-thru, and make a determination that a given vehicle associated with an order should be rerouted to an alternative delivery procedure. The vehicle routing tool 244 may direct a vehicle to a waiting bay if the drive-thru management system 228 determines a wait time for an order associated with the vehicle is above a threshold value. In some embodiments, the threshold value may be associated with line length, time of day, state of the kitchen (e.g., inventory data, employee status, etc.).

The menu update tool 245 may receive input from other tool of the drive-thru management system 228. The menu update tool 245 may determine updates to a menu display based on determinations (e.g., vehicle identifications, order associations, order delivery times, etc.). For example, the menu update tool 245 may make a determination of whether to offer a promotion or attempt an up sale procedure based on the state of the drive-thru and/or past transactions with an identified vehicle and/or statistical data about a type of identified vehicle and instruct a display to update a menu display based on the determination (e.g., display the upsell in a prominent position a menu display).

The vehicle tracking tool 246 may receive image data and track vehicles over multiple image frames. For example, vehicles, may be tracked as they navigate through a drive-thru area (e.g., an order placement zone, order payment zone, meal delivery zone, etc.) In some embodiments, the vehicle tracking tool 246 tracks vehicles through drive-thru lane changes such as lane merging and lane splitting (e.g., to effectuate proper order payment and/or meal delivery by tracking the order and/or locations of multiple vehicles in the drive-thru area.

In some embodiments, outputs from the order accuracy tool 222, the anticipatory prep tool 224, gamification tool 226, limited time offer tool 229, vehicle identification tool 242, order association tool 243, vehicles routing tool 244, menu update tool 245, and/or vehicle tracking tool 246 may be consumed by the data integration system (e.g., such as to provide live order accuracy data, anticipatory prep data, gamification data, drive-thru management data, limited time data as described herein, vehicle identification, vehicle order association data, vehicle routing data, menu update data, and/or vehicle tracking data). In some embodiments, outputs from the order accuracy tool 222 anticipatory prep tool 224, gamification tool 226, drive-thru management tool 228, and/or limited time offer tool 229 may be consumed by a client device 207 (e.g., using application 208 and/or browser 209).

The data integration system 202, client device 207, data acquisition system 230, kitchen management system 220, drive-thru management system 228, machine learning system 210, data store 250, server machine 270, and server machine 280 may be coupled to each other via a network 216 for monitoring the state of a kitchen and/or drive-thru. In some embodiments, the kitchen management system 220 and the drive-thru management system 228 are combined into a single system. In some embodiments, network 216 is a public network that provides client device 207 with access to the kitchen management server 212, data store 250, and other publically available computing devices. In some embodiments, network 216 is a private network that provides data integration system 202 access to the kitchen management system 220, data acquisition system 230, data store 250, and other privately available computing devices and that provides client device 207 access to the kitchen management server 212, data store 250, and other privately available computing devices. Network 216 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The data integration system 202, kitchen management server 212, data acquisition system 230, kitchen management system 220, drive-thru management system 228, server machine 270, and server machine 280 may each include one or more computing devices such as a rackmount server, a router computer, a server computer, a PC, a mainframe computer, a laptop computer, a tablet computer, a desktop computer, graphics processing unit (GPU), accelerator application-specific integrated circuit (ASIC) (e.g., tensor processing unit (TPU)), etc. In some embodiments, one or more of these systems and/or machines is combined into a single system/machine (e.g., that may run on a single server machine).

The kitchen management server 212 may include a kitchen management component 214. In some embodiments, the kitchen management component 214 may retrieve image data 252 from the data store and generate outputs 264 (e.g., action data, depth data, object data, etc.) In some embodiments, the kitchen management component 214 may use one or more trained machine learning models 290 to receive image data from one or more cameras and to determine the output for the image data (e.g., images acquired through camera(s) 232). The one or more trained machine learning models 290 may be trained using image data 252 to learn object detection, action recognition, object tracking, volumetric estimation, and/or geometric identification associated with image data of images of a kitchen. Based on the training, one or more model(s) 290 are trained to receive input images and to generate an output including detected objects, identified actions, tracking data, and so on. In some embodiments, the kitchen management component 214 makes determinations by providing image data (e.g., current image data) into the trained machine learning model 290, obtaining the outputs 264 from the trained machine learning model 290, and processing and/or using the output 264.

The drive-thru management server 213 may include a drive-thru management component 215. In some embodiments, the drive-thru management component 215 may retrieve image data 252 from the data store and generate outputs 264 (e.g., action data, depth data, object data, vehicle identification data, vehicle order association data, vehicle routing data, menu update data, vehicle tracking data, etc.) In some embodiments, the drive-thru management component 215 may use one or more trained machine learning models 290 to receive image data from one or more cameras and to determine the output for the image data (e.g., images acquired through camera(s) 296). The one or more trained machine learning models 290 may be trained using image data 252 to learn vehicle identification, vehicle order association, vehicle routing, menu update determination, and/or vehicle tracking associated with image data of images of a drive-thru area. Based on the training, one or more model(s) 290 are trained to receive input images and to generate an output including detected objects (e.g., vehicles), vehicle meal order association data, vehicle routing data, menu update data, vehicle tracking data, and so on. In some embodiments, the drive-thru component 215 makes determinations by providing image data (e.g., current image data) into the trained machine learning model 290, obtaining the outputs 264 from the trained machine learning model 290, and processing and/or using the output 264.

Data store 250 may be memory (e.g., random access memory), a drive (e.g., a hard drive, a flash drive), a database system, or another type of component or device capable of storing data. Data store 250 may include multiple storage components (e.g., multiple drives or multiple databases) that may span multiple computing devices (e.g., multiple server computers). The data store 250 may store image data 252, order data 254, menu data 256, inventory data 262, ML model outputs 264 (e.g., action data, depth data, and object data. The image data 252, order data 254, menu data 256, inventory data 262, ML model outputs 264 may include historical data (e.g., for training the machine learning model 290).

Image data 252 may include images taken by the kitchen data acquisition system 230 (e.g. using camera(s) 232) and/or the drive-thru data acquisition system 230 (e.g., using cameras 296). Order data 254 may include data associated with orders previously filled and/or currently needing to be filled. Menu data 256 may include a listing of menu items, associated recipes, and/or preparation instructions for each menu item. Inventory data 262 may be data indicative of a past and/or current state of inventory of operational supplies (e.g., ingredients, tools and machines, food packaging, etc.) ML model outputs 264 may include object data, pacing data, action data, tracking data, instance segmentation data, depth data, and/or pose data, among other things. Action data may include past and/or current actions being performed by employees in the kitchen (e.g., scooping a first ingredient, cooking a second ingredient, packaging a first menu item, etc.) Instance segmentation data may include divisions between objects and/or zones. For example, instance segmentation may include data indicative of divisions of ingredient containers (e.g., ingredient containers 112). In some embodiments, instance segmentation data may be indicative of associating objects together. For example, instance segmentation data may make an association of a detected employee hand to the rest of their body and can later be used to determine what order an employee is currently filling (e.g., what actions is an employee performing). Depth data may include data associated with a depth of an ingredient in a bin. For example, depth data may be used to compute a volumetric estimation of how much sauce is left in a container based on known dimensions of the container (e.g., depth, width, length, etc.) Object data may include previously and/or currently detected objects in the kitchen. For example, object data may include a hamburger, packaging, a cooking tool, an employee, and the like. Pose data may include data indicative of a pose of an employee (e.g., employees 124A-C). Pose data may include poses and/or gestures of people and/or their body parts, such as hands in specific positions associated with certain actions. Pose data may include an indication of the location and current position of a hand of the employee. For example, pose data may be associated with an action being performed (e.g., an employee scooping a first ingredient). Tracking data may include an indication of where an object is located. The tracking data can be indicative of the last actions performed in association with an object (e.g., cheese placed on a burger, a side scooped into a meal container, meal items assembled into a combination meal, etc.). Tracking data may also be indicative of a current state of a meal or component of a meal (e.g., a burger is cooking, a portion of a combination meal is assembled, a meal is awaiting delivery to customer, etc.). Tracking data may also indicative a current state of a drive-thru area (e.g., vehicle location, vehicle order, and/or results of a lane merge, lane split, and/or lane change).

In some embodiments, the client device 207 may store current data (e.g., image data 252, ML model outputs 264) in the data store 250 and the kitchen management server 212 may retrieve the current data from the data store 250. In some embodiments, the kitchen management server 212 may store output (e.g., output generated based on processing image data) of the trained machine learning model 290 in the data store 250 and the client device 207 may retrieve the output from the data store 250.

In some embodiments, machine learning system 210 further includes server machine 270 and/or server machine 280. Server machine 270 includes a data set generator 272 that is capable of generating data sets (e.g., a set of data inputs and a set of target outputs) to train, validate, and/or test a machine learning model 290. Some operations of data set generator 272 are described in detail below with respect to FIGS. 4A-B. In some embodiments, the data set generator 272 may partition the image data 252 into a training set (e.g., sixty percent of the image data 252), a validating set (e.g., twenty percent of the image data 252), and a testing set (e.g., twenty percent of the image data 252). In some embodiments, the machine learning system 210 (e.g., via kitchen management component 214) generates multiple training data items each including one or more sets of features and associated labels (e.g., for object detection, action identification, object tracking, volumetric estimation, pacing determination, pose detection, etc.).

Server machine 280 may include a training engine 282, a validation engine 284, a selection engine 285, and/or a testing engine 286. An engine (e.g., training engine 282, a validation engine 284, selection engine 285, and/or a testing engine 286) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 282 may be capable of training a machine learning model 290 using one or more sets of features associated with the training set from data set generator 272. The training engine 282 may generate multiple trained machine learning models 290, where each trained machine learning model 290 may be trained based on a distinct set of features of the training set and/or a distinct set of labels of the training set. For example, a first trained machine learning model may have been trained using images and associated object labels, a second trained machine learning model may have been trained using images and associated pose labels, and so on. Additionally, one or more first ML models 290 may be trained to process kitchen images and one or more second ML models 290 may be trained to process drive-thru images.

The validation engine 284 may be capable of validating a trained machine learning model 290 using the validation set from data set generator 272. The testing engine 286 may be capable of testing a trained machine learning model 290 using a testing set from data set generator 272.

The machine learning model(s) 290 may refer to the one or more trained machine learning models that are created by the training engine 282 using a training set that includes data inputs and, in some embodiments, corresponding target outputs (correct answers for respective training inputs). Patterns in the data sets can be found that cluster the data input and/or map the data input to the target output (the correct answer), and the machine learning model 290 is provided mappings that captures these patterns. The machine learning model(s) 290 may include artificial neural networks, deep neural networks, convolutional neural networks, recurrent neural networks (e.g., long short term memory (LSTM) networks, convLSTM networks, etc.), and/or other types of neural networks. The machine learning models 290 may additionally or alternatively include other types of machine learning models, such as those that use one or more of linear regression, Gaussian regression, random forests, support vector machines, and so on. In some embodiments, the training inputs in a set of training inputs is mapped to target outputs in a set of target outputs.

Kitchen management component 214 may provide current data (e.g., kitchen data) to the trained machine learning model(s) 290 and may run the trained machine learning model(s) 290 on the input to obtain one or more outputs. The kitchen management component 214 may be capable of making determinations and/or performing operations from the output 264 of the trained machine learning model(s) 290. ML model outputs 264 may include confidence data that indicates a level of confidence that the ML model outputs (e.g., predictive data) 264 correspond to detected objects, identified actions, object tracking, detected poses and/or gestures, and so on. Kitchen management component 214 may perform volumetric quantity estimations based on image data and/or ML model outputs 264 in embodiments. The kitchen management component 214 may provide the ML model outputs 264 (e.g., detected objects, identified actions, object tracking data, volumetric quantity estimation) to one or more tools of the kitchen management system 220.

Drive-thru management component 215 may provide current data (e.g., drive-thru data) to the trained machine learning model(s) 290 and may run the trained machine learning model(s) 290 on the input to obtain one or more outputs. The drive-thru management component 215 may be capable of making determinations and/or performing operations from the output 264 of the trained machine learning model(s) 290. ML model outputs 264 may include confidence data that indicates a level of confidence that the ML model outputs (e.g., predictive data) 264 correspond to identified vehicles, vehicle meal order associations, vehicle routing, menu updates, vehicle tracking, and so on. Drive-thru management component 215 may perform vehicle identification, meal order association, vehicle routing, menu update determination, and/or vehicle tracking based on image data and/or ML model outputs 264 in embodiments. The kitchen management component 214 may provide the ML model outputs 264 (e.g., vehicle identification data, order association data, vehicle routing data, menu update data, vehicle tracking data) to one or more tools of the kitchen management system 220.

The confidence data may include or indicate a level of confidence that the ML model output 264 is correct (e.g., ML model output 264 corresponds to a known label associated with a training data item). In one example, the level of confidence is a real number between 0 and 1 inclusive, where 0 indicates no confidence that the ML model output 264 is correct and 1 indicates absolute confidence that the ML model output 264 is correct. Responsive to the confidence data indicating a level of confidence below a threshold level for a predetermined number of instances (e.g., percentage of instances, frequency of instances, total number of instances, etc.), the kitchen management server 214 may cause the trained machine learning model 290 to be re-trained.

For purpose of illustration, rather than limitation, aspects of the disclosure describe the training of a machine learning model using image data 252 and inputting current image data into the trained machine learning model to determine ML model output 264 (e.g., detected object, identified actions, object tracking, volumetric quantity estimation, etc.). In other implementations, a heuristic model or rule-based model is used to determine an output (e.g., without using a trained machine learning model). Any of the information described with respect to input data (e.g., data acquired with data acquisition system 302 of FIG. 3) may be monitored or otherwise used in the heuristic or rule-based model.

In some embodiments, the functions of data integration system 202, client device 207, machine learning system 210, data acquisition system 230, kitchen management system 220, server machine 270, and server machine 280 may be provided by a fewer number of machines. For example, in some embodiments server machines 270 and 280 may be integrated into a single machine, while in some other embodiments, server machine 270, server machine 280, and predictive kitchen management server 212 may be integrated into a single machine. In some embodiments, kitchen management system 220, data acquisition system 230, and data integration system 202 may be integrated into a single machine.

In general, functions described in one embodiment as being performed by data integration system 202, client device 207, machine learning system 210, data acquisition system 230, kitchen management system 220, server machine 270, and server machine 280 can also be performed on kitchen management server 212 in other embodiments, if appropriate. In addition, the functionality attributed to a particular component can be performed by different or multiple components operating together. For example, in some embodiments, the kitchen management server 212 may process images. In another example, client device 207 may perform the image process based on output from the trained machine learning model.

In addition, the functions of a particular component can be performed by different or multiple components operating together. One or more of the kitchen management server 212, server machine 270, or server machine 280 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 3A:
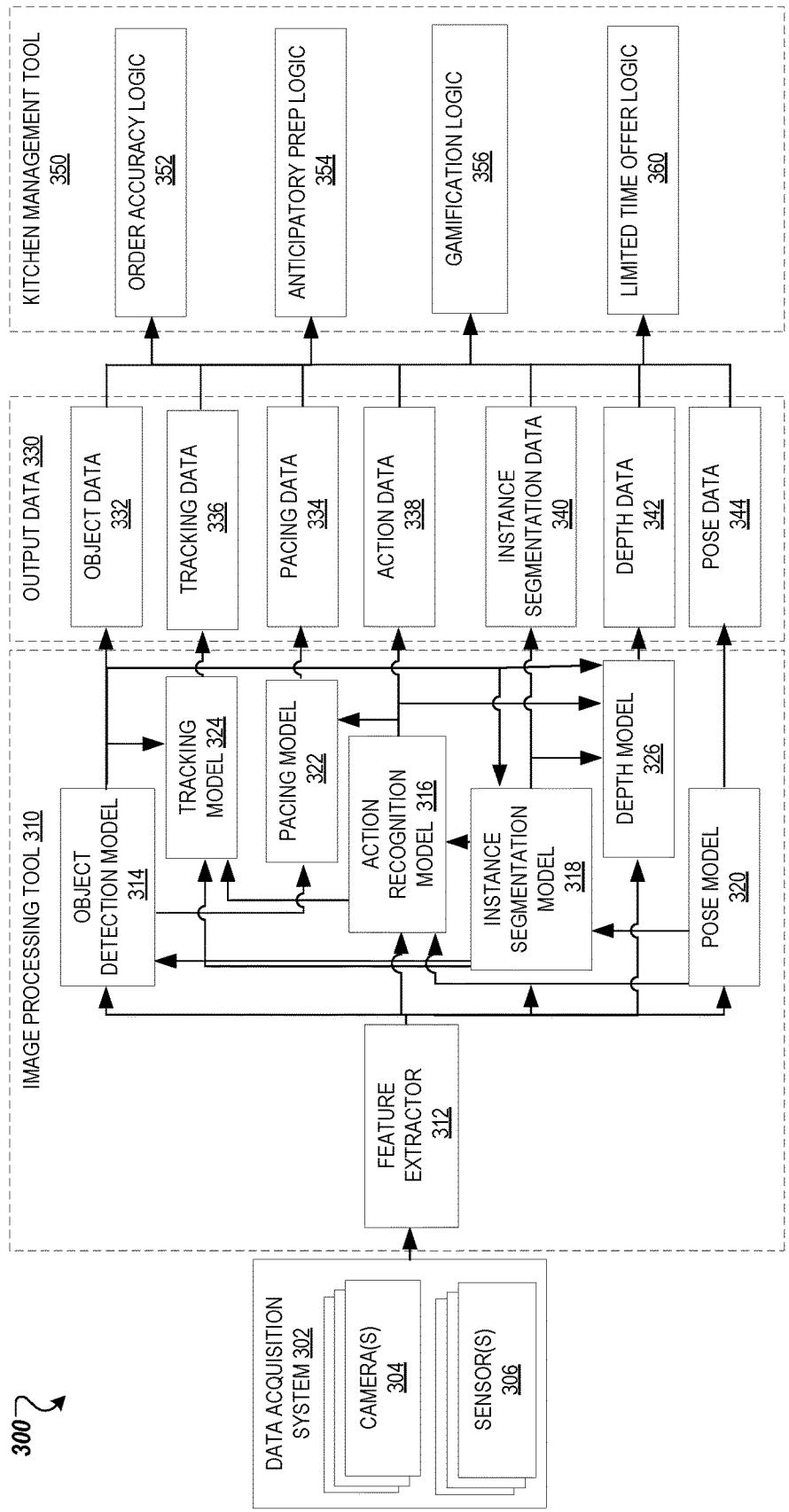
FIG. 3A-B is a block diagram illustrating image processing systems in which implementations of the disclosure may operate.

FIG. 3A is a block diagram illustrating an image processing system 300 in accordance with embodiments of the present disclosure. As shown in FIG. 3, the image processing system 300 includes a data acquisition system 302. The data acquisition system 302 may include one or more cameras 304 and/or sensors 306 to acquire image data (e.g., image data 252 of FIG. 2) associated with a state of the kitchen. For example, camera(s) 304 may be disposed within a meal preparation area to capture images of current food preparation items and/or actions. The cameras may include CCTV cameras, depth sensors (e.g. LIDAR cameras), depth optical cameras (e.g., stereo vision, structured light projection) and/or other sensors to capture kitchen data.

As shown in FIG. 3A the kitchen state data (e.g., image data) may be processed using an image processing tool 310. The image processing tool 310 may include a feature extractor 312. The feature extractor 312 can receive image data and generate synthetic data associated with various combinations, correlations, and/or artificial parameters of the image data. The feature extractor 312 can dimensionally reduce the raw sensor data into groups and/or features (e.g., feature vectors). For example, the feature extractor 312 may generate features that include images of a specified perspective (e.g., including a specified station).

In some embodiments, the feature extractor 312 includes a neural network trained to perform feature extraction. For example, the feature extractor may be trained to receive data for one or more images and to output features based on the received data. The output features may then be used by further logics and/or models of image processing tool 310.

In some embodiments, image data and/or outputs of the feature extractor 312 are used as inputs to various processing logic including data processing models, which may be or include one or more trained machine learning models. The data processing models may include an object detection model 314, an action recognition model 316, an instance segmentation model 318, a pose model 320, a tracking model 324, a pacing model 322, and/or a depth model 326. In some embodiments, feature extractor 312 is a layer of multiple layers of one or more neural networks, and object detection model 314, action recognition model 316, instance segmentation model 318, pose model 320, tracking model 324, pacing model 322, and/or depth model 326 are further layers of the one or more neural networks. In some embodiments, feature extractor 312 is omitted, and image data is input into object detection model 314, action recognition model 316, instance segmentation model 318, pose model 320, tracking model 324, pacing model 322, and/or depth model 326. The image processing model(s) receive input (e.g., image data, and/or a feature vector from feature extractor 312) and determine output data 330 (e.g., ML model outputs 264). In some embodiments, the output data 330 includes object data 332 (e.g., detected objects in an image), tracking data 334 (e.g., where an object is located, previous actions that have been applied to an object, tracking order through multiple images, and/or vehicle tracking in the drive-thru), pacing data 336 (e.g., paces of actions, recipes, food preparation steps, etc.), action data 338 (e.g., action being performed such as scooping an ingredient, cooking an ingredient, assembly a meal order, etc.), instanced segmentation data 340 (e.g., the last action to be performed on an order). data indicative of object association and/or segmentation, connecting object and employee, action and employee, division of macro-object such food preparation zones into individual ingredient containers), and so on. The data processing models may incorporate use of a machine learning model (e.g., trained using method 400A-B of FIG. 4, implemented using method 400C of FIG. 4, using processing architecture of machine learning system 210 of FIG. 2).

As shown in FIG. 3A, the object detection model 314 can receive image data from data acquisition system 302 (e.g., through feature extractor 312). In some embodiments, the object detection model 314 detects objects found within an image. For example, the object detection model 314 may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like. In some embodiments, the object detection tool receives data from a POS (e.g., POS 102 of FIG. 1). The received data from the POS may include data indicative of meals, kitchen items, ingredients, or other data indicative of potential objects to be detected in images by object detection model 314. In some embodiments, the data from the POS may be used to train the object detection model 314 on potential objects to be detected in the inputted image data. The object detection model outputs object data 332. The object data 332 may include information on an identified object as well as location data, employee data, meal data, and/or other identifiable information associated with the detected objects.

As shown in FIG. 3A, the action recognition model 316 receives image data as input and outputs action data 338. The action recognition model 316 identifies actions being performed in association with the received image data. For example, a series of images may show an employee performing an action such as scooping a sauce. The action recognition model 316 receives the series of images and identifies the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

As shown in FIG. 3A, the image processing tool 310 may include an instance segmentation model 318. The instance segmentation model 318 may receive image data from the data acquisition system 302 (e.g., through the feature extractor 312). The instance segmentation model 318 may segment images into discreet boundaries. For example, the instance segmentation model 318 may receive an image, identify the boundaries of different ingredient containers (e.g., ingredient containers 112 of FIG. 1), and output the discretized ingredient containers as instance segmentation data 340. In another example, the instance segmentation model 318 may receive an image and identify the boundaries of different lanes associated with a drive-thru area. In some embodiments, the instance segmentation model 318 may associate various segmented and/or discretized boundaries. For example, the instance segmentation model 318 may receive object data 332 from the object detection model 314. The object data 332 may include a detected hand and a detected cooking utensil. The instance segmentation model 318 may identify an association between the hand and the cooking utensil and output the association as instance segmentation data 340. In another embodiment, the instance segmentation tool may output the data to the action recognition model 316 that determines an action (e.g., action data 338) being performed based on the detected hand and cooking utensil and the identified association between the detected objects. For example, the instance segmentation model 318 may receive image data indicative of multiple lanes in the drive-thru area and associate multiple lanes as merging into another lane. In some embodiments, the instance segmentation model 318 outputs instance segmentation data 340 that is used by tracking model 324 and/or depth model 326.

As shown in FIG. 3A, the image processing tool 310 may include a tracking model 324. The tracking model 324 may receive object data 332, action data 338, instance segmentation data 340, and/or image data (e.g., from data acquisition system 302). The tracking model may track a detected object over a series of images and identify a current location of an object and/or historical tracking of an object. In some embodiments, the tracking model 324 tracks a status of an order. For example, the tracking model 324 may output tracking data 336 that includes an indication of top data or data indicative of the last action associated with an order. For example, the tracking model 324 may combine object data 332 with action data 338 to determine a series of actions associated with an order. In another example 324, tracking model 324 may receive a series of object detection associated with a vehicle moving through a drive-thru area. Tracking model 324 may track a route of a vehicle through a drive-thru (e.g., through an order placement area, an order payment area, and an order delivery area).

In some embodiments, the tracking model may track an object associated with instance segmentation data 340. For example, instance segmentation may include a discretization and/or segmentation of individual containers (e.g., to hold food items). The tracking model 324 may track a location of one or more individual containers over time. In a further embodiment, the tracking model 324 may further combine object data with instance segmentation data to determine the contents of each container is addition to tracking the containers. In another embodiment, the racking model may track a vehicle through a route of a drive-thru (e.g., tracking a vehicle through a merge of multiple lanes, through lanes changes generally, and the like). The tracking model may output data indicative of object tracking, order tracking, and/or action tracking as tracking data 336.

As shown in FIG. 3A, image processing tool 310 may include a pacing model 322. The pacing model 322 may receive object data 332 (e.g., from object detection model 314) and/or action data 338 (e.g., from action recognition model 316). The pacing model may determine pacing of various kitchen tasks associated with detected objects and/or actions. For example, not to be interpreted as an exhaustive list, the following could be pacing actions outputted by pacing model 322 and included in pacing data 334: prepping dough, placing toppings, loading and/or unloading a pizza to/from an oven, cutting a pizza, refilling ingredients, opening restaurant, prepping sides, hand washing, using POS system, checking temperature, using the cooler/freezer, assembling a product, packaging a product, attending a phone call, processing an order, counting inventory, delivering food to a customer, drive-thru queue, and so on.

As shown in FIG. 3A, image processing tool 310 may include a pose model 320. The pose model 320 receives image data and determines a pose of an employee. For example the pose model 320 may output pose data 344 indicative of locations and/or orientations of employees (e.g., hand, arms, body) and other kitchen equipment (e.g., utensils ovens, counters, etc.) In some embodiments, the pose data 344 is indicative of one or more locations of hands of employees in the presence of occlusions. For example, the pose data 342 may indicate a location and orientation of an arm that is visible in an image frame and determine the location and/orientation of a hand (e.g., that is not visible in an image frame). The pose data 344 may be outputted to the action recognition model 316 for determining actions that may be partially or fully occluded in the image data. The pose data 344 may be used further by instance segmentation model 318. For example, the instance segmentation model 318 may use the pose data 344 to make determination of object associations (e.g., a hand, an arm, and a cooking utensil).

Pose data 344 may include information indicative of a state of one or more hands of employees and associations between their hands and one or more meal preparation items. For example, a location of a hand may be detected within an image frame. In one or more further image frames the hands may be occluded from a field of view of a camera. The pose data 344 may infer a location of one or more hands occluded from the field of view. As will be discussed in later embodiments, the pose data may be tracked over time to infer one or more meal preparation items and/or object occluded or otherwise outside a field of view of a camera. In some embodiments, the pose data 344 is used by processing logic to make associations between segmented objects. For example, the pose data may be used to infer a detected hand is associated with a detected shoulder, elbow, head, etc.

As will be described in future embodiments pose data may be used to infer associations between segmented objects that links objects with pending meal orders. For example, a hand of an employee that is disposed in proximity to a first ingredient associated with a first pending meal order. Using these associations, processing logic may infer a connection between the first employee and the first pending meal order. Associations between pending meal order, stages of pending meal orders, ingredient preparation actions, and other kitchen actions and employees and/or preparations may be inferred based on the pose data 344. For example, pose data 344 may be used to associate an employee's left hand with their right hand and determine a first action performed by the left hand and a second hand performed by the right hand are associated with the same order. In some embodiments, an employee may be associated with more than one order and/or part of an order.

As shown in FIG. 3A, image processing tool 310 may include a depth model 326. The depth model receives instance segmentation data 340 identifying individual segmented objects (e.g., individual kitchen containers). The depth data may receive sensor data 306 indicative of a detected depth of an image (e.g., an image taken using a LIDAR camera). The depth model 326 may further receive object specification data (e.g., dimensions of kitchen containers (e.g., length, width, and depth)). The depth model 326 may determine the depth and/or fill level of contents of individual containers.

In some embodiments, the action recognition model 316 may output action data 338 to the depth model 326. The depth model 326 may use action data 338 to determine a depth of a container during an identified action. For example, the presence of a food preparation utensil in a container can result in inaccurate depth data 342 of the enclosed kitchen item in the container (e.g., a sauce). The depth model 326 may determine a depth of the content of a container during a scooping actions where the kitchen utensil is removed from the container for a period of time.

In some embodiments, the depth model 326 makes a volumetric determination of the content of a container. In some embodiments, the depth model 326 receives object data 332 from object detection model 314. The depth model 326 may use the object data 332 to determine the content of a container. The depth model may then use volumetric determination methodology associated with the detected object. For example, the depth model 326 may receive object data 332 indicating that an object enclosed in the container is a thick sauce or a solid ingredient and the depth model 326 can account for this feature when determining a volumetric prediction of the enclosed item in the container.

The image processing system 300 may include a kitchen management tool 350. The kitchen management tool 350 may include order accuracy logic 352, anticipatory prep logic 354, a gamification logic 356, drive-thru management logic 358, and/or limited time offer logic 360. The order accuracy logic 352 may receive output data 330 such as object data 332, action data 338 and/or order data, such as data managed by an order manager tool (e.g., order manager tool 203) and determine inaccuracies between what is being prepared in the kitchen (e.g., detected in the images) and what steps are to be performed (e.g., following recipes and predetermined order preparation instructions). In some embodiments, the order accuracy tool may include flagging or otherwise indicating an error to an employee. For example, order accuracy logic 352 may process data and output instructions for a display (e.g., display 205 of FIG. 2) to display a visual indication of the error.

In some embodiments, the order accuracy logic consumes tracking data 336. For example, the order accuracy logic 352 may identify the last action performed on an order from the tracking data 336 and one or more pending actions to be performed on an order. The order accuracy logic may then determine current actions being performed on an order and compare them against the pending action to be performed following menu/recipe data. In some embodiments, the order accuracy logic 352 may determine compound actions from the action data 338, tracking data 334, and/or action data 338. The order accuracy logic 352 may identify which actions are associated with each order based on the instance segmentation data 340 to determine whether an error is or has occurred with an order.

The anticipatory prep logic 354 may consume output data 330 associated with objects detected (e.g. object data 332 including ingredients, menu items, packaging, etc.). The anticipatory prep logic 354 may consume depth data 342, instance segmentation data 340, and/or object data to determine a current inventory of the kitchen. The anticipatory prep logic 354 may monitor inventory over a period of time and predict when more of a given ingredient needs to be prepared. For example, the anticipatory prep logic can consume pacing data 334 and/or depth data 342 that indicates the rate of consumption of a first ingredient (e.g., grilled chicken). The anticipatory prep logic 354 may include a model that predicts output data 330, future preparation times and/or quantities. For example, to ensure a restaurant has a given ingredient available, the anticipatory prep logic 354 may indicate to an employee a future prep time and/or quantity of the given ingredient.

The gamification logic 356 may consume output data 330 to provide targeted, specific metrics associated with a restaurant's food preparation and delivery services. In some embodiments, gamification logic 356 receives pacing data 334 associated with different preparation times of given employees, menu items, and/or preparations steps. The gamification logic 356 may identify, using one or more of object data 332, action data 338, pacing data 334, and/or pose data 344 preparation and/or delivery times of individual employees, shifts, stations, and/or menu items. The gamification tool 226 may suggest incentives to increase one or more metrics for individuals, shifts, restaurants, and so on. The incentives may be tailored to specific metrics that may have values lagging expected and/or target values for those metrics.

The limited time offer logic 360 may consume object data 332. The object data 332 may be associated with an item identified by the object detection model. However, in some cases, a restaurant may introduce new recipes, menu items, ingredients, etc. Conventional machine learning systems often require extensive retraining in order to perform novel object detection. However, the limited time offer logic 360 may perform further object detection that may include identifying a clustering of object data 332 to determine multiple instances of an undetectable object. Based on the clustering of object data 332, the limited time offer logic 360 determines that a novel unknown item (e.g., ingredient, menu item, combination of menu items) exists. In some embodiments, the limited time offer logic 360 may output an indication of the novel item (e.g., to be displayed on a KDS) The limited time offer logic 360 may update a training of one or more models of the image processing tool 310 to recognize the new item using properties (e.g., feature vectors) of the determined cluster for the novel item. User input or additional data may be used to assign labels to the new menu item (e.g., indicating a name for the new menu item, ingredients of the new menu item, and so on).

In some embodiments one or more of the order accuracy logic 352, the anticipatory prep logic 354, the gamification logic 356, the drive-thru logic 358, and/or the limited time offer logic 360 include a machine learning model (e.g., trained using method 400A-B of FIG. 4, implemented using method 400C of FIG. 4, using processing architecture of machine learning system 270 of FIG. 2).

Figure 3B:
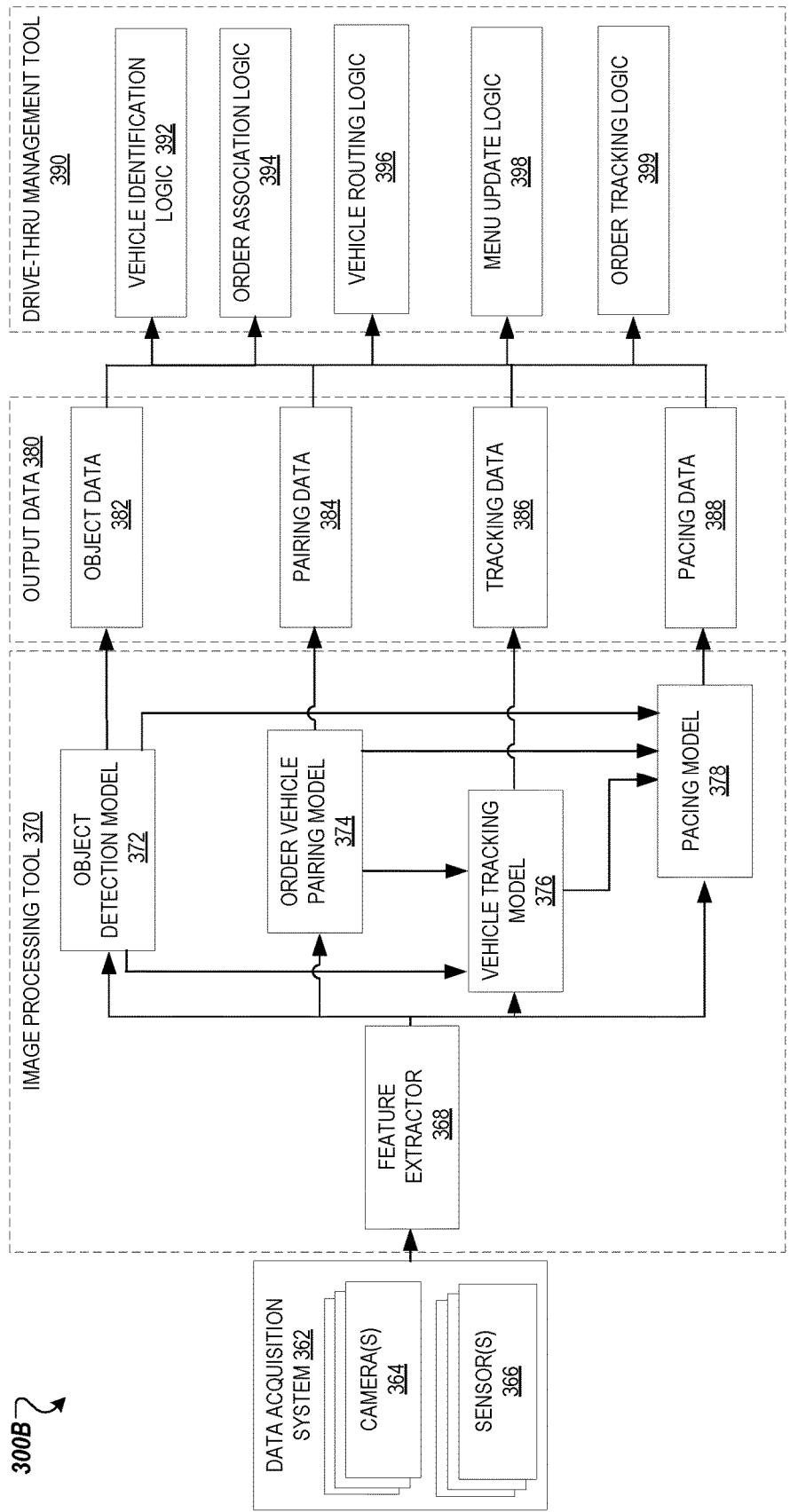

FIG. 3B is a block diagram illustrating an image processing system 300B in accordance with embodiments of the present disclosure. As shown in FIG. 3B, the image processing system 300B includes a data acquisition system 362. The data acquisition system 362 may include one or more cameras 364 and/or sensors 366 to acquire image data (e.g., image data 252 of FIG. 2) associated with a state of the drive-thru area. For example, camera(s) 364 may be disposed within a meal delivery area. The cameras may include CCTV cameras, depth sensors (e.g. LIDAR cameras), depth optical cameras (e.g., stereo vision, structured light projection) and/or other sensors to capture kitchen data.

As shown in FIG. 3B the drive-thru state data (e.g., image data) may be processed using an image processing tool 370. The image processing tool 370 may include a feature extractor 368. The feature extractor 368 can receive image data and generate synthetic data associated with various combinations, correlations, and/or artificial parameters of the image data. The feature extractor 368 can dimensionally reduce the raw sensor data into groups and/or features (e.g., feature vectors). For example, the feature extractor 368 may generate features that include images of a specified perspective (e.g., including a zone of a drive-thru area such as order placement zone, order payment zone, meal delivery zone, etc.).

In some embodiments, the feature extractor 368 includes a neural network trained to perform feature extraction. For example, the feature extractor may be trained to receive data for one or more images and to output features based on the received data. The output features may then be used by further logics and/or models of image processing tool 370.

In some embodiments, image data and/or outputs of the feature extractor 368 are used as inputs to various processing logic including data processing models, which may be or include one or more trained machine learning models. The data processing models may include object detection model 372, order vehicle pairing model 374, vehicle tracking model 376, and/or pacing model 378. In some embodiments, feature extractor 368 is a layer of multiple layers of one or more neural networks, object detection model 372, order vehicle pairing model 374, vehicle tracking model 376, and pacing model 378 are further layers of the one or more neural networks. In some embodiments, feature extractor 368 is omitted and image data is input into object detection model 372, order vehicle pairing model 374, vehicle tracking model 376, and/or pacing model 378. The image processing model(s) receiving input (e.g., image data and/or feature vector from feature extractor 368) and determine output data 380 (e.g., ML model outputs 264). In some embodiments, the output data 380 includes vehicle data 382 (e.g., vehicles detected in a drive-thru area), pairing data 384 (e.g., timing and location data associated with pending meal orders and vehicles in a drive-thru area), tracking data (e.g., data indicating one or more vehicle trajectories/routes through a drive-thru area, tracking a vehicle through multiple frames, etc.), and/or pacing data 388 (e.g., pace of vehicles in and out of a drive-thru, pace of individual drive-thru stations, pace of filling orders associated with vehicles in the drive-thru).

As shown in FIG. 3B, the object detection model 372 can receive image data from data acquisition system 362 (e.g., through feature extractor 368). In some embodiments, the object detection model 372 detects vehicles found within an image associated with a drive-thru area. For example, the object detection model 372 may identify a license plate number, make and/or model of a vehicle, and/or other visual indicators associated with a vehicle. In another embodiments, the object detection model may determine a location of a vehicle based on a location within an image frame and/or based a relative location of other identifiable indicators in an image (e.g., lane marker, building boundaries, order kiosks, drive-thru windows, etc.) The vehicle data 382 may include data indicating a location of an vehicle within a drive-thru area.

As shown in FIG. 3B, the order vehicle pairing model 374 can receive image data from data acquisition system 362 (e.g., through feature extractor 368). The order vehicle pairing model 374 may determine associations between pending meal orders and vehicles disposed within a drive-thru area. For example, the order vehicle paring model 374 may receive order data and image data to determine a proximity of a vehicle to an order placement location when an ordered is received/entered by a POS system. The associations between vehicles and meal orders as pairing data 384.

As shown in FIG. 3B, the vehicle tracking model 376 can receive image data from data acquisition system 362 (e.g., through feature extractor 368). The vehicle tracking model 376 may receive vehicle data 382 (e.g., from object detection model 372). The vehicle tracking model may track a detected vehicle over a series of image and identify a current location of the vehicles and/or historical tracking of the vehicle. In some embodiments, the vehicle tracking model 376 may also track pending meal orders using pairing data 384. For example, a vehicle may be tracked and associated with a pending meal and as a result a meal order may be tracked. The vehicle tracking model 376 may track a route of a vehicle through a drive-thru area (e.g., through an order placement area, an order payment area, and an order delivery area).

As shown in FIG. 3B, image processing tool 370 may include a pacing model 378. The pacing model 378 may receive vehicle data 382 from object detection model 372, pairing data 384 from order vehicle pairing model 374, and vehicle tracking model 376. The pacing model 378 may determine pacing of various drive-thru events. For example, the rate of ingress and egress associated with a drive through may be determine. Rates associated with ordering, payment, and meal delivery may be calculated to identify relative pacing of vehicles. In some embodiments, the pacing model may determine pacing of various kitchen tasks associated with detected objects and/or actions. For example, not to be interpreted as an exhaustive list, the following could be pacing actions outputted by pacing model 378 and included in pacing data 388: prepping dough, placing toppings, loading and/or unloading a pizza to/from an oven, cutting a pizza, refilling ingredients, opening restaurant, prepping sides, hand washing, using POS system, checking temperature, using the cooler/freezer, assembling a product, packaging a product, attending a phone call, processing an order, counting inventory, delivering food to a customer, drive-thru queue, and so on. In some embodiments, the pacing model 378 may output pacing data 388 that include predicted time to fill orders (e.g., time to deliver a meal to a vehicle in the drive-thru).

The drive-thru management logic may consume output data 330 associated with kitchen status and drive-thru status. The drive-thru management tool 228 may identify a status of the drive-thru from one or more of the object data 382, the pairing data 384, the tracking data 386 and/or the pacing data 338. The image processing system 300B may include a drive-thru management tool 390. The drive-thru management tool 390 may include vehicle identification logic 392, order association logic 394, vehicle routing logic 396, menu update logic 398, and order tracking logic 399.

The vehicle identification logic 392 may determine a visual indicator associated with the vehicle based on the output data 380. The visual indicator may include one or more features of the vehicle that identify the vehicle from other vehicles. For example, the vehicle identification logic 392 may determine a color of the vehicle, a make and/or model of the vehicle, a license plate number of the vehicle, and/or one or more objects detected on, within, or otherwise proximate the vehicle. For example, one or more objects disposed on a windshield (e.g., registration information or a depicted logo or icon) may be used to identify the vehicle. In another example, one or more objects located within the vehicle (e.g., on a dashboard) may be detected. In another example, pictures, logos, or other visual indicators on the body of the car (e.g., bumper stickers) may be used to identify the vehicle. In some embodiments, alterations to a traditional make and/or model of a vehicle may be detected and used to identify the vehicle. For example, a custom paint job (e.g., the vehicle includes a first part with a first color and a second part with a second color) associated with the vehicle may be used to identify the vehicle. In another example, a vehicle may include identifying features such scratches, cracked parts, missing parts (e.g., corresponding to a prior accident associated with the vehicle) that may be detected by processing logic to identify the vehicle from other vehicles.

The order association logic 394 may determine an association between a vehicle and the pending meal order based on the output data 380. Order association logic 394 may determine a location associated with the vehicle based on the image data. For example, one or more pixels of the one or more image frames may be associated with a specific location of the drive-through area. A vehicle may be depicted in a first portion of one or more image frames that is associated with a location proximate an order placement area of the drive-thru area. The association between the vehicle and the pending meal order may be based on a proximity of the vehicle to an order placement location when the order data is received (e.g., entered into the POS system). For example, a vehicle that is ordering is likely near the order placement area (e.g., a kiosk) of the drive-thru area and can be associated with an order that is entered in temporal proximity to determining that the vehicle is located proximate the order placement area. In some embodiments, processing logic may tag a vehicle with the order such that when the vehicle is detected in further image frames the identified vehicle is linked to data indicative of the associated pending meal order.

In some embodiments, as will be discussed further in association with other embodiments, an order may be associated with a vehicle based on which lane the vehicle is determined to be disposed. For example, a drive-thru area may include multiple meal order areas (e.g., multiple order kiosks) and an order entered into the POS may be associated with a specific lane of the drive-thru. The received order may be associated with a kiosk disposed proximate a first lane. A vehicle may be determined to be located in the first lane and can further be associated with the received order.

The vehicle routing logic 396 may consume the output data 330 to identify a current availability of items in the kitchen (e.g., inventory analysis). The vehicle routing logic 396 may track the rate (e.g., throughput of vehicles, duration of time each vehicle is disposed within the drive-thru area) and wait time of the vehicles in the drive-thru and make a determination that a given vehicle associated with an order should be rerouted to an alternative delivery procedure. For example, the drive-thru management logic may output a determination that a vehicle is to be directed to a waiting bay when an order associated with the vehicle is above a threshold value.

The menu update logic 398 may determine an update to an order display device based on the visual indicator (e.g., license plate, make/model of vehicle, or other vehicle identifying information as described herein.). In some embodiments, an order display device may include a display showing various meals capable of being prepared within an associated meal preparation area. The order display device may be capable of dynamic updating. For example, the order display device may include a digital menu display that is capable of receiving data and updating one or more elements on the display. In some embodiments, an update to the order display device may include updates to positioning and/or sizing of displayed elements, alignment of the one or more displayed elements, spacing between other displayed elements, visibility of one or displayed elements. In another example, the order display device may receive an update associated with an updated price of a meal item or combination of meal items and display the update in an updated menu display configuration (e.g., showing the updated price in proximity to the corresponding element). In another example, the order display device may update which items to display, which may be accompanied with changes in price, size, etc. Accordingly, a menu display may be customized to a customer based on properties of the vehicle (e.g., kids meals displayed to a minivan).

The order tracking logic 399 can receive output data 380 from image processing tool 370. The order tracking logic 399 may receive object data 382, pairing data 384, tracking data 386, and/or pacing data 388. The order tracking logic 399 may track a detected vehicle over a series of image and identify a current location of the vehicles and/or historical tracking of the vehicle. In some embodiments, the order tracking logic 399 may also track pending meal orders using pairing data 384. For example, a vehicle may be tracked and associated with a pending meal and as a result a meal order may be tracked. The vehicle tracking model 376 may track a route of a vehicle through a drive-thru area (e.g., through an order placement area, an order payment area, and an order delivery area).

Figure 4A:
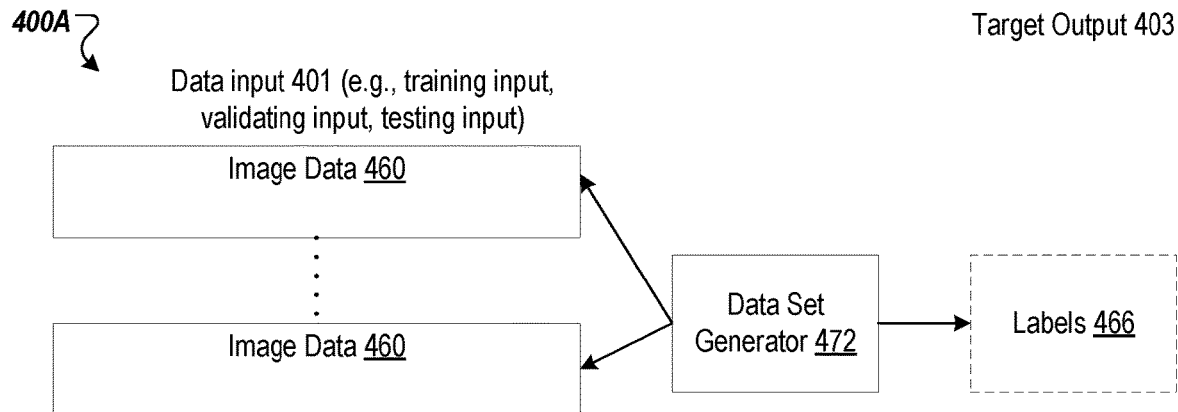
FIG. 4A is an example data set generator to create data sets for a machine learning model, according to certain embodiments.

FIG. 4A is an example data set generator 472 (e.g., data set generator 272 of FIG. 2) to create data sets for a machine learning model (e.g., model 290 of FIG. 2) using image data 460 (e.g., images captured by cameras 108A-C of FIG. 1), according to certain embodiments. System 400A of FIG. 4A shows data set generator 472, data inputs 401, and target output 403.

In some embodiments, data set generator 472 generates a data set (e.g., training set, validating set, testing set) that includes one or more data inputs 401 (e.g., training input, validating input, testing input). In some embodiments, the data set further includes one or more target outputs 403 that correspond to the data inputs 401. The data set may also include mapping data that maps the data inputs 401 to the labels 466 of a target output 403. Data inputs 401 may also be referred to as "features," "attributes," or information." In some embodiments, data set generator 472 may provide the data set to the training engine 282, validating engine 284, and/or testing engine 286, where the data set is used to train, validate, and/or test the machine learning model 290. Some embodiments of generating a training set may further be described with respect to FIG. 5A.

In some embodiments, data set generator 472 generates the data input 401 based on image data 460. In some embodiments, the data set generator 472 generates the labels 466 (e.g., object data 332, pacing data 334, tracking data 336, location data 338, depth data 342) associated with the image data 460. In some instances, labels 466 may be manually added to images by users. In other instances, labels 466 may be automatically added to images.

In some embodiments, data inputs 401 may include one or more images (e.g., a series of image frames) for the image data 460. Each frame of the image data 460 may include various objects (e.g., ingredients such as condiments, entrees, packaging materials, etc.), actions being performed (e.g., cooking, cutting, scooping, packaging, etc.), tracked orders, locations within the kitchen and drive-thru, depth of containers holding ingredients, and so on.

In some embodiments, data set generator 472 may generate a first data input corresponding to a first set of features to train, validate, or test a first machine learning model and the data set generator 472 may generate a second data input corresponding to a second set of features to train, validate, or test a second machine learning model.

In some embodiments, the data set generator 472 may discretize one or more of the data inputs 401 or the target outputs 403 (e.g., to use in classification algorithms for regression problems). Discretization of the data input 401 or target output 403 may transform continuous series of image frames into discrete frames with identifiable features. In some embodiments, the discrete values for the data input 301 indicate discrete objects, actions, location, etc. to be identified to obtain a target output 303 (e.g., output generated based on processing image data).

Data inputs 401 and target outputs 403 to train, validate, or test a machine learning model may include information for a particular facility (e.g., for a particular restaurant location and/or branch). For example, the image data 460 and labels 466 may be used to train a system for a particular floorplan and/or menu associated with a specific restaurant location.

In some embodiments, the information used to train the machine learning model may be from specific types of food preparation equipment (e.g., pizza oven, panini press, deep fryer) of the restaurant having specific characteristics and allow the trained machine learning model to determine outcomes for a specific group of food preparation equipment based on input for image data 460 associated with one or more components sharing characteristics of the specific group. In some embodiments, the information used to train the machine learning model may be for data points from two or more kitchen management functions and may allow the trained machine learning model to determine multiple output data points from the same image (e.g., a detectable object and an identifiable action are used to train the machine learning model using the same image).

In some embodiments, subsequent to generating a data set and training, validating, or testing machine learning model 290 using the data set, the machine learning model 290 may be further trained, validated, or tested (e.g., further image data 252 and labels) or adjusted (e.g., adjusting weights associated with input data of the machine learning model 290, such as connection weights in a neural network).

Figure 4B:
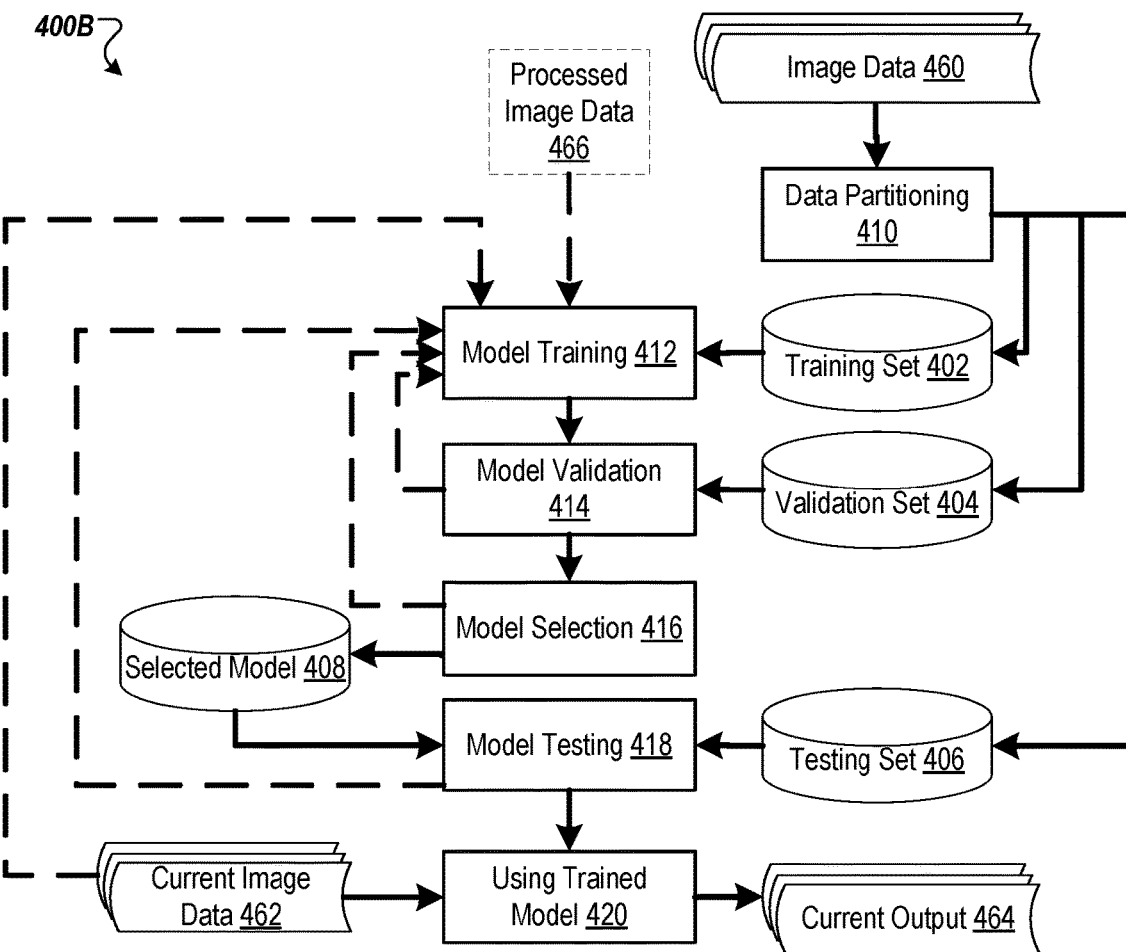
FIG. 4B is a block diagram illustrating determining predictive data, according to certain embodiments.

FIG. 4B is a block diagram illustrating a system 400B for training a machine learning model to generate outputs 464 (e.g., object data 332, pacing data 334, tracking data 336, action data 338, instance segmentation data 340, depth data 342 and/or pose data 344 of FIG. 3), according to certain embodiments. The system 400B may be used to train one or more machine learning models to determine outputs associated with image data (e.g., images acquired using cameras 108A-C).

At block 410, the system (e.g., machine learning system 210 of FIG. 2) performs data partitioning (e.g., via data set generator 272 of server machine 270 of FIG. 1) of the image data 460 (e.g., series of image frame, and in some embodiments outputs 466) to generate the training set 402, validation set 404, and testing set 406. For example, the training set may be 60% of the image data 460, the validation set may be 20% of the image data 460, and the testing set may be 20% of the image data 460. The system 400 may generate a plurality of sets of features for each of the training set, the validation set, and the testing set.

At block 412, the system 400 performs model training (e.g., via training engine 282 of FIG. 2) using the training set 402. The system 400 may train one or multiple machine learning models using multiple sets of training data items (e.g., each including sets of features) of the training set 402 (e.g., a first set of features of the training set 402, a second set of features of the training set 402, etc.). For example, system 400 may train a machine learning model to generate a first trained machine learning model using the first set of features in the training set (e.g., a first camera) and to generate a second trained machine learning model using the second set of features in the training set (e.g., a second camera). The machine learning model(s) may be trained to output one or more other types of predictions, classifications, decisions, and so on. For example, the machine learning model(s) may be trained to perform object detection for particular types of objects found in a restaurant kitchen, to perform tracking of one or more objects found in a kitchen, to determine pacing for food preparation in a kitchen, to identify actions performed in a kitchen, and so on.

In one embodiment, training a machine learning model includes providing an input of a training data item into the machine learning model. The input may include one or more image frames indicative of a state of a kitchen. In some embodiments, the machine learning model receives order data indicative of one or more pending meal orders. The machine learning model processes the input to generate an output. The output may include a prediction, inference, and/or classification associated with a state of the kitchen. For example, the machine learning may output objects and/or actions associated with the one or more image frames. In another example, the machine learning model may output order accuracy data (e.g., associated with order accuracy logic 352), anticipatory preparation data (e.g., associated with anticipatory prep logic 354), gamification data (e.g., associated with gamification logic 356), drive-thru management data (e.g., associated with gamification logic 356), limited time offer data (e.g., associated with limited time offer logic 360), object data (e.g., object data 332), tracking data (e.g., tracking data 334), pacing data (e.g., pacing data 336), action data (e.g., action data 338), instance segmentation data (e.g., instance segmentation data 340), depth data (e.g., depth data 342), pose data (e.g., pose data 344). Processing logic then compares the output to one or more labels associated with the input. Processing logic determines an error based on differences between the output and the one or more labels. Processing logic adjusts weights of one or more nodes in the machine learning model based on the error.

Processing logic determines if a stopping criterion is met. If a stopping criterion has not been met, the training process repeats with additional training data items, and another training data item is input into the machine learning model. If a stopping criterion is met, training of the machine learning model is complete.

In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., overlapping regions captured by multiple cameras).

At block 414, the system 400 performs model validation (e.g., via validation engine 284 of FIG. 2) using the validation set 404. The system 400 may validate each of the trained models using a corresponding set of features of the validation set 404. For example, system 400 may validate the first trained machine learning model using the first set of features in the validation set (e.g., image data from a first camera) and the second trained machine learning model using the second set of features in the validation set (e.g., image data from a second camera). In some embodiments, the system 400 may validate hundreds of models (e.g., models with various permutations of features, combinations of models, etc.) generated at block 412. At block 414, the system 400 may determine an accuracy of each of the one or more trained models (e.g., via model validation) and may determine whether one or more of the trained models has an accuracy that meets a threshold accuracy. Responsive to determining that one or more of the trained models has an accuracy that meets a threshold accuracy, flow continues to block 416. In some embodiments, model training at block 412 may occur at a first meal preparation area (e.g., at a first kitchen location) and model validation (block 414) may occur at a second meal preparation area (e.g., at a second kitchen location). For example, training of the one or more machine learning models may occur at a first restaurant location of a franchise chain and validation of the machine learning model may occurs at a second restaurant location of the franchise chain. The layout and footprint of the validation location may be similar to the training location, however, logistical differences (e.g., storage location of items, small layout differences, etc.) may be used to further refine the one or more machine learning models.

At block 418, the system 400 performs model testing (e.g., via testing engine 286 of FIG. 2) using the testing set 406 to test the selected model 408. The system 400 may test, using the first set of features in the testing set (e.g., image data from a first camera), the first trained machine learning model to determine the first trained machine learning model meets a threshold accuracy (e.g., based on the first set of features of the testing set 406). Responsive to accuracy of the selected model 408 not meeting the threshold accuracy (e.g., the selected model 408 is overly fit to the training set 402 and/or validation set 404 and is not applicable to other data sets such as the testing set 406), flow continues to block 412 where the system 400 performs model training (e.g., retraining) using further training data items. Responsive to determining that the selected model 408 has an accuracy that meets a threshold accuracy based on the testing set 406, flow continues to block 420. In at least block 412, the model may learn patterns in the image data 469 to make predictions and in block 418, the system 400 may apply the model on the remaining data (e.g., testing set 406) to test the predictions.

At block 420, system 400 uses the trained model (e.g., selected model 408) to receive current data (e.g., current image data) and receives a current output 464 based on processing of the current image data 462 by the trained model(s) 420.

In some embodiments, outputs 464 corresponding to the current data 462 are received and the model 408 is re-trained based on the current data 462 and the outputs 464.

In some embodiments, one or more operations of the blocks 410-420 may occur in various orders and/or with other operations not presented and described herein. In some embodiments, one or more operations of blocks 410-420 may not be performed. For example, in some embodiments, one or more of data partitioning of block 410, model validation of block 414, model selection of block 416, or model testing of block 418 may not be performed.

Figure 4C:
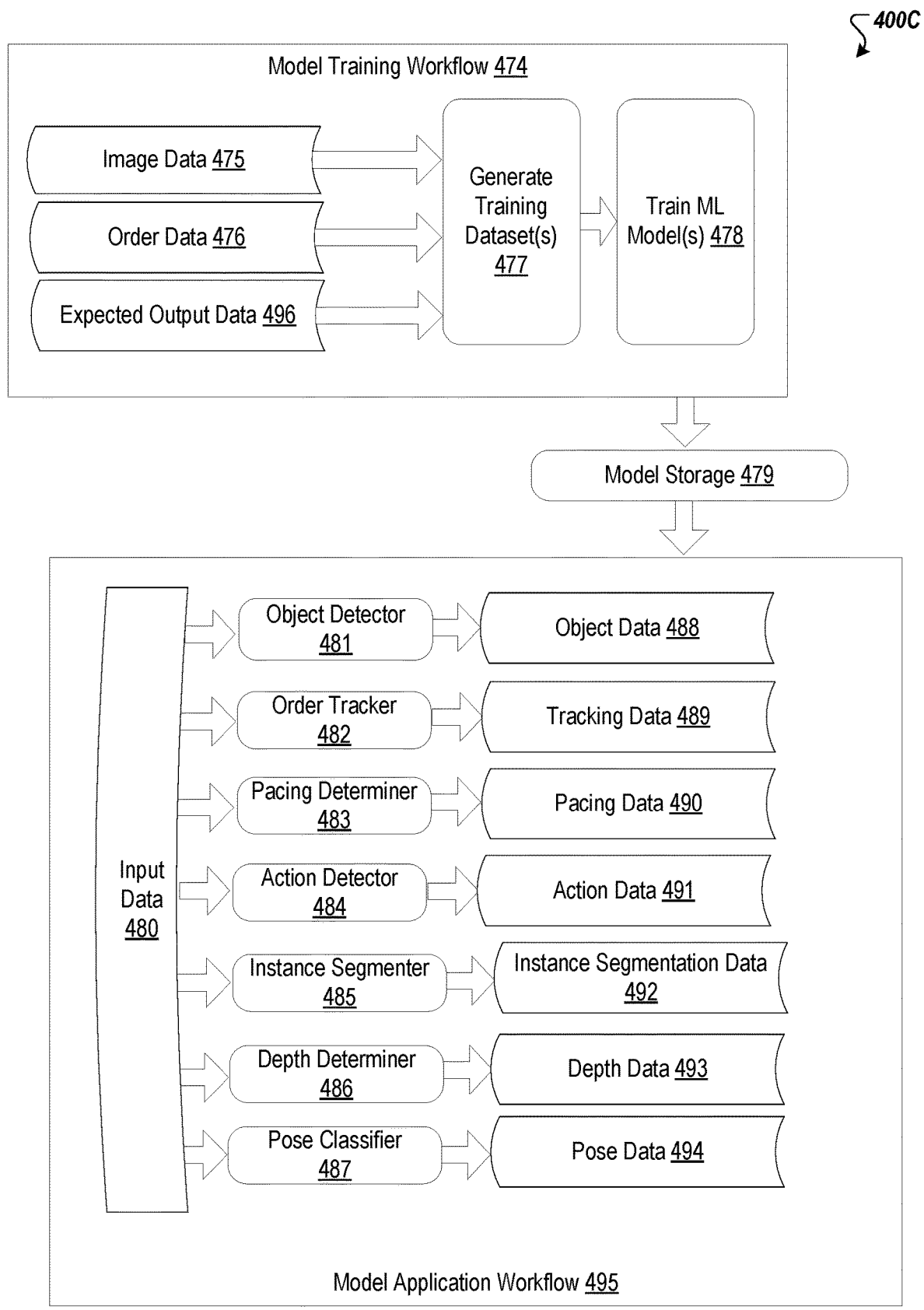
FIG. 4C illustrates a model training workflow and a model application workflow for an image-based kitchen management system, in accordance with an embodiments of the present disclosure.

FIG. 4C illustrates a model training workflow 474 and a model application workflow 495 for an image-based kitchen management system, in accordance with embodiments of the present disclosure. In embodiments, the model training workflow 474 may be performed at a server (e.g., server 116 of FIG. 1) which may or may not include a kitchen management application, and the trained models are provided to a kitchen management application (e.g., on client device 207 or machine learning system 210 of FIG. 2), which may perform the model application workflow 495. The model training workflow 474 and the model application workflow 495 may be performed by processing logic executed by a processor of a computing device. One or more of these workflows 474, 495 may be implemented, for example, by one or more machine learning modules implemented in an image processing tool 234, order accuracy tool 222, anticipatory prep tool 224, gamification tool 226, drive-thru management tool 228, limited time offer tool 229, and/or other software and/or firmware executing on a processing device as shown in FIG. 2.

The model training workflow 474 is to train one or more machine learning models (e.g., deep learning models) to perform one or more classifying, segmenting, detection, recognition, decision, etc. tasks associated with a kitchen management system (e.g., detecting objects and/or actions, tracking meal preparation items and/or orders, determining pacing or kitchen processes, segmenting image data, determining container depths, etc.). The model application workflow 495 is to apply the one or more trained machine learning models to perform the classifying, segmenting, detection, recognition, determining, etc. tasks for image data (e.g., one or more image frames indicative of a state of a meal preparation area). Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

a. Object detector—The object detector can receive image data (e.g., from data acquisition system 302), and can detect objects found within an image. For example, processing logic may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like. In some embodiments, the processing logic receives data from a POS (e.g., POS 102 of FIG. 1). The received data from the POS may include data indicative of meals, kitchen items, ingredients, or other data indicative of potential objects to be detected in images by object detection model. Processing logic may output object data (e.g., object data 332). The object data may include information on an identified object as well as location data, employee data, meal data, and/or other identifiable information associated with the detected objects.

b. Order tracker—Processing logic may receive object data (e.g., object data 332, action data (e.g., action data 338), instance segmentation data (e.g., instance segmentation data 340), and/or image data (e.g., from data acquisition system 302). The tracking model may track a detected object over a series of images and identify a current location of an object and/or historical tracking of an object. In some embodiments, the processing logic tracks a status of an order. For example, processing logic may output tracking data that includes an indication of top data or data indicative of the last action associated with an order. Processing logic may combine object data with action data to determine a series of actions associated with an order. For example, order tracker may track a vehicle as the vehicle is routed through a drive-thru area. In another example, the order may track a meal preparation of an order within a meal preparation area.

c. Pacing determiner—Processing logic may receive object data (e.g., object data 332 from object detection model 314) and/or action data (e.g., action data 338 from action recognition model 316). Processing logic may determine pacing of various kitchen tasks associated with detected objects and/or actions. Pacing data time stamps associated with actions including one or more action durations. Pacing data may be aggregated into a broader statistical data such as an average time duration for an associated action. For example, not to be interpreted as an exhaustive list, the following could be pacing actions outputted by the processing logic: prepping dough, placing toppings, loading and/or unloading a pizza to/from an oven, cutting a pizza, refill ingredients, opening a restaurant, prepping sides, hand washing, using POS system, checking temperature, using the cooler/freezer, assembling a product, packaging a product, attending a phone call, processing an order, counting inventory, delivering food to customer, drive-thru queue, and so on.

d. Action determiner—processing logic receives image data as an input and outputs action data (e.g., action data 338). Processing logic identifies actions being performed in association with the received image data. For example, a series of images may show an employee performing an action such as scooping a sauce. Processing logic receives the series of images and identifies the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

e. Instance segmenter—Processing logic may receive image data (e.g., from the data acquisition system 302 through the feature extractor 312). Processing logic may segment images into discreet boundaries. For example, processing logic may receive an image, identify the boundaries of different ingredient containers (e.g., ingredient containers 112 of FIG. 1), and output the discretized ingredient containers as instance segmentation data. In some embodiments, processing logic may associate various segmented and/or discretized boundaries. For example, processing logic may receive object data that includes a detected hand and/or a detected cooking utensil. In another example, instance segmenter may receive an image, and identify the boundaries of one or more vehicle lanes disposed within a drive-thru area. In a further example, instance segmenter may associate lane through merging location of one or more lane into another lane.

f. Depth determiner—Processing logic identifies individual segmented objects (e.g., individual kitchen containers) from received image data. Process logic may receive sensor data indicative of a detected depth of an image (e.g., an image taken using a LIDAR camera). Processing logic may further receive object specification data (e.g., dimensions of kitchen containers (e.g., length, width, and depth)). From one or more of the described inputs, processing logic may determine the depth and/or fill level of contents of individual containers.

g. Pose classifier—Process logic receives image data and determines a pose of an employee. For example, processing logic may output pose data 344 indicative of locations and/or orientations of employees (e.g., hand, arms, body) and other kitchen equipment (e.g., utensils ovens, counters, etc.). In some embodiments, pose data is indicative of one or more locations of hands of employees in the presence of occlusions. For example, pose data may indicate a location and orientation of an arm that is visible in an image frame and determine the location and/orientation of a hand (e.g., that is not visible in an image frame).

h. Drive-thru object detector (e.g., vehicle or lane detector)—Processing logic can detect vehicles found within an image associated with a drive-thru area. For example, the drive-thru object detector may identify a license plate number, make and/or model of a vehicle, and/or other visual indicators associated with a vehicle. In another embodiments, the object detection model may determine a location of a vehicle based on a location within an image frame and/or based a relative location of other identifiable indicators in an image (e.g., lane marker, building boundaries, order kiosks, drive-thru windows, etc.) Vehicle data may include data indicating a location of an vehicle within a drive-thru area.

i. Order Vehicle Classifier—Order vehicle classifier can receive image data. The order vehicle classifier may determine associations between pending meal orders and vehicles disposed within a drive-thru area. For example, the order vehicle classifier may receive order data and image data to determine a proximity of a vehicle to an order placement location when an ordered is received/entered by a POS system. The associations between vehicles and meal orders may be output as pairing data.

j. Vehicle Tracker—Vehicle tracker can receive image data and track a detected vehicle over a series of images and identify a current location of the vehicles and/or historical tracking of the vehicle. In some embodiments, the vehicle tracker may also track pending meal orders using pairing data that pairs a vehicle with a pending meal order (e.g., at the time of ordering at a kiosk). For example, a vehicle may be tracked (e.g., using the pairing data) and associated with a pending meal order and as a result a meal order may be tracked. The vehicle tracker may track a route of a vehicle through a drive-thru area (e.g., through an order placement area, an order payment area, and an order delivery area).

In some embodiments, one or more of the above tasks are performed using rule-based logic rather than trained machine learning models. For example, depth determiner may determine depth based on sensor measurements and without the assistance of machine learning. In another example, order tracker may track orders and pacing determine may determine a pacing of orders based on the output of one or more machine learning models, but may not itself be a machine learning model. For example, order tracker may include rules on how to track orders based on received metadata from multiple frames of one or more video feeds.

One type of machine learning model that may be used is an artificial neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In objection detection, for example, the raw input may include one or more image frames indicative of a state of a meal preparation area including one or more meal preparation items; the second layer may compose feature data associated with a meal preparation area (e.g., appliance locations, kitchen floorplan, and/or layout, etc.); the third layer may include one or more meal preparation items a model is expecting to be disposed within the one or more image frames (e.g., one or more meal preparation items identified in one or more pending meal orders). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future received image frames and make predictions based on this continuous processing information. RNNs may be trained using a training dataset to generate a fixed number of outputs (e.g., to detect an amount of objects and/or actions associated with the image frames). One type of RNN that may be used is a long short term memory (LSTM) neural network.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset.

For the model training workflow 474, a training dataset containing hundreds, thousands, tens of thousands, hundreds of thousands, or more image frames (e.g., image data 475) should be used to form a training dataset. In embodiments, the training dataset may also include associated pending meal orders (e.g., order data 476). In embodiments, the training dataset may also include expected output data 496 (e.g., output data 330), for forming a training dataset, where each data point and/or associated output data may include various labels or classifications of one or more types of useful information (e.g., object detection, action detection, pose classification, pacing data, instance segmentation data, and so on). Each case may include, for example, one or more image frames and labels associated with one or more meal preparation items, poses and/or actions. This data may be processed to generate one or multiple training datasets 477 for training of one or more machine learning models. The machine learning models may be trained, for example, to detect objects and/or actions associated with the images, among other things.

In one embodiment, generating one or more training datasets 477 includes receiving one or more image frames indicative of a state of a meal preparation area. The labels that are used may depend on what a particular machine learning model will be trained to do. For example, to train a machine learning model to perform object detection, a training dataset 477 may include data indicative of meal preparation items (e.g., ingredients, appliances, meal preparations stations, etc.).

To effectuate training, processing logic inputs the training dataset(s) 477 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above. Training may be performed by inputting one or more of the image data 475, order data 476, and expected output data 496 into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction, and/or output that the machine learning model can produce.

Accordingly, the output may include one or more predictions or inferences. For example, an output prediction or inference may include a detected object associated with one or more image frames. Processing logic may then compare the predicted or inferred output to known labels of the one or more expected output data 496 (e.g., known objects associated with the image frames, known actions associated with the image frames, known outputs associated with the one or more image frames) that was included in the training data item. Processing logic determines an error (i.e., a classification error) based on the differences between the output of a machine learning model and the known classification (e.g., known objects, known actions, known pacing data, known poses, known segmented image data, known order tracking, etc.). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one embodiment, a machine learning model (e.g., object detector 481, order tracker 482, pacing determiner 483, action detector 484, instance segmenter 485, depth determiner 486, pose classifier 487) is trained to determine output data (e.g., object data 488, tracking data 489, pacing data 490, action data 491, instance segmentation data 492, depth data 493, pose data 494). A similar process may be performed to train machine learning models to perform other tasks such as those set forth above. A set of many (e.g., thousands to millions) image frames (e.g., image frames indicative of a state of a meal preparation area) may be collected and combined with order data (e.g., one or more pending meal orders associated with a current state of the meal preparation area) and expected output data 496 (e.g., known objects, known actions, know order tracking data, know pacing determinations, known segmented image data, known depth data, known pose classifications, etc.).

Once one or more trained machine learning models 478 are generated, they may be stored in model storage 479, and may be added to a kitchen management application (e.g., kitchen management component 118 on server 116 of FIG. 1). Kitchen management application may then use the one or more trained ML models 478 as well as additional processing logic to implement an automatic mode, in which user manual input of information is minimized or even eliminated in some instances.

In one embodiment, the one or more machine learning models are trained using data from one or multiple kitchens, and once trained may be deployed to other kitchens that may be different from those from which the training data was generated. In such an instance, a brief retraining may or may not be performed for one or more of the kitchens to tune the machine learning model for those kitchens. The brief retraining may begin with the trained machine learning model and then use a small additional training data set of data from a specific kitchen to update the training of the machine learning model for that specific kitchen.

In one embodiment, model application workflow 474 includes one or more trained machine learning models that function as one or more of an object detector 481, order tracker 482, pacing determiner 483, action detector 484, instance segmenter 485, depth determiner 486, and/or pose classifier 487. These logics may be implemented as separate machine learning models or as a single combined machine learning model in embodiments. For example, one or more of object detector 481, order tracker 482, pacing determiner 483, action detector 484, instance segmenter 485, depth determiner 486, and/or pose classifier 487 may share one or more layers of a deep neural network. However, each of these logics may include distinct higher level layers of the deep neural network that are trained to generate different types of outputs. The illustrated example is shown with only some of the functionality that is set forth in the list of tasks above for convenience. However, it should be understood that any of the other tasks may also be added to the model application workflow 495.

For model application workflow 495, according to one embodiment, input data 480 may be input into object detector 481, which may include a trained neural network. Based on the input data 480, object detector 481 outputs information (e.g., object data 488) indicative of objects associated with one or more image frames associated with a state of the kitchen. This may include outputting a set of classification probabilities for one or more objects of the object data 488. For example, processing logic may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like.

For model application workflow 495, according to one embodiment, input data 480 (e.g., one or more outputs of object detector 481 and/or location data associated with the object data 488) may be input into action detector 484, which may include a trained neural network. Based on the input data 480, action detector 484 outputs information (e.g., action data 491) indicative of actions associated with one or more image frames associated with a state of the kitchen. This may include outputting a set of classification probabilities for one or more actions of the action data 491. For example, action detector 484 may output the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

For model application workflow 495, according to one embodiment, input data 480 (e.g., outputs of one or more object detector 481, action detector 484), may be input into instance segmenter 485, which may include a trained neural network. Based on the input data 480, instance segmenter 485 outputs information (e.g., instance segmentation data 492) indicative of segmented image data of the received one or more image frames indicative of a state of the meal preparation area. For example, instance segmenter 485 may receive an image, identify the boundaries of different ingredient containers (e.g., ingredient containers 112 of FIG. 1), and output the discretized ingredient containers as instance segmentation data. In some embodiments, processing logic may associate various segmented and/or discretized boundaries. For example, instance segmenter 485 may receive object data that includes a detected hand and/or a detected cooking utensil. In another example, instance segmenter 485 may receive an image, and identify the boundaries of one or more vehicle lanes disposed within a drive-thru area. In a further example, instance segmenter 485 may associate lane through merging location of one or more lane into another lane.

For model application workflow 495, according to one embodiment, input data (e.g., ranging data, LIDAR data 480 may be input into depth determiner 486. Based on the input data 480, depth determiner 486 outputs information (e.g., depth data 493) indicative of detected depth of an image (e.g., an image taken using a LIDAR camera). Depth determiner 486 may further receive object specification data (e.g., dimensions of kitchen containers (e.g., length, width, and depth)). From one or more of the described inputs, the depth determiner 486 may determine the depth and/or fill level of contents of individual containers.

For model application workflow 495, according to one embodiment, input data 480 may be input into pose classifier 487, which may include a trained neural network. Based on the input data 480, pose classifier 487 outputs information (e.g., pose data 494) indicative of locations and/or orientations of employees (e.g., hand, arms, body) and other kitchen equipment (e.g., utensils, ovens, counters, etc.) In some embodiments, pose data is indicative of one or more locations of hands of employees in the presence of occlusions. For example, pose data may indicate a location and orientation of an arm that is visible in an image frame and determine the location and/orientation of a hand (e.g., that is not visible in an image frame).

For model application workflow 495, according to one embodiment, input data 480 may be input into order tracker 482. Based on the input data 480 (e.g., one or more outputs of object detector 481, action detect 484, pose classifier 487), order tracker 482 outputs information (e.g., tracking data 489) indicative of one or more order associations, locations, and/or statuses associated with one or more image frames indicative of a state of the kitchen. This may include outputting a set of order tracking classification probabilities for one or more objects of the object data 488. For example, there may be probabilities associated with detected associations, statuses, and/or locations of a currently pending order currently being prepared. For example, processing logic may output tracking data that includes an indication of top data or data indicative of the last action associated with an order. For example, processing logic may combine object data with action data to determine a series of actions associated with an order.

For model application workflow 495, according to one embodiment, input data 480 (e.g., one or more outputs of object detector 481, action detect 484, order tracker 482), may be input into pacing determiner 483. Based on the input data 480, pacing determiner 483 outputs information (e.g., pacing data 490) indicative of a pace of one or more meal preparation procedures. For example, not to be interpreted as an exhaustive list, the following could be pacing actions outputted by the processing logic: prepping dough, placing toppings, loading and/or unloading a pizza to/from an oven, cutting a pizza, refilling ingredients, opening a restaurant, prepping sides, hand washing, using a POS system, checking temperature, using the cooler/freezer, assembling a product, packaging a product, attending a phone call, processing an order, counting inventory, delivering food to customer, drive-thru queue, and so on.

Figure 5A:
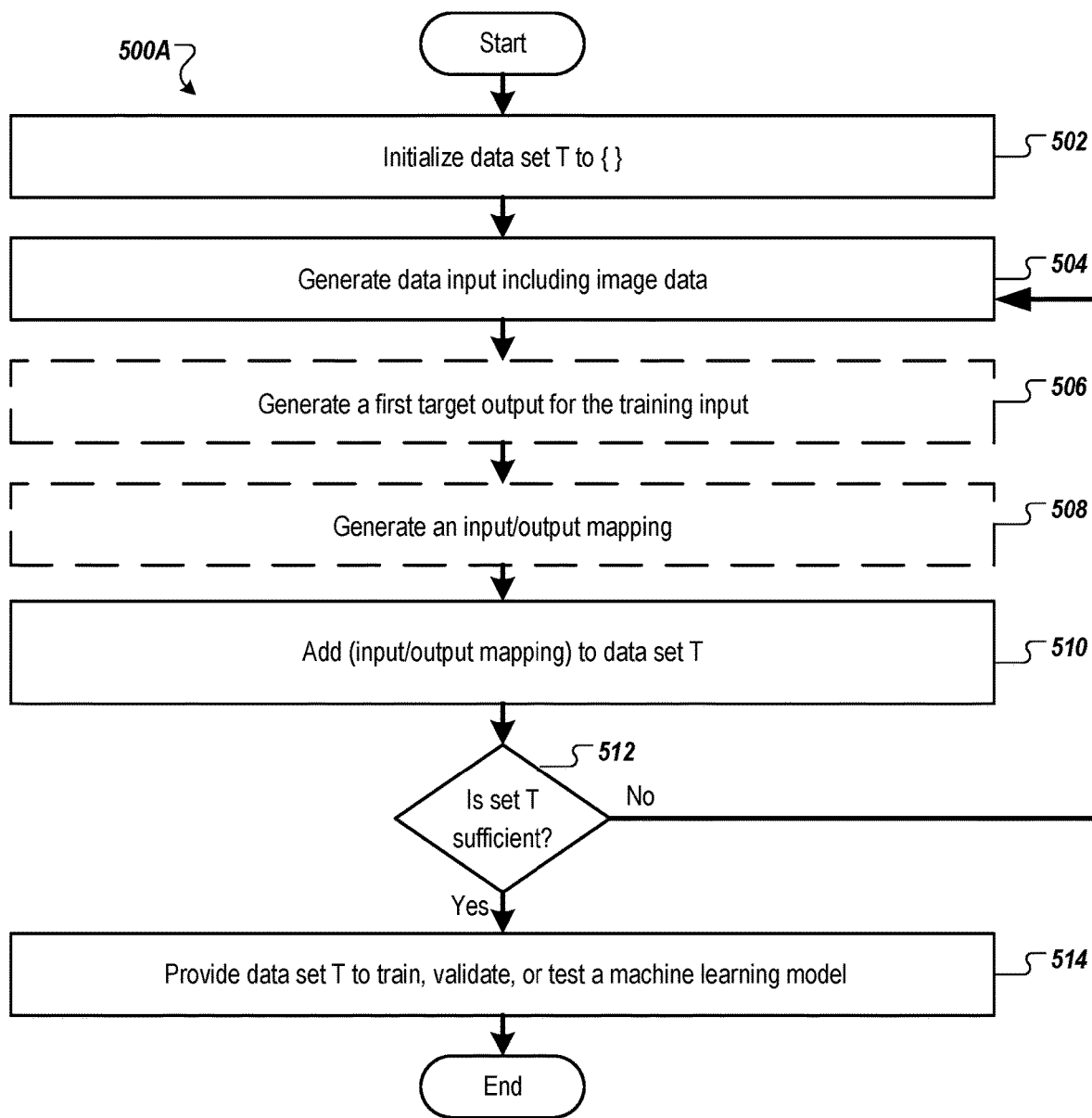
FIGS. 5A-C are flow diagrams of methods associated with processing image-based data, in accordance with some implementations of the present disclosure.
Figure 5B:
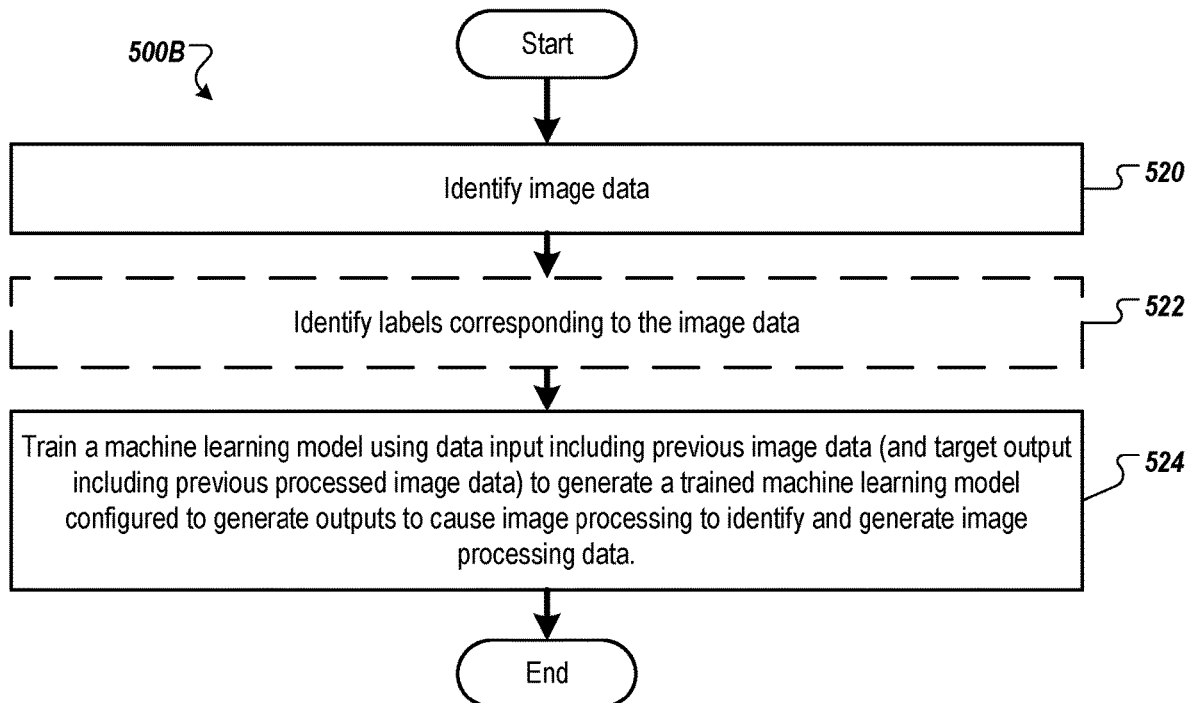
Figure 5C:
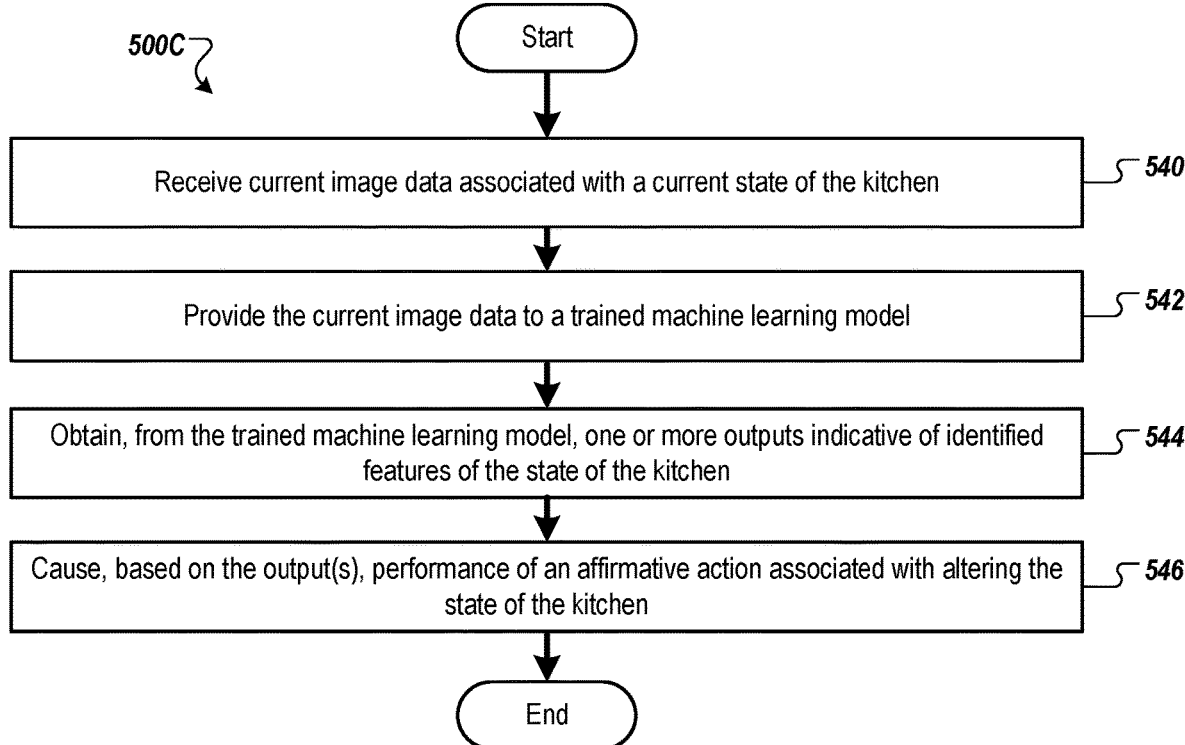

FIG. 5A-C are flow diagrams of methods 500A-C associated with processing image-based data, in accordance with some implementations of the present disclosure. Methods 500A-C may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500A may be performed, in part, by machine learning system 210 (e.g., server machine 270, data set generator 272, etc.). Machine learning system 210 may use method 500A to at least one of train, validate, or test a machine learning model, in accordance with embodiments of the disclosure. In some embodiments, one or more operations of method 500A may be performed by data set generator 272 of server machine 270 as described with respect to FIGS. 2 and 4A. In some embodiments, methods 500B-C may be performed, in part, by machine learning system 210 (e.g., kitchen management server 212, kitchen management component 214, etc.). Machine learning system 210 may use method 500B to train a machine learning model, in accordance with embodiments of the disclosure. Machine learning system 210 may use method 500C to use a trained machine learning model, in accordance with embodiments of the disclosure. In some embodiments, one or more operations of methods 500B-C may be performed by kitchen management component 214 of kitchen management server 212 as described with respect to FIGS. 2 and 4B. It may be noted that components described with respect to one or more of FIGS. 1, 2, 3, 4A-B may be used to illustrate aspects of FIGS. 5A-C. In some embodiments, a non-transitory storage medium stores instructions that when executed by a processing device (e.g., of machine learning system 210) cause the processing device to perform methods 500A-C.

For simplicity of explanation, methods 500A-C are depicted and described as a series of acts. However, acts in accordance with this disclosure can occur in various orders, concurrently, in parallel with multiple instances per store, and/or with other acts not presented and described herein.

Furthermore, not all illustrated acts may be performed to implement the methods 500A-C in accordance with the disclosed subject matter. In addition, those skilled in the art will understand and appreciate that the methods 500A-C could alternatively be represented as a series of interrelated states via a state diagram or events.

Referring to FIG. 5A, method 500A is associated with generating a data set for a machine learning model for processing images to generate outputs 330.

At block 502, the processing logic implementing method 500A initializes a training set T to an empty set.

At block 504, processing logic generates first data input (e.g., first training input, first validating input) that includes image data (e.g., image frames captured using cameras 108A-C).

In some embodiments, at block 506, processing logic generates a first target output for one or more of the data inputs (e.g., first data input). The first target output may be, for example, object data 332, pacing data 334, tracking data 336, action data 338, etc. The processing logic may generate the target output based on the image data 252.

At block 508, processing logic optionally generates mapping data that is indicative of an input/output mapping. The input/output mapping (or mapping data) may refer to the data input (e.g., one or more of the data inputs described herein), the target output for the data input (e.g., where the target output identifies output data 266), and an association between the data input(s) and the target output. Processing logic may perform gradient descent and back propagation to update weights for nodes at one or more layers of a machine learning model, for example.

At block 510, processing logic adds the data input generated at block 504 and/or the mapping data generated at block 508 to data set T.

At block 512, processing logic branches based on whether data set T is sufficient for at least one of training, validating, and/or testing machine learning model 290. If so, execution proceeds to block 514, otherwise, execution continues back at block 504. In some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 514, processing logic provides data set T (e.g., to server machine 280) to train, validate, and/or test machine learning model 290. In some embodiments, data set T is a training set and is provided to training engine 282 of server machine 280 to perform the training. In some embodiments, data set T is a validation set and is provided to validation engine 284 of server machine 280 to perform the validating. In some embodiments, data set T is a testing set and is provided to testing engine 286 of server machine 280 to perform the testing. In the case of a neural network, for example, input values of a given input/output mapping (e.g., numerical values associated with data inputs 401) are input to the neural network, and output values (e.g., numerical values associated with target outputs 403) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 514, machine learning model (e.g., machine learning model 290) can be at least one of trained using training engine 282 of server machine 280, validated using validating engine 284 of server machine 280, or tested using testing engine 286 of server machine 280. The trained machine learning model may be implemented by kitchen management component 214 (of kitchen management server 212) to generate output data 330 for further use by kitchen management procedures (e.g., order accuracy tool 222, anticipatory preparation tool 224, gamification tool 226, drive-thru management tool 228, and/or limited time offer tool 229.

Referring to FIG. 5B, method 500B is associated with training a machine learning model for processing images to generate outputs (e.g., ML model outputs 264) that are actionable by a kitchen management component.

At block 520, processing logic identifies image data associated with a state of a kitchen. The image data may be acquired through cameras (e.g., cameras 108A-C). The sets of image data (e.g. image data 252) may be historical data corresponding images indicative of a past or previous state of the kitchen.

In some embodiments, at block 522, processing logic identifies labels corresponding to the image data. In some embodiments, the labels indicate object data (e.g., detected object in the image), pacing data (e.g., paces of action, recipes, food preparation steps, etc.), tracking data (e.g., tracking order through multiple images), location data (e.g., where a detected object or action is taking place), depth data (e.g., amount of ingredient left in a bin), and/or top data (e.g., the last action to be performed on a recipe).

At block 524, processing logic trains a machine learning model using data input including the image data (e.g., and target output including the labels) to generate a trained machine learning model configured to generate outputs (e.g., kitchen state data) that can be consumed by kitchen management application and/or tools.

In some embodiments, the machine learning model is trained based on data input (e.g., without target output) to generate a trained machine learning model using unsupervised learning (e.g., to cluster data). In some embodiments, the machine learning model is trained based on data input and target output to generate a trained machine learning model using supervised learning.

Referring to FIG. 5C, method 500C is associated with using a machine learning model for processing images to generate outputs (e.g., ML model outputs 264) that are actionable by a kitchen management component.

At block 540, processing logic receives current data. In some embodiments, the current data is image data associated with a current state of the kitchen and/or drive-thru. In some embodiments, the current data images including LIDAR data. The current data may include current frames of video captured by one or more cameras of a kitchen, for example.

At block 542, processing logic provides the current data (e.g., image data) to a trained machine learning model. The trained machine learning model may be trained by method 500B.

At block 544, processing logic obtains, from the trained machine learning model, one or more outputs. In some embodiments, the outputs include object data (e.g., object data 332), pacing data (e.g., pacing data 334), tracking data (e.g., tracking data 336), action data (e.g., action data 338), instance segmentation data (e.g., instance segmentation data 340), depth data (e.g., depth data 342), and/or pose data (e.g., pose data 344). At block 546, processing logic sends the generated outputs to an associated kitchen management subsystem. For example, processing logic may send the outputs to one of an order accuracy tool 222, anticipatory prep tool 224, gamification tool 226, drive-thru management tool 228, and/or limited time offer tool 229 as described in FIG. 2.

Figure 6:
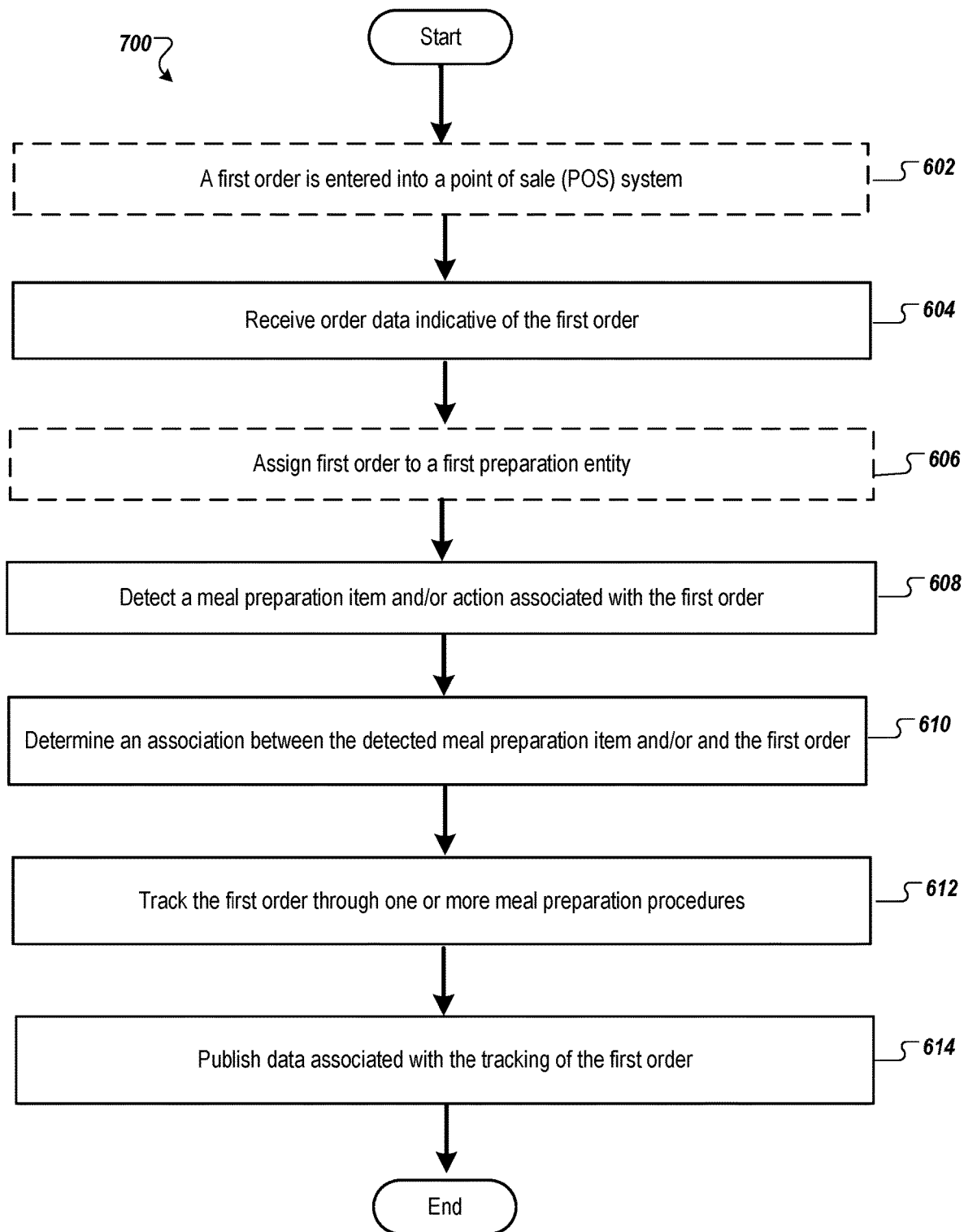
FIG. 6 depicts a flow diagram of one example method for assembly of an order throughout one or more meal preparation procedure, in accordance with some implementations of the present disclosure.

FIG. 6 depicts a flow diagram of one example method 600 for assembly of an order throughout one or more meal preparation procedures, in accordance with some implementations of the present disclosure. Method 600 is performed by processing logic that may comprise hardware (circuitry, dedicated logic, etc.), software (such as is run on a general purpose computer system or a dedicated machine), or any combination thereof. In one implementation, the method is performed using image processing tool 310 (e.g., tracking model 324) and/or kitchen management tool 350 (e.g., order accuracy tool 222, order accuracy logic 352) of FIG. 3, while in some other implementations, one or more blocks of FIG. 6 may be performed by one or more other machines not depicted in the figures.

At block 602, a first order is, optionally, entered into a point of sale (POS) system. The POS system may include one or more features and/or descriptions associated with POS system 102 and/or data integration system 202 of FIG. 1 and FIG. 2, respectively. In some embodiments, the first order is entered into the POS system by an employee interface (e.g., a register with POS interface capabilities). For example, order may be received in a lobby of a restaurant. In another example, order may be received through at a drive-thru. In some embodiments, the first order may be received electronically from a location a distance away from an associated restaurant.

At block 604, processing logic may receive order data indicative of the first order. The order data may include a list of one or more meal components to prepare and/or one or more meal preparation procedures to perform to complete the first order. In some embodiments, processing logic is integrated with a kitchen display system (KDS). For example, the first order may be displayed on the KDS, responsive to receiving the data indicative of the first order.

At block 606, processing logic, optionally, may assign the first order to a first preparation entity. The meal preparation area may operate with a one-to-one relationship between orders and meal preparation areas. For example, an order may be received and proceed through an assembly line of procedures before being completed where each order is filled sequentially one after another. The first order may be assigned to a first meal preparation station and/or meal preparation order and may be reassigned to another preparation entity and upon processing logic detecting completion of one or more meal preparation procedures. For example, the order may be presented to a first preparation station where a first meal preparation procedure is performed (e.g., preparing pizza dough), and then transferred to a second preparation station where a second meal preparation procedure is performed. In some embodiments, the POS may provide data to a kitchen display indicating information associated with an order. For example, the POS may indicate an order number and the contents of the order to the KDS.

In some embodiments, one or more actions may be detected. Processing logic may determine compound actions based on detecting the one or more actions. For example, processing may track a hand and detect the hand picking up an ingredient, tracking the hand, and then detecting the hand putting down the ingredient. Processing logic may string the action together and determine a compound action of relocating the ingredient from a first location to a second location. The series of multiple frame may occur across multiple image frames. For example, Pose data (e.g., pose data 344) may include data indicative of a pose of an employee. Pose data may include poses and/or gestures of people and/or their body parts, such as hands in specific positions associated with certain actions. Pose data may include an indication of the location and current position of a hand of the employee. For example, pose data may be associated with an action being performed (e.g., an employee scooping a first ingredient).

At block 608, processing logic may detect a meal preparation item or action associated with the first order. Processing logic may detect a first meal preparation item (e.g., pizza dough). Processing logic may detect movement of a meal preparation item to another meal preparation station and/or proximity to employee to perform a second meal preparation procedure (e.g., applying toppings to the pizza dough).

At block 610, processing logic may determine an association between the detected meal preparation item and/or action and the first order. Processing logic may associate an order with a preparation entity (e.g., an employee, preparation station) with the detected meal preparation item and/or action. For example, an employee proximate the detected meal item may be associated with preparing the first order (e.g., an employee who is actively contacting pizza dough may be associated with preparing an order associated with the instance of pizza dough).

In some embodiments, a state of the kitchen may include having more than one pending meal order. Orders may be assigned as they come in and newly detected objects may be compared against one or more pending meal order that have not been assigned to one or more meal preparation items, stations, and/or employees. For example, a state of the kitchen may include 6 pending meal orders currently being prepared. Processing logic can determine based on what meal preparation items have left the meal preparation area (e.g., delivered to a customer), whether one or more of the pending meal orders has been fulfilled. Based on the orders that remain unfulfilled, a detected meal preparation item or action may be associated with one or more of the unfulfilled pending meal orders.

In some embodiments, matching a detected meal preparation item and/or meal preparation action may include comparing a set of components of a first order to the detected meal preparation item. One of the set of components of the first order may have been associated with a previously prepared meal preparation item. For example, a hamburger may be detected. Another hamburger may have previously detected and assigned to a first order. The hamburger may be assigned to a second order based on the first order already assigned the first hamburger. In some embodiments, a distance algorithm (Euclidean distance, Cosine distance, etc.) may be used with data (metadata, embedded feature vectors, etc.) indicative of one or more detected meal preparation items and/or meal preparation actions to determine a proximity between the one or more detected meal preparation items and/or meal preparation actions. Processing logic may assign an order most proximate (e.g., feature vectors determined to be closest) to the one or more detected meal preparation items and/or actions.

In some embodiments, orders are assigned during the assembly of the one or more components at the end of the one or more meal preparation procedures. For example, at the conclusion of meal preparation the one or more meal components are assembled (e.g., packaged in a common container (e.g., bag)). As will be discussed in later embodiments, processing logic may compare an order prepped for delivery (e.g., at a bagging area where components of an order are compiled together in a bag) with a list of pending meal orders to determine one or more errors in the completed order. For example, processing logic may determine an absence of a meal preparation item based on a comparison between a detected meal prepped for delivery and the one or more pending meal orders.

In some embodiments, it may be determined from image data that an order (or subset of an order) is completed. Processing logic may compare the completed order (or subset of the order) against order data and determine whether the completed order (or subset of the order) is identified with one or more of the pending order of the order data. For example, processing logic may determine an employee is packaging a cheeseburger. For example, processing logic may search the order data and determine whether a cheeseburger is found within one of the pending meal orders. As will be discussed further in association with FIG. 8, processing logic may determine a meal preparation error, for example, by failing to identify a cheeseburger within the pending meal orders. For example, a field of view of a camera may include a food delivery area to a drive-thru. An order may be tracked as components are placed into a bag. Processing logic can track which items are placed in the bag and track the bag as it is delivered to a customer. Processing logic can determine errors associated with food delivery. The items associated with each bag may be accounted for as the one or more bags are delivered to a customer within a vehicle. Processing logic may detect a customer leaving and indicate one or more meal preparation items that were missing from the delivered meal.

At block 612, processing logic tracks the first order through one or more meal preparation procedures. Processing logic may continue to track the pending meal order through a meal preparation area by detecting relocation of one or more meal preparation items associated with the first order and detecting further meal preparation procedures (e.g., cooking the pizza, boxing the pizza, delivering the pizza, etc.).

In some embodiments, tracking of meals within the restaurant occurs frame by frame as the one or more meal preparation items relocates within the meal preparation area. Alternatively or additionally, meals may be tracked based on predicted actions to be performed. Processing logic may predict a time duration a meal preparation item may be occluded from a view of a camera. Processing logic may predict a future location of a meal preparation item. For example, a current meal may include instructions to cook a first item for a first duration and processing logic may predict the first item may be disposed proximate a cooking appliance. In a further example, processing logic may infer that first item may be occluded from the view of the camera when placed inside the cooking appliance. Processing logic may also determine a future location of the first item after cooking is completed (e.g., a pizza oven may have a first location to input the item and a second location to output the item). Processing logic may infer the absence of object detections of the first item for a duration and may infer the present of object detections of the first item a second location (e.g., output from the oven).

In some embodiments, processing logic tracks a "top" action and/or meal preparation item. A "top" item/action may indicate the meal preparation item and/or meal preparation action most recently associated with a meal being prepared. Often the top meal preparation item is located on top of a meal currently being prepared. For example, an employee may add a hamburger to a bun. The hamburger may be the top meal preparation item. An employee may add tomato to the burger. The tomato may then be the top meal preparation item. The top meal item may be tracked over the course of preparing a meal order to determine any meal preparation errors. In some embodiments, preparing one or more pending meal orders may include performing actions in a specific order. Tracking what action and/or meal item on top allows for processing logic to determine meal preparation errors associated with ordering of meal preparation steps.

In some embodiments, processing logic tracks an order based on actions associated with pose data (e.g., pose data 344 of FIG. 3). As previously described, pose data may include detecting the location of hands and meal preparation tools (e.g., scooping utensil) and making associations between the detected hands and meal preparation tools. In some embodiments, processing logic may determine a meal preparation tool (e.g., a serving utensil, a meal delivery tool, etc.) based on the image data. For example, a serving spoon may be identified. Processing logic may determine an association between one or more pending meal order and a preparation entity. For example, based on the image data, processing logic may determine an association between a serving spoon and a first employee responsive to detecting a proximity between the employee and the serving spoon (e.g., the employee is hold the serving spoon).

Processing logic may determine an association between a meal preparation item or meal preparation action and the preparation entity. For example, the employee may scoop a first ingredient into a bowl associated with a meal order. The employee may then be associated with preparing the meal order. Processing logic may assign or otherwise associate the employee with the meal order.

In some embodiments, processing logic tracks a list of ingredients and some metadata about those ingredients. The metadata may include actions and timestamps associated with the list of ingredients. For example, the metadata may include a location of where the ingredient was added and a timestamp when they were added to a meal being prepared. Metadata may also indicate a state of the ingredient. For example, an ingredient may be occluded (e.g., the ingredient is packaged or placed in a bag). The metadata may include instructions for processing logic to continue tracking an object when an ingredient changes state (e.g., placed into a bag).

At block 614, processing logic may publish data associated with the tracking of the first order. The published data may be used by one or more kitchen management processes. For example, order accuracy logic (e.g., order accuracy logic 352 of FIG. 3), anticipatory prep logic (e.g., anticipatory prep logic 354 of FIG. 3), gamification logic (e.g., gamification logic 356 of FIG. 3), drive-thru management logic 358 of FIG. 3), and/or limited time offer logic (e.g., limited time offer logic 360 of FIG. 3) may utilize the published order tracking data.

The data may include a list of ingredients, actions, timestamps, and/or other information associated with an order. The data may be used by pacing logic (e.g., pacing model 334 or method 700 of FIG. 7) to further determine pacing data (e.g., pacing data 322) based on the published data. For example, the published data may include a tabulation of all actions that were performed on an order at different time and which objects were detected for that order at different times. The published data may also include data indicative of identified image frames and locations within the image frames where detections (e.g., actions, objects, etc.) occurred (e.g., pixel locations). The data may include instructions for a display device to highlight or otherwise indicate where detections are being made on one or more image frames.

In some embodiments the published data can be accessible by an endpoint device such as a client device (e.g., client device 207 of FIG. 2) or kitchen display system (e.g., KDS 104 of FIG. 1). An endpoint device can receive a video feed for one or more particular orders. For example, a particular order may be requested (e.g., order number 'x' on a given day). The published data may include image data (e.g., a video stream) of the detections made by the processing logic over the course of preparing that particular meal. The published data may include a list of timestamps that are associated with that particular order. The image data may include a segmented video stream with image data spliced together of the timestamps where one or more detections are made by the processing logic.

Figure 7:
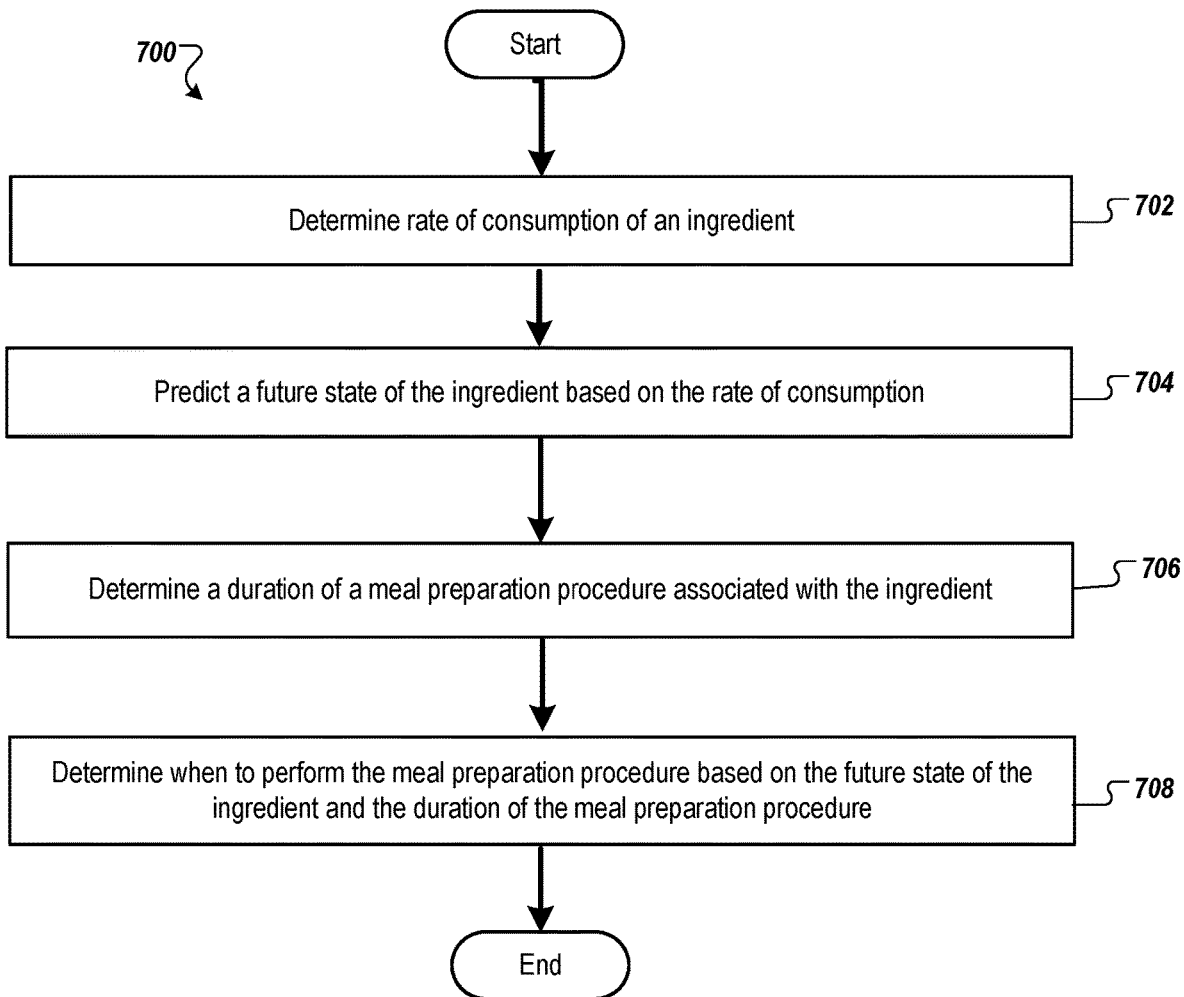
FIG. 7 depicts a flow diagram of one example method for processing one or more image data to determine pacing data, in accordance with some implementations of the present disclosure.

FIG. 7 depicts a flow diagram of one example method 700 for processing one or more image data to determine pacing data, in accordance with some implementations of the present disclosure. Method 700 may be performed by processing logic that may comprise hardware (circuitry, dedicated logic, etc.), software (such as is run on a general purpose computer system or a dedicated machine), or any combination thereof. In one implementation, the method is performed using image processing tool 310 (e.g., pacing model 322) and/or kitchen management system 220 (e.g., order accuracy tool 222, anticipatory prep tool 224, gamification tool 226, drive-thru management tool 228) of FIG. 3 and FIG. 2, respectively, while in some other implementations, one or more blocks of FIG. 7 may be performed by one or more other machines not depicted in the figures.

At block 702, processing logic may determine a rate of consumption of an ingredient. In some embodiments the rate of consumption includes an inventory forecast over an upcoming time duration. Processing logic may receive a current quantity of the ingredient. For example, methodology associated with FIGS. 9 and 12 may be used to determine a volume of an ingredient with the bin and determine an overall quantity of an ingredient. Processing logic may use a historical rate of change of the ingredient to determine the rate of consumption of the ingredient. For example, process logic may receive past image frames and determine actions associated with the ingredient and how much of an ingredient is being used with each action.

In some embodiments, customer flow data may be received by processing logic and used to determine the rate of consumption of the ingredient. For example, processing logic may determine an average consumption of the ingredient per order (e.g., 70% of orders order a meal item with the first ingredient, or on average 1.2 units of the first ingredient are consumed per order) and predict using customer flow data (e.g., amount of people and/or cars entering an order placement area) how many upcoming orders are expected over an upcoming time duration. In some embodiments, image data including one or more image frames indicative of a quantity of cars in the drive-thru or order queue line may be leveraged to determine the customer flow data.

At block 704, processing logic may predict a future state of the ingredient based on the rate of consumption. The future state may be indicative of consuming a first prepared ingredient. The first ingredient may include one or more preparation steps. For example, fries may need to be cut, cooked, salted and the future state may be associated with the consumption of the prepared fries. The future state may be indicative of the consumption of a first ingredient within a first container. For example, a first container may include a condiment that whose quantity within the first container is consumed. The condiment may or may not require additional preparation steps to replace an inventory of the condiment disposed within the first container. The future state of the ingredient may be associated with an expiration or a time duration associated with a time of use deadline. For example, after a predicted time, a first ingredient should be replaced to prevent expiration of the ingredient.

At block 706, processing logic may determine a duration of a meal preparation procedure associated with the ingredient. As previously described, image data may be received and processing logic may detect one or more action outputs from one or more image frames. The one or more action outputs may be associated with a start and/or end time of an action. The start and end time of an action may be indicative of how long an action has occurred. Processing logic may query multiple image frames to determine an average action duration. The average action duration may take into account the state of the kitchen or a predicted future state of the kitchen. For example, processing logic may determine a number of employees currently available to perform the action, resource commitments to other actions (e.g., an oven being used by another meal preparation procedure), an inventory forecast (e.g., a quantity of available resources or a prediction of a future quantity of an available resource), prerequisite actions (e.g., a pan must first be cleaned to be used to cook an ingredient, chicken must be battered before cooked). In some embodiments, the duration of the meal preparation action is a time duration for a compound action (e.g., an action requiring multiple steps).

In some embodiments, the meal preparation procedure may include preparing a meal preparation tool associated with the ingredient. For example, preheating an oven, cleaning equipment, preparing secondary ingredients, and so on is associated with the meal preparation procedure and may be attributed to a portion of the duration of the meal preparation procedure.

At block 708, processing logic may determine when to perform the meal preparation procedure based on the future state of the ingredient and the duration of the meal preparation procedure. In some embodiments, the meal preparation procedure is displayed on a graphical user interface (GUI). For example, processing logic may determine that the preparation of a first quantity of fries should be initiated within a future time window (e.g., 5-10 minutes). The instruction to initiate preparation of the French fried may be displayed on a KDS (e.g., KDS 104 of FIG. 1).

In some embodiments, pacing data (e.g., a duration of a meal preparation procedure determined at block 706) may be used in associated with order tracking methodology (e.g., method 600 of FIG. 6) to determine pacing data associated with one or more orders as they are assembled. A time duration of one or more steps of order preparation may be tabulated and aggregated into pacing data associated with an example. For example, a time duration for making a hamburger from start to finish may be aggregated by adding up the action times of the individual steps. For example, metadata stored in association with an order may store and aggregate pacing data (e.g., timestamps of actions performed, list of meal preparation steps, etc.).

In some embodiments, pacing data may be used to perform inventory forecasting for an operational duration of the kitchen. For example, processing logic may determine a number of bins of a first ingredient to prepare at the beginning of a day. Processing logic may determine whether the inventory prepared in the morning will last the entirety of the day and if more inventory of the first ingredient needs to be prepared. Processing logic may predict a future time associated with the first ingredient being consumed and a future time in which a meal preparation action should be performed to maintain an active prepared inventory of the first ingredient throughout the day. In some embodiments, the inventory forecasting determined by the processing device may be based on macroscopic changes in the inventory (e.g., a rate of inventory consumption through a minimum threshold window). For example, sudden changes in inventory over a smaller window of time (e.g., microscopic) inventory change may be calculated with many small windows of time to get an average macroscopic inventory rate of consumption.

In some embodiments, processing logic publishes pacing data (e.g., one or more action durations, rate of consumptions, meal preparation time durations, etc.) for other processing logic to utilize. In some embodiments, the pacing data may include data associated with a testing pacing of various meal preparation actions and can be sorted and organized associated with an employee, an action, a meal item, etc. An endpoint may access the pacing data and/or query the pacing data using one or more of these pacing data associations. For example, the pacing data may be filtered by pacing of actions performed by a first employee, actions performed at a first preparation station, actions performed in associated with a specific order, among other filtering limitations. In some embodiments, the pacing data may be aggregated from many actions to provide a broader statistical representation of one or more meal preparation actions associated with the kitchen. For example, a time duration between filling sequential orders of orders within a requested time period may be accessed. In another example, the pacing analytics can be filtered more granularly. Pacing data for a specific action (e.g., scooping the chicken and/or sprinkling the lettuce) may be determined for the orders that occurred within the requested time period. The pacing data may be filtered and aggregated to form data selected flexible data analytics associated with the state of the kitchen as various timestamps throughout operation.

In some embodiments, process logic may associate the pacing data with financial data. Processing logic may determine a financial cost associated with one or more meal preparation actions durations. For example, an action duration may be compared with one or more of an employee hourly rate, inventory cost, equipment operation costs, and/or the like in determining a cost to perform an action. Processing logic may determine one or more revenue and profits determinations associated with one or more meal preparation actions based on an aggregation of financial costs of individual actions (e.g., determining a first action costs x amount of money based on determining the time is takes and the employee hourly cost). Pacing data associated with one or more meal preparation items may be indicative of one or more meal preparation dependencies. For example, pacing data of one or more action steps may be indicative of a bottleneck associated with one or more meal preparation items and/or actions. A set of actions may be delayed based on equipment limitations (e.g., awaiting an oven to be available), and/or ingredient preparation instructions (e.g., topping a pizza is delayed due to awaiting the ingredients to be prepped to top the pizza, and the like).

Figure 8:
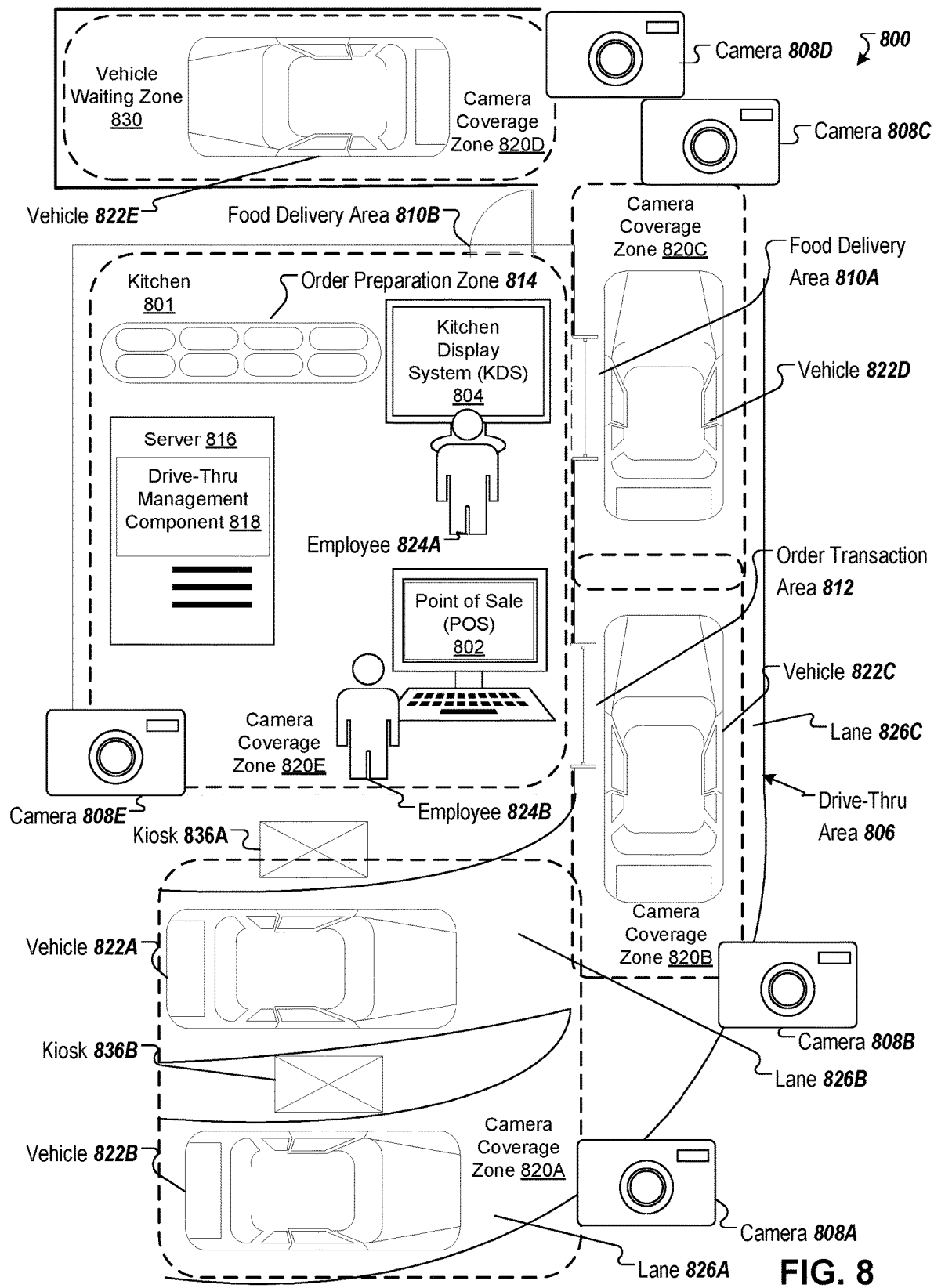
FIG. 8 depicts and drive-thru management system, in which implementations of the disclosure may operate.

FIG. 8 depicts a drive-thru management system 800, in which implementations of the disclosure may operate. A shown in FIG. 8, the drive-thru management system 800 may be associated with a kitchen 801 and/or drive-thru area 806. In embodiments, the drive-thru management system 800 corresponds to drive-thru management system 228, drive-thru management server 213 and/or drive-thru data acquisition system 295 of FIG. 2. The kitchen 801 may include an order preparation zone 814 where food and/or drinks are prepared. For example, the food and/or drinks can be associated with an order (e.g., received using kiosk(s) 836A-B). The kitchen may include a kitchen management system, such as kitchen management system 100 of FIG. 1 in embodiments. The kitchen management system may interface with the drive-thru management system 800 to manage a kitchen and/or a drive-thru concurrently. In some embodiments, the kitchen management system and the drive-thru management system 800 are integrated into a single system.

The drive-thru management system 800 may include a drive-thru area 806. The drive-thru area 806 may include one or more lanes 826A-C that guides vehicles 822A-D through a meal ordering, payment, and/or delivery procedures. In some embodiments, the drive-thru area 806 may include multiple lanes (e.g., lanes 826A-C) associated with multiple routes through the drive-thru area 806. For example, each lane 826A-C may be associated with an individual kiosk 836A-B for entering an order into the drive-thru management system 800. In some embodiments, one or more lanes (e.g., 810A-B) may merge into a combined lane (e.g., 810C). For example, the drive-thru area may include one or more order placement areas, order transaction areas, and/or order delivery areas and one or more lanes may route a vehicle through one or more combinations of these described areas. In one embodiment, a drive-thru area includes multiple order placement areas arranged in parallel, each associated with a different lane, and one or more order delivery areas arranged serially in a single merged lane.

As shown in FIG. 8, the drive-thru area 806 may include one or more kiosk(s) 836A-B. The kiosk(s) 836A-B may include a communication device to receive orders from customers (e.g., within vehicles) from the drive-thru area 806. The kiosk(s) may be coupled to one or more cameras 808A-E, as will be discussed further, and capture one or more image frames indicative of a state of the drive-thru area 806. In some embodiments, such as those with multiple lanes 826A-C disposed within a drive-thru area 806, the drive-thru area 806 may include multiple kiosks 836A-B that may each be associated with a corresponding lane 826A-C. The kiosk(s) 836A-B may include an order display device. The order display device may include a display showing various meals capable of being prepared within the kitchen 801. The order display device may be capable of dynamic updating. For example, the order display device may include a digital menu display that is capable of receiving data and updating one or more elements on the display. For example, an update to the order display device may include updates to positioning and/or sizing of a displayed elements, alignment of the one or more displayed elements, spacing between other displayed elements, and/or visibility of one or more displayed elements. In another example, the order display device may receive an update associated with an updated price of a meal item or combination of meal items and display the update in an updated menu display configuration (e.g., showing the updated price).

As shown in FIG. 8, the drive-thru area 806 may include an order transaction area 812. The order transaction area 812 may include and/or otherwise be associated with a point of sale (POS) system 802. The POS system 802 may include one or more devices that carry out day-to-day restaurant operations and functionality. For example, the POS system 802 may include an order input device such as a computer and/or register used to enter data associated with upcoming orders. In some embodiments, the POS system 802 includes information associated with each of the menu items. For example, POS system 802 may include ingredient lists, preparation and assembly instructions, prices, and the like for one or more menu items.

The order transaction area 812 may facilitate payment of a pending meal order associated with a vehicle. The order transaction area 812 may include a window that permits delivery of a method of payment to the POS system 802 (e.g., through an employee 820A-B operating the order transaction area 812).

In some embodiments, the order transaction area 812 may include a display that depicts one or more payment elements. For example, the display may depict elements of a current meal order including one or more meal items and associated prices including a total price. The display may include displaying data that identifies the order on an external endpoint device. For example, the display may show a barcode (e.g., such as a quick response (QR) code) that may be registered by an endpoint device associated with a user account indicative of the customer and customer vehicle (e.g., using an app on a customer's phone). Payment of an associated pending meal order may be performed using the endpoint device. In some embodiments, as discussed in greater detail below, vehicles may be associated with particular orders and the vehicles may be tracked as they progress through the drive-thru. A QR code associated with an order associated with a particular vehicle may be automatically displayed on the display when that vehicle has a predetermined position relative to the display (e.g., a window or mirror of the vehicle is within a threshold proximity of the display. The customer may then scan the QR code with their mobile device to pay for their order.

In some embodiments, the kitchen may include an notification device (KDS 804) that alerts one or more employees 824A-B a vehicle 822A-E is arriving at an order kiosk 836A-B and to be prepared and ready to take and fill the upcoming order.

In some embodiments, the order transaction area 812 may include a signal transmission device capable of broadcasting data (e.g., a near field communication (NFC) signal) indicative of a pending meal order associated with a vehicle proximate the order transaction area 812. An endpoint device associated with the vehicle may be used to receive the signal (e.g., scan the signal) and apply payment process methodology associated with the endpoint device. For example, a customer may be routed to the order transaction area 812 and when the associated vehicle is proximate the order transaction area 812 a signal (e.g., NFC) may be used to communicate the order data to an endpoint device (e.g., a customer cell phone). The endpoint device may include one or more processing logic (e.g., a restaurant or order transaction application) capable of processing the order data and facilitating payment of the associated pending meal order.

As shown in FIG. 8, the drive-thru area 806 may include food delivery area(s) 810A-B. A food delivery area 810A may include a window or other such device capable of enabling delivery of a prepared meal order from kitchen 801 to a vehicle within the drive-thru area 806. In some embodiments, the order transaction area 812 and the food delivery area 810A are combined into a single area.

In some embodiments, the drive-thru management system 800 may include a vehicle waiting zone 830 (e.g., a vehicle waiting bay). One of food delivery area(s) 810A-B may be associated with the vehicle waiting zone 830. In some embodiments, a first meal delivery area (e.g., 810A) may be associated with a primary meal delivery area or an area that services a statistical majority of the meal orders and a second meal delivery area (e.g., 810B) may be associated with a secondary (e.g., or an alternative meal delivery area) meal delivery area or an area that service less than a statistical majority of the meal orders. In some embodiments, as discussed in greater detail below, a vehicle may be routed to the vehicle waiting zone 830 by the kitchen management system and/or drive-thru management system in view of an amount of time remaining to complete an order associated with the vehicle, a length of a drive-thru line, and/or additional information.

In some embodiments, the drive-thru management system may facilitate routing of one or more vehicles of the drive-thru to a designated meal delivery area 810A-B based on a state of the kitchen. As will be discussed further in other embodiments, the drive-thru management system may capture data (e.g., using cameras 808A-E) and determine routing of the vehicles (e.g., through lanes 826A-C) to designated meal delivery areas 810A-B (e.g., routing a vehicle to vehicle waiting zone 830 or a window associated with food delivery area 810A). In a further embodiment, that will be discussed further in other embodiments, the drive-thru management system 800 may capture data (e.g., using camera 808E) associated with a state of a kitchen area, and use that kitchen image data in determining the routing of vehicles to individual meal delivery areas 810A-B.

In some embodiments, the kiosk(s) 836A-B, the order transaction area 812 and the food delivery area(s) 810A-B, may be disposed at separate locations about a drive-thru area 806 and/or may include separate functionality as previously described. However, in other embodiments one or more locations and/or functions of the kiosk(s) 836A-B, order transaction area 812, and/or food delivery area(s) can be combined and perform multiple functions at a given location. For example, the order transaction area 812 may include a device (e.g., a kiosk 836A-B) that is capable of receiving order data and inputting the order data into the drive-thru management system 800 (e.g., using POS system 802). In another example, order data may be received and entered into the drive-thru management system at a first location. At the same first location, the pending meal order associated with the order data may be processed (e.g., validated and/or paid). At the same first location, the completed meal may be delivered to a customer (e.g. within a vehicle). The function of kiosk(s) 836A-B, order transaction area 812, and/or food delivery area 810A-B may be combined in other combinations, such as to fulfill orders in accordance with logistical restrictions (e.g., building limitations such as only having one window or limited kiosk capability, and the like) of a drive-thru area 806.

As shown in FIG. 8, the drive-thru management system 800 may include a kitchen display system (KDS) 804. The kitchen display system 804 may be integrated with or otherwise communicate with POS system 802. The KDS 804 can be designed to display kitchen data such as upcoming orders, status of currently/partially prepared orders, routing instructions associated with delivery of upcoming meal orders and/or other kitchen data received from the POS system 802 and/or the drive-thru management component 818. In some embodiments, multiple KDS's 804 are used. For example, a KDS 804 may be assigned to a given order preparation zone 814 and may display data indicative of order statuses and/or preparation steps associated with a given food preparation stations. For example, the KDS 804 may be associated with an order assembly station and/or display data indicative of what packaging should be used to assemble the order. In another example, the KDS 804 may display data indicative of a state of the drive-thru such as how long a vehicle has been in queue awaiting fulfillment of an associated meal order.

The drive-thru management system may include one or more cameras 808A-E capable of capturing images of the kitchen 801 and/or drive-thru area 806. The cameras 808A-E may be associated with camera coverage zones 820A-E disposed within the kitchen 801 and/or drive-thru area 806. The cameras 108A-E may include video cameras. For example, the cameras 808A-E may include closed-circuit televisions (CCTV) cameras. In some embodiments, one or more of the cameras may include depth sensors such as using a light detection and ranging (LIDAR) camera.

One or more of the cameras 808A-E may be disposed overhead to capture images of the kitchen from a downward looking perspective. One or more of the cameras 808A-E may capture images associated with the state of the kitchen. For example, the cameras may capture employees 824A-B performing food preparation, assembly, and/or delivery functions. In some embodiments, the cameras 808A-E may be associated with camera coverage zones 120A-E. In some embodiments, at least some of the camera coverage zones 120A-E overlap.

One or more cameras 808A-E may be disposed within a drive-thru area 806 to capture images indicative of a state of the drive-thru area 806. A camera (e.g., 808A) may be associated with captured image data associated with an order area (e.g., an area proximate kiosk 836A-B). One or more cameras (e.g., camera 808B) may be associated with capturing images associated with a state of the order transaction area 812. One or more cameras (e.g., cameras 808C-D) may be associated with capturing images associated with a state of the one or more food delivery areas 810A-B. In some embodiments, camera coverage zones 820A-E overlap. The drive-thru management system 800 may determine when a vehicle (e.g., vehicles A-D) enter and/or exit one or more camera coverage zones 820A-E and enter and/or exit another camera coverage zone 820A-E.

As shown in FIG. 8, the drive-thru management system 800 may include a server 816 with a drive-thru management component 118. The kitchen server 816 may receive image-based data from one or more of cameras 808A-E associated with the state of the kitchen and/or drive-thru. The drive-thru management component 818 may include instructions that cause a processor to perform image-processing methodology, as described herein.

In some embodiments, the drive-thru management component 818 can perform one or more drive-thru management functions. As shown in FIG. 8, one or more cameras (e.g., cameras 808A-D) may include camera coverage zone 820A-D associated with the drive-thru area 806. The drive-thru management component 818 may combine data indicative of the state of the kitchen 801, as previously described, with data indicative of a state of the drive-thru (e.g., vehicle 822A-D ingress, queue sizes, current order statuses associated with vehicles, current meal delivery methods, current order transaction procedure being employed, current wait times, etc.). The drive-thru management component 818 may determine how to route vehicles (e.g., to most efficiently service each order, optimize revenue, etc.), how to perform an order transaction (e.g., how payment of a meal order is to be processed), and make associations between vehicle and orders as well as updating order displays based on vehicle identification, among other things. In some embodiments, one or more alternative vehicle routes through a drive-thru may be used, such as a vehicle waiting zone 830 associated with orders that are determined to be filled after a wait time that is above a threshold wait time. For example, the kitchen management component may determine that a first meal item (e.g., fries) are low in stock and will need extra time to prepare. This increased wait time may be flagged by the drive-thru management component (e.g., through the KDS 104) and an employee may instruct a vehicle to a vehicle waiting zone 830 which may allow a queue of vehicles to continue through food delivery area 810A while the vehicle is in the vehicle waiting zone 830 being serviced through food delivery area 810B when the associated order is filled. Some restaurants that use a single food delivery window for the drive-thru may make use of a waiting bay and/or parking spots designed as an alternate delivery method for longer orders.

In some embodiments, the drive-thru management system 800 may record metrics such as how long does a queue typically build up before losing vehicles (e.g., a critical mass of vehicles in the drive-thru area). Cash flow may be predicted for each car and one or more decisions of the drive-thru management system 800 may be based on optimizing cash flow through the drive-thru area.

Figure 9:
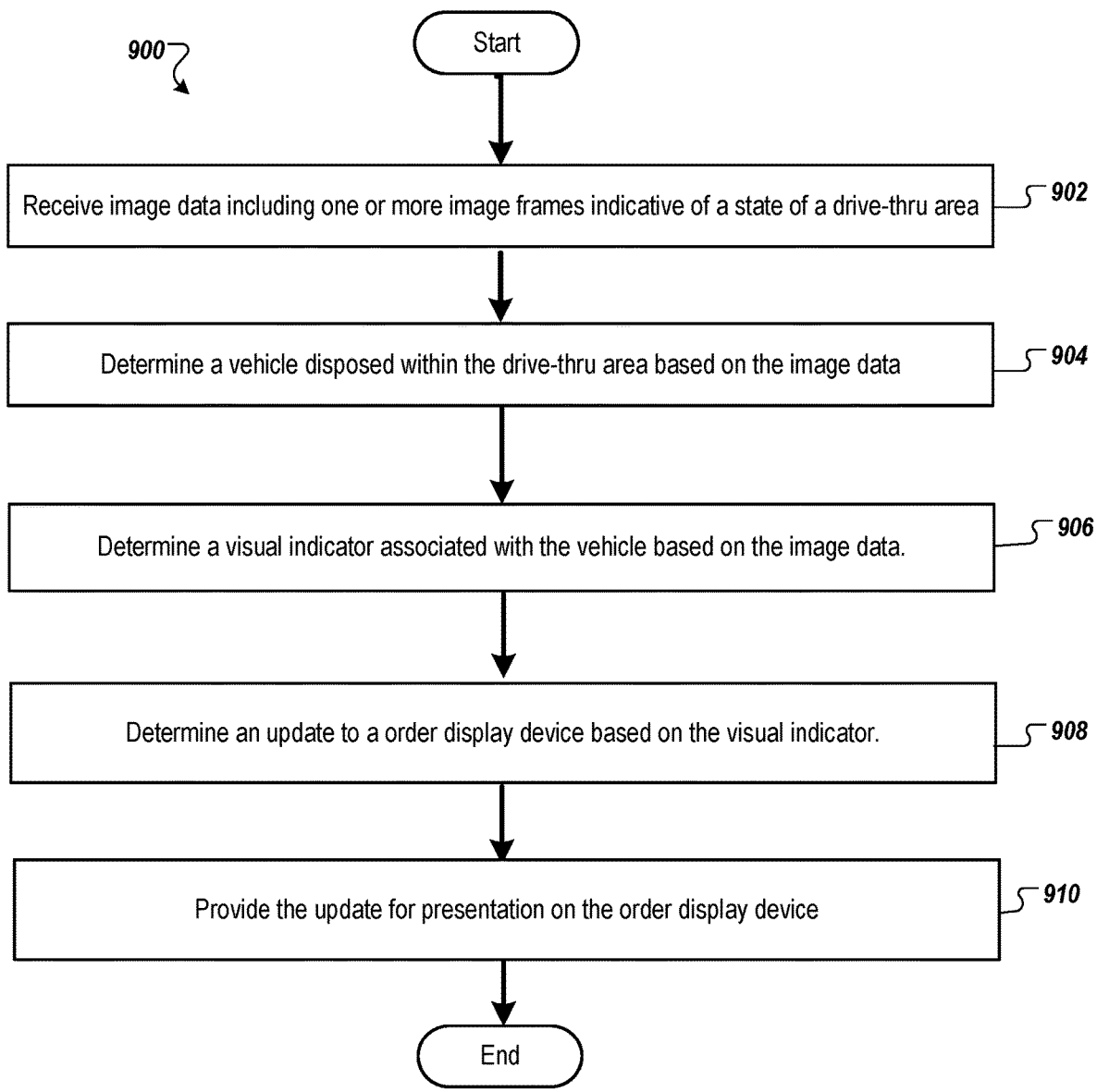
FIG. 9 depicts a flow diagram of one example method for determining updates to an order display based on a state of a drive-thru area, in accordance with some implementations of the present disclosure.

FIGS. 9-14 depict flow diagrams of example methods 900-1400 for managing a drive-thru area (e.g., drive-thru area 806) associated with a meal preparation area (e.g., kitchen 801 of FIG. 8). Methods 900-1400 are performed by processing logic that may include hardware (circuitry, dedicated logic, etc.), software (such as is run on a general purpose computer system or a dedicated machine), or any combination thereof. In one implementation, methods 900-1400 are performed using kitchen management tool 350 (e.g., drive-thru management logic 358) of FIG. 3, while in some implementations, one or more blocks of FIGS. 9-14 may be performed by one or other machines not depicted in the figures FIG. 9 depicts a flow diagram of one example method 900 for determining updates to an order display based on a state of a drive-thru area, in accordance with some implementations of the present disclosure. Referring to FIG. 9, at block 902 processing logic receives image data including one or more image frames indicative of a state of a drive-thru area. As described in association with other embodiments, the image data may include one or more image frames captured by one or more cameras disposed at or proximate a drive-thru area. For example, one or more cameras may be disposed at an elevated location and/or oriented to capture image frames of a drive-thru area (e.g., outside a boundary of a meal preparation area denoted by one or more lane markers to route vehicles through one or more order placement, payment processing, and/or meal delivery areas). The one or more image frames of the image data may be sequential image frames taken by the same camera with a similar field of view. In some embodiments, the image data may include one or more non-sequential image frames (e.g., images not temporally connected or otherwise temporally associated with other image frames). In some embodiments, the image data may include one or more image frames capture by different cameras with different points of view of a meal preparation area (e.g., simultaneously or at different times). For example, one camera may be positioned at an order placement area while another camera is positioned at a payment processing area.

At block 904, processing logic determines a vehicle disposed within the drive-thru area based on the image data. The image data may include various image frames of a state of the drive-thru area. In some embodiments, the image frame may include various objects disposed within a drive-thru (e.g., objects such as vehicles, lane boundaries, order kiosks, building boundaries, and the like). The image data may be processed (e.g., using image processing tool 310) to determine individual objects (e.g., a vehicle), track objects (e.g., track a vehicle through a drive-thru route), recognize actions (e.g., detect movement of a vehicle within or across one or more drive-thru lanes).

In some embodiments, the image data is used as input into a machine learning model. Processing logic may receive one or more outputs from the machine learning model. The one or more outputs from the machine learning model may include data indicative of a detected object (e.g., a vehicle, a lane boundary, etc.) and a level of confidence that the detected object is accurately classified (e.g., actually is disposed at an identified location of the drive-thru area).

At block 906, processing logic determines a visual indicator associated with the vehicle based on the image data. The visual indicator may include one or more features of the vehicle that identify the vehicle from other vehicles. For example, processing logic may determine a color of the vehicle, a make and/or model of the vehicle, a license plate number of the vehicle, and/or one or more objects detected on, within, or otherwise proximate the vehicle. For example, one or more objects disposed on a windshield (e.g., registration information or a depicted logo or icon) may be used to identify the vehicle. In another example, one or more objects located within the vehicle (e.g., on a dashboard) may be detected. In another example, pictures, logos, or other visual indicators on the body of the car (e.g., bumper stickers) may be used to identify the vehicle. In some embodiments, alterations to a traditional make and/or model of a vehicle may be detected and used to identify the vehicle. For example, a custom paint job (e.g., the vehicle includes a first part with a first color and a second part with a second color) associated with the vehicle may be used to identify the vehicle. In another example, a vehicle may include identifying features such scratches, cracked parts, missing parts (e.g., corresponding to a prior accident associated with the vehicle) that may be detected by processing logic to identify the vehicle from other vehicles.

In some embodiments, the visual indicator may be determine based on stored mapping data. For example, a make and/or model of a vehicle may be determined by detecting a first vehicle and comparing that geometry with known makes and/or models of vehicles to determine the make and/or model of the detected vehicle. This may be performed by a single field of view from an individual camera or multiple geometric determination of the vehicle from multiple angles and/or multiple field of views from multiple cameras.

In some embodiments, the system may detect a difficulty in identifying a vehicle and/or visual indicator of the vehicle. Processing logic may cause download and manual labeling of the image for further training when a level of confidence is below a threshold level. In some embodiments, a vehicle may be detected in a first frame and a third frame but not a second frame. Processing logic may flag the second frame as a frame to be manually labeled and used for retraining of one or more of the models described herein. In some embodiments, a batch of images may be identified as performing poorly (e.g., mis-classifying one or more machine learning outputs). The batch of images may be flagged by the system and needed manual labelled and/or annotation priority.

At block 908, processing logic determines an update to an order display device based on the visual indicator. In some embodiments, an order display device may include a display showing various meals capable of being prepared within an associated meal preparation area. The order display device may be capable of dynamic updating. For example, the order display device may include a digital menu display that is capable of receiving data and updating one or more elements on the display. In some embodiments, an update to the order display device may include updates to positioning and/or sizing of displayed elements, alignment of the one or more displayed elements, spacing between other displayed elements, visibility of one or displayed elements. In another example, the order display device may receive an update associated with an updated price of a meal item or combination of meal items and display the update in an updated menu display configuration (e.g., showing the updated price in proximity to the corresponding element). In another example, the order display device may update which items to display, which may be accompanied with changes in price, size, etc. Accordingly, a menu display may be customized to a customer based on properties of the vehicle (e.g., kids meals displayed to a minivan).

In some embodiments, an update to an order display device may be determined based on the make or model of the vehicle. For example, processing logic may determine a vehicle includes a threshold amount of seats within the vehicle (e.g., a van). The update to the order may cause the display to prioritize displaying combination meal items having bulk quantities of items and/or meal items commonly ordered by larger parties of customer. In another example, processing logic may determine the vehicle is a type of vehicle commonly associated with carrying customers of targeted age group (e.g., children or teens). The update to the order display may include displaying items on the menu commonly associated with meal orders involving the associated age group (e.g., displaying kids' meals, kids' combo's, auxiliary items like toys, etc.).

In some embodiments, the update may be associated with an order history of the identified vehicle. Processing logic may use the visual indicator to identify order history associated with the vehicle. For example, the vehicle may be associated with a subscriber/customer account that may include an order history. In one embodiment, a license plate number of the vehicle is determined using optical character recognition, and the license plate number is searched to determine if prior orders are associated with the license plate number and/or if the license plate number is included in a subscriber/customer account. Processing logic may facilitate storage of meal orders associated with the vehicle. Processing logic may record orders associated with a vehicle and use the tracked order history to determine the update to the order display. For example, processing logic may identify a vehicle and that a driver of that vehicle may frequently order a first meal item. The next time that vehicle is identified in the drive-thru, processing logic may determine an update to the order display device based on the first meal item ordered in the prior meal order(s). For example, the order display device may display the first meal item in a priority location on the order display device and/or with a larger font and/or in a larger window than is standard. In another example, processing logic determines an update to the order display to perform an upsell based on the order history associated with the vehicle. For example, processing logic may prompt the customer as to whether they would like to add a particular item to their order for an offer price. The customer may then add that item to their order simply by saying yes at the order kiosk.

In some embodiments, the updates may be determined based on a state of the kitchen and or drive-thru area. A state of the kitchen may be determined based on pacing data (e.g., determine using one or more blocks of method 700 of FIG.

7) and/or food preparation data (e.g., indicating ingredient levels for base and/or prepared food items). As will be described further in association with other embodiments, processing logic may determine predicted duration to prepare various meal items on a menu. Processing logic may determine that the predicted preparation of one or more meal items may be above a threshold preparation time. For example, a quantity of a prepared first ingredient may be below a threshold quantity and preparation of the first ingredient may require additional preparation time to prepare more of the first ingredient. One or more meal items associated with the first ingredient may require a longer duration of time than if the quantity of the first ingredient was above a threshold quantity. Processing logic may determine an update to display the one or more meal items predicted to require an extended (e.g., above a threshold time duration) amount of time to be displayed in a less prominent position on the order display or not at all. For example, processing logic may cause the order display not to display a first meal item on the menu because the preparation of the first meal item is above a threshold duration. For example, processing logic may determine that the amount of prepared chicken is in short supply and may cause the order display to show items requiring chicken in a less prominent position (or not at all) on the order display.

At block 910, processing logic provides the update for presentation on the order display device. Processing logic may determine a location of an associated vehicle. Processing logic may determine when the location of the associated vehicle is within a threshold proximity of an ordering area and may cause the order display to display an updated menu associated with the determined update.

Figure 10:
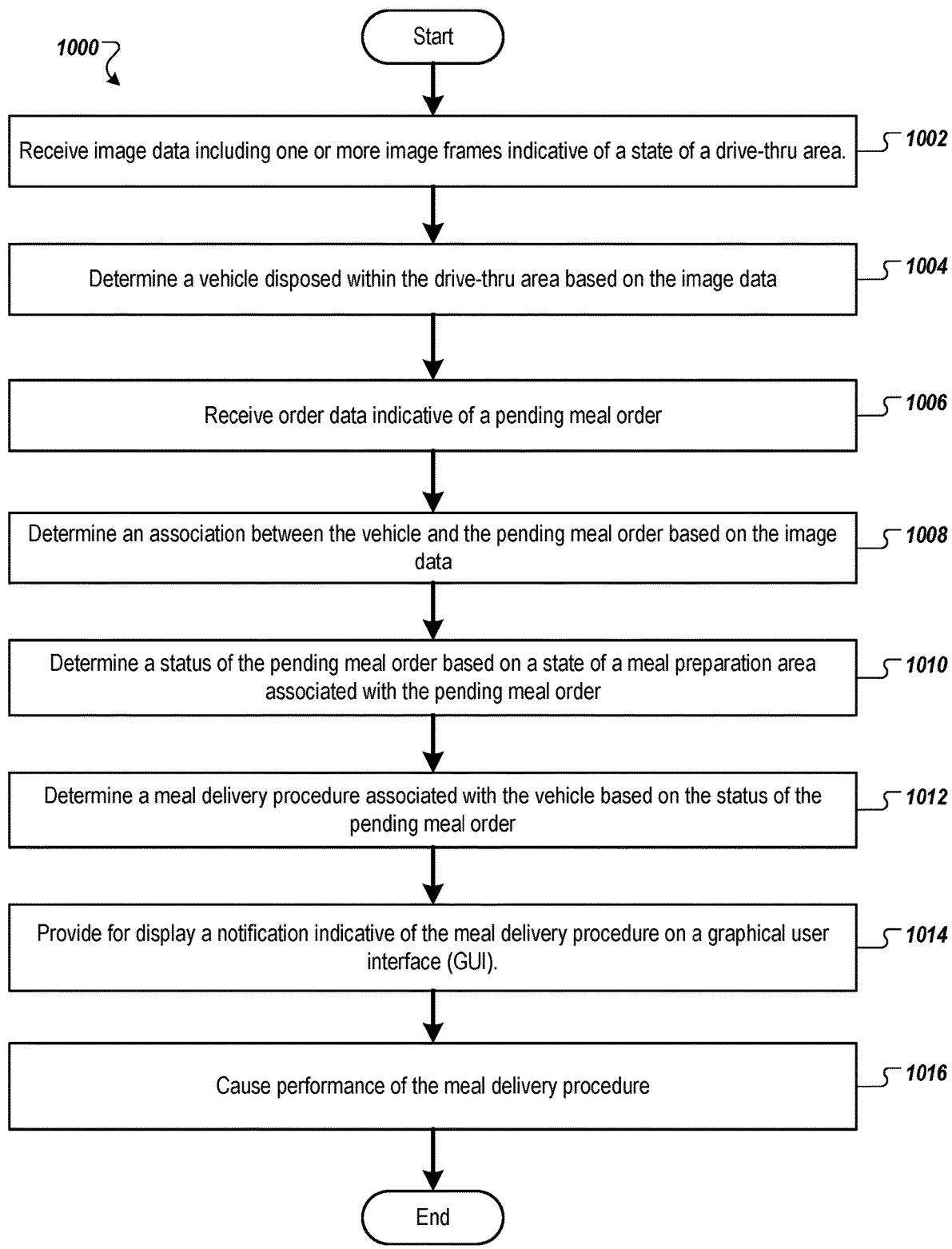
FIG. 10 depicts a flow diagram of one example method for determining meal delivery procedures based on a state of a drive-thru area, in accordance with some implementations of the present disclosure.

FIG. 10 depicts a flow diagram of one example method 1000 for determining meal delivery procedures based on a state of a drive-thru area, in accordance with some implementations of the present disclosure. Referring to FIG. 10, at block 1002, processing logic receives image data including one or more image frames indicative of a state of a drive-thru area. As described in association with other embodiments, the image data may include one or more image frames captured by one or more cameras disposed at or proximate a drive-thru area. For example, one or more cameras may be disposed at an elevated location and oriented to capture image frames of a drive-thru area (e.g., outside a boundary of a meal preparation area denoted by one or more lane markers to route vehicles through one or more order placement, payment processing, and/or meal delivery areas). The one or more image frames of the image data may be sequential image frames taken by the same camera with a similar field of view. In some embodiments, the image data may include one or more non-sequential image frames (e.g., images not temporally connected or otherwise temporally associated with other image frames). In some embodiments, the image data may include one or more image frames capture by different cameras with different points of view of a meal preparation area (e.g., simultaneously or at different times). For example, one camera may be positioned at an order placement area while another camera is positioned at a payment processing area.

At block 1004, processing logic determines a vehicle disposed within the drive-thru area based on the image data. The image data may include various image frames of a state of the drive-thru area. In some embodiments, the image frame may include various objects disposed within a drive-thru (e.g., objects such as vehicles, lane boundaries, order kiosks, building boundaries, and the like). The image data may be processed (e.g., using image processing tool 310) to determine individual objects (e.g., a vehicle), track objects (e.g., track a vehicle through a drive-thru route), recognize actions (e.g., detect movement of a vehicle within or across one or more drive-thru lanes).

In some embodiments, the image data is used as input into a machine learning model. Processing may receive one or more outputs from the machine learning model. The one or more outputs from the machine learning model may include data indicative of a detected object (e.g., a vehicle, a lane boundary, etc.) and a level of confidence that the detected object is accurately classified (e.g., actually is disposed at an identified location of the drive-thru area). Alternatively, conventional image processing may be performed to identify a vehicle.

At block 1006, processing logic receives order data indicative of a pending meal order. The order data may include a list of one or more meal components to prepare and/or one or more meal preparation procedures to perform to complete the first order. In some embodiments, order data is received via a POS system (e.g., POS system 802). For example, a customer may place an order at an order placement location (e.g., using kiosks 836A-B) disposed within a drive-thru area. In another example, an order may be received remotely (e.g., from an endpoint device associated with a customer such as using a browser and/or application). Order data may include data associated with orders previously filled and/or currently needing to be filled. In some embodiments, processing logic is integrated with a kitchen display system (KDS). For example, the first order may be displayed on the KDS, responsive to receiving the data indicative of the first order.

At block 1008, processing logic determines an association between the vehicle and the pending meal order based on the image data. Processing logic may determine a location associated with the vehicle based on the image data. For example, one or more pixels of the one or more image frames may be associated with a specific location of the drive-through area. A vehicle may be depicted in a first portion of one or more image frames that is associated with a location proximate an order placement area of the drive-thru area. The association between the vehicle and the pending meal order may be based on a proximity of the vehicle to an order placement location when the order data is received (e.g., entered into the POS system). For example, a vehicle that is ordering is likely near the order placement area (e.g., a kiosk) of the drive-thru area and can be associated with an order that is entered in temporal proximity to determining that the vehicle is located proximate the order placement area. In some embodiments, processing logic may tag a vehicle with the order such that when the vehicle is detected in further image frames the identified vehicle is linked to data indicative of the associated pending meal order.

In some embodiments, as will be discussed further in association with other embodiments, an order may be associated with a vehicle based on which lane the vehicle is determined to be disposed. For example, a drive-thru area may include multiple meal order areas (e.g., multiple order kiosks) and an order entered into the POS may be associated with a specific lane of the drive-thru. The received order may be associated with a kiosk disposed proximate a first lane. A vehicle may be determined to be located in the first lane and can further be associated with the received order.

In some embodiments, processing logic may determine a visual indicator. Determining the association between the vehicle and the pending meal order may be further based on the visual indicator. The visual indicator may include one or more features of the vehicle that identify the vehicle from other vehicles. For example, processing logic may determine a color of the vehicle, a make and/or model of the vehicle, a license plate number of the vehicle, and/or one or more objects detected on, within, or otherwise proximate the vehicle. For example, a customer may place an order prior to arriving at the drive-thru area and indicate the visual indicator (e.g., identify the make/model of the vehicle that will be used to pick up the order). Processing logic may receive the order and associate the order with the vehicle once a vehicle matching vehicle information is detected within the drive-thru area.

At block 1010, processing logic determines a status of the pending meal order based on a state of a meal preparation area associated with the pending meal order. The status of the pending meal order may be associated with an expected/predicted time to fulfill the pending meal order. As is explained further in association with FIG. 11, processing logic may track an order density (e.g., volume of currently pending meal orders), current inventory of prepared ingredients, pacing data (e.g., time it takes to fulfill individual meal preparation steps associated with meal), to determine a status of the meal orders.

At block 1012, processing logic determines a meal delivery procedure associated with the vehicle based on the status of the pending meal order. The meal delivery procedure may include one or more methods of delivery of a completed meal order to a customer (e.g., within the associated vehicle). As described in other embodiments, a drive-thru area (e.g., 806 of FIG. 8) may include one or more meal delivery areas 810A-B. Processing logic may determine which of the meal delivery procedures to use given a status of the pending meal orders. For example, one of food delivery area(s) (e.g., food delivery area(s) 810A-B of FIG. 8) may be associated with a vehicle waiting zone (e.g., vehicle waiting zone 830 of FIG. 8) and another may be associated with a food delivery window. In some embodiments, a first meal delivery area (e.g., 810A) may be associated with a primary meal delivery area or an area that services a statistical majority of the meal orders and a second meal delivery area (e.g., 810B) may be associated with a secondary (e.g., or an alternative meal delivery area) meal delivery area or an area that service less than a statistical majority of the meal orders. For example, processing logic may determine to deliver a meal through a primary delivery procedure for meals that are predicted to meet a threshold order fulfillment duration and may determine to deliver meals through a second meal delivery procedure for meal orders that are predicted to exceed the threshold order fulfillment duration. The threshold order fulfillment duration may be determined based on information such as kitchen business level, length of line at drive-thru, time of day, state of the kitchen (e.g., inventory, employee availability, etc.) and/or other information.

In some embodiments, processing logic may determine the meal delivery procedures based on a number of vehicles disposed within the drive-thru. For example, processing logic may determine that only one vehicle is disposed within the drive-thru and may override a threshold order fulfillment duration when determining a meal delivery procedure. Processing logic may adjust the threshold order fulfillment threshold based on the number of vehicles. For example, processing logic may determine a number of vehicles detected in the drive exceeds a threshold quantity and shorten the threshold order fulfillment duration (e.g., to minimize wait time of customers and improve meal delivery efficiency). In some embodiments, processing logic may predict a cash-flow evaluation based on the number of cars disposed within the drive-thru area. For example, processing logic may determine how to route a vehicle through the drive-thru based on a predicted cash flow of the one or more vehicles. Processing logic may perform optimization logic based on one or more of the predicted time to fulfill each pending meal order, an average amount of money for each order, a quantity of vehicles disposed within and/or proximate a drive-thru area, average wait time of a vehicle before leaving the drive-thru, and/or other metrics associated with one or more vehicles disposed within the drive-thru.

At block 1014, processing logic provides for display a notification indicative of the meal delivery procedure on a graphical user interface (GUI). The notification may include instructions to an employee on how to direct routing of one or more vehicles through a drive-thru. For example, the notification may include instructions to direct a first vehicle to a first waiting bay. In another example, the notification may include instructions to prioritize preparation of orders (e.g., prepare a first order before a second order). In some embodiments, the notification may be sent to a kitchen display system (e.g., KDS 804 of FIG. 8). For example, the notification may be displayed on a KDS in a live kitchen environment to provide live routing of vehicles within the drive-thru area, live order prioritization, and/or anticipatory preparation of ingredients, responsive to receiving one or more pending meal orders.

In some embodiments, the notification is received by a client device (e.g., client device 207 of FIG. 2). The notifications may be associated with post-mortem data (e.g., data used when the drive-thru management system is not actively receiving order data). Processing logic may query one or more order statuses and meal delivery procedure notifications to determine order delivery, meal preparation, and/or drive-thru routing statistics (e.g., associated with order fulfillment efficiency).

At block 1016, processing logic causes performance of the meal delivery procedure. In some embodiments, a drive-thru area may include one or more automated systems for routing vehicles and/or delivering meals within a drive-thru area. For example, a drive-thru-management system may include one or more displays that guide one or more vehicles through a drive-thru area and can be dynamically updated by processing logic.

In some embodiments, processing logic may determine a state of the drive-thru area (e.g., to determine the status of the meal order). The status of the drive-thru may be based on a volume of customers (e.g., vehicles) disposed within and/or proximate to a drive-thru area. For example, a camera may be disposed and oriented to capture an ingress location of the drive-thru area. The camera may capture image data indicative of an ingress of the drive-thru area. Processing logic may process the image data and determine a quantity of vehicles disposed within a field of view of the camera(s) oriented towards the ingress area. This volume may include one or more vehicles associated with future order that have not been entered and/or have not been received by the POS system. Processing logic may make determinations such as upgrades to an order display device (e.g., block 908 of FIG. 9) and/or meal delivery procedures (e.g., block 1012 of FIG. 10) based on the volume of cars determined to be at or proximate an ingress area of a drive-thru area.

In some embodiments, method 1000 may be leveraged for post-mortem data. For example, among all of the orders in a designated window of time, how many were not prepared prior to an associated vehicle arriving at the meal delivery area. The post-mortem data may include number of late orders, common meal and/or meal components that were not prepared in time for a vehicle entering the meal delivery area.

In some embodiments, method 100 may further include determining a point of no return in a drive-thru. A point of no return may include a point during the drive-thru where a vehicle is prevented from leaving and must continue through to the end of the drive-thru route. For example, the drive-thru area may include one or more barrier (e.g., building structure, curbs, etc.) that prevent a vehicle from leaving the drive-thru area. One or more processing elements may identify the point of no return within a geometric mapping of the drive-thru area. In some embodiments, one or more processing modeling described here may identify a pattern of vehicle behavior and may infer a point of no-return based on the received image data and/or vehicle pattern data.

Figure 11:
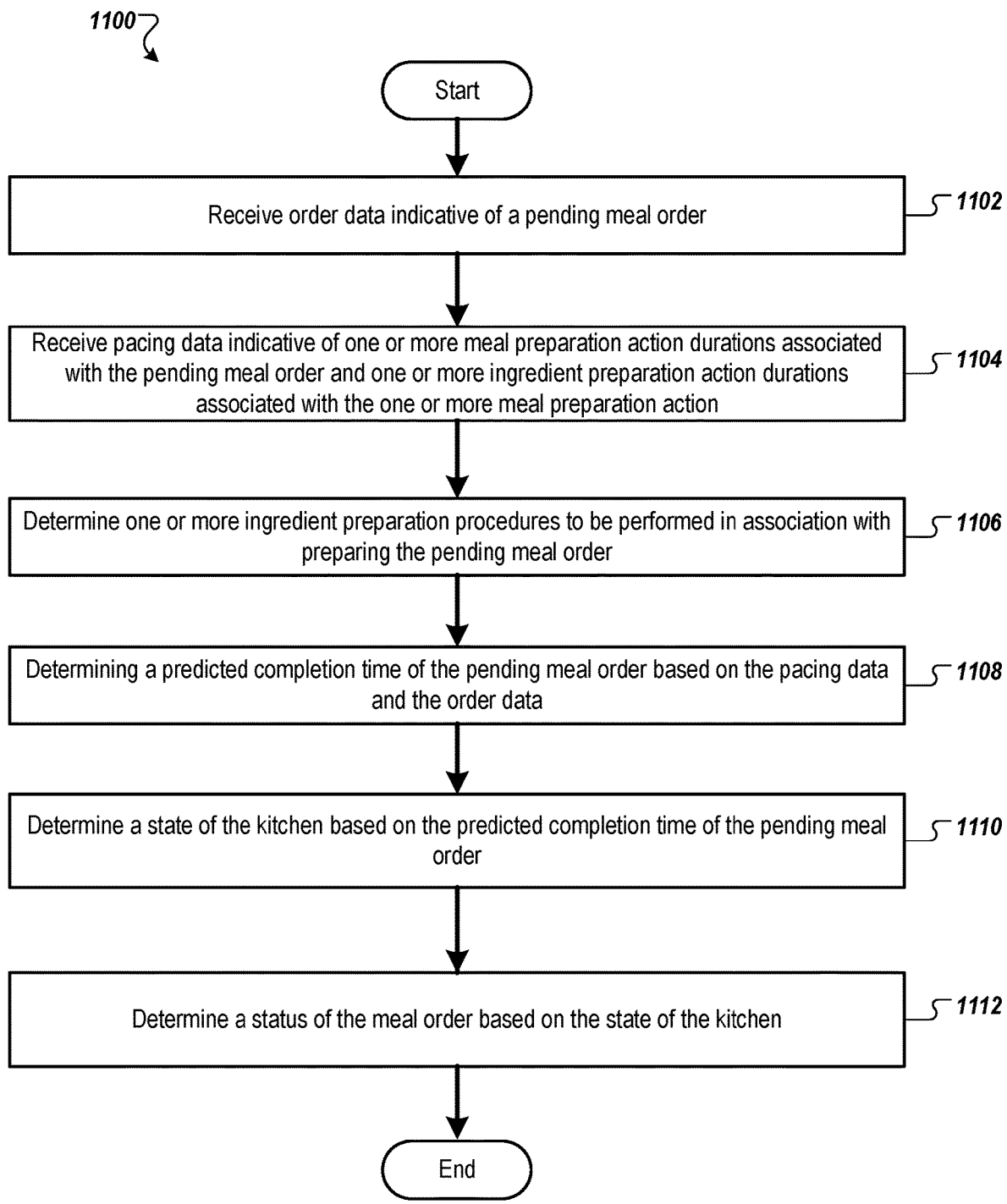
FIG. 11 depicts a flow diagram of one example method for determining a status of a pending meal order associated with a drive-thru area, in accordance with some implementations of the present disclosure.

FIG. 11 depicts a flow diagram of one example method 1100 for determining a status of a pending meal order, in accordance with some implementations of the present disclosure. Referring to FIG. 11, at block 1102, processing logic receives order data indicative of a pending meal order. In some embodiments, order data is received via a POS system (e.g., POS system 802). For example, a customer may place an order at an order placement location (e.g., using kiosks 836A-B) disposed within a drive-thru area. In another example, an order may be received remotely (e.g., from an endpoint device associated with a customer such as through a browser and/or application). Order data may include data associated with orders previously filled and/or currently needing to be filled. In some embodiments, processing logic is integrated with a kitchen display system (KDS). For example, the first order may be displayed on the KDS, subsequent to receiving the data indicative of the first order.

At block 1104, processing logic receives pacing data indicative of one or more meal preparation action durations associated with the pending meal order and one or more ingredient preparation action durations associated with the one or more meal preparation action. For example, pacing data (e.g., pacing data 334 of FIG. 3) may be indicative of paces of actions, recipes, food preparation steps, etc.

In some embodiments, pacing data (e.g., a duration of a meal preparation procedure determined at block 706) may be used in association with order tracking methodology (e.g., one or more blocks of method 600 of FIG. 6) to determine pacing data associated with one or more orders as they are assembled. A time duration of one or more steps of order preparation may be tabulated and aggregated into pacing data associated with a steps of preparing a meal order. For example, a time duration for making a hamburger from start to finish may be aggregated by adding up the action times of the individual steps. For example, metadata stored in association with a meal order may store and aggregate pacing data (e.g., timestamps of actions performed, list of meal preparation steps, etc.).

At block 1106, processing logic determines one or more ingredient preparation procedures to be performed in association with preparing the pending meal order. The order data may include a list of one or more meal components to prepare and/or one or more meal preparation procedures to perform to complete the first order. Processing logic may extract the list of meal components and meal preparation procedures for further processing.

At block 1108, processing logic determines a predicted completion time of the pending meal order based on a state of the kitchen (e.g., pacing data) and the order data. Processing logic may determine a duration of a meal preparation procedure associated with the pending meal order. As previously described, image data may be received and processing logic may detect one or more action outputs from one or more image frames. The one or more action outputs may be associated with a start and/or end time of an action. The start and end time of an action may be indicative of how long an action has occurred. Processing logic may query multiple image frames to determine an average action duration. The average action duration may take into account the state of the kitchen or a predicted future state of the kitchen. For example, processing logic may determine a number of employees currently available to perform the action, resource commitments to other actions (e.g., an oven being used by another meal preparation procedure), an inventory forecast (e.g., a quantity of available resources or a prediction of a future quantity of an available resource), prerequisite actions (e.g., a pan must first be cleaned to be used to cook an ingredient, chicken must be battered before cooked). In some embodiments, the duration of the meal preparation action is a time duration for a compound action (e.g., an action requiring multiple steps).

In some embodiments, the meal preparation procedure may include preparing a meal preparation tool associated with the ingredient. For example, preheating an oven, cleaning equipment, preparing secondary ingredients, and so on may be associated with the meal preparation procedure and may be attributed to a portion of the duration of the meal preparation procedure.

Processing logic may determine an aggregate meal preparation time based on the determined one or more meal preparation procedures. For example, a combination meal item preparation duration may include the aggregate meal preparation duration to prepare individual meal elements associated with the combination meal order.

At block 1112, processing logic determines a status of the meal order based on the predicted completion time. Processing logic may track an order density (e.g., volume of currently pending meal orders), current inventory of prepared ingredients, pacing data (e.g., time it takes to fulfill individual meal preparation steps associated with meal), to determine a status of the meal orders.

In some embodiments, processing logic may receive data indicative of current availability of items in the kitchen (e.g., prepared inventory analysis). Processing logic may track the order fill rate, monitor wait times of the vehicles in the drive-thru to determine a status of a meal order. A status of a meal order may be based on an expected wait time by a customer in receiving the pending meal order. A status of a meal order may be associated with a threshold wait times a customer may experience awaiting completion of the pending meal order. For example, the status of the pending meal order may indicate whether one or more later meal preparation orders (e.g., meals orders received after the current meal order) may be fulfilled quicker than the current meal order. In some embodiments, the meal order status may indicate that one or more ingredients associated with the meal order has insufficient prepared supply and additional time may be required to fulfill the meal order. For example, an order may include fries, however, the quantity of prepared (e.g., cooked, cut, salted, etc.) fries may be below a threshold amount. The order may be incapable of being filled without preparing more fries and as a result additional time may be required to prepare an additional quantity of fries to fulfill the order.

Figure 12:
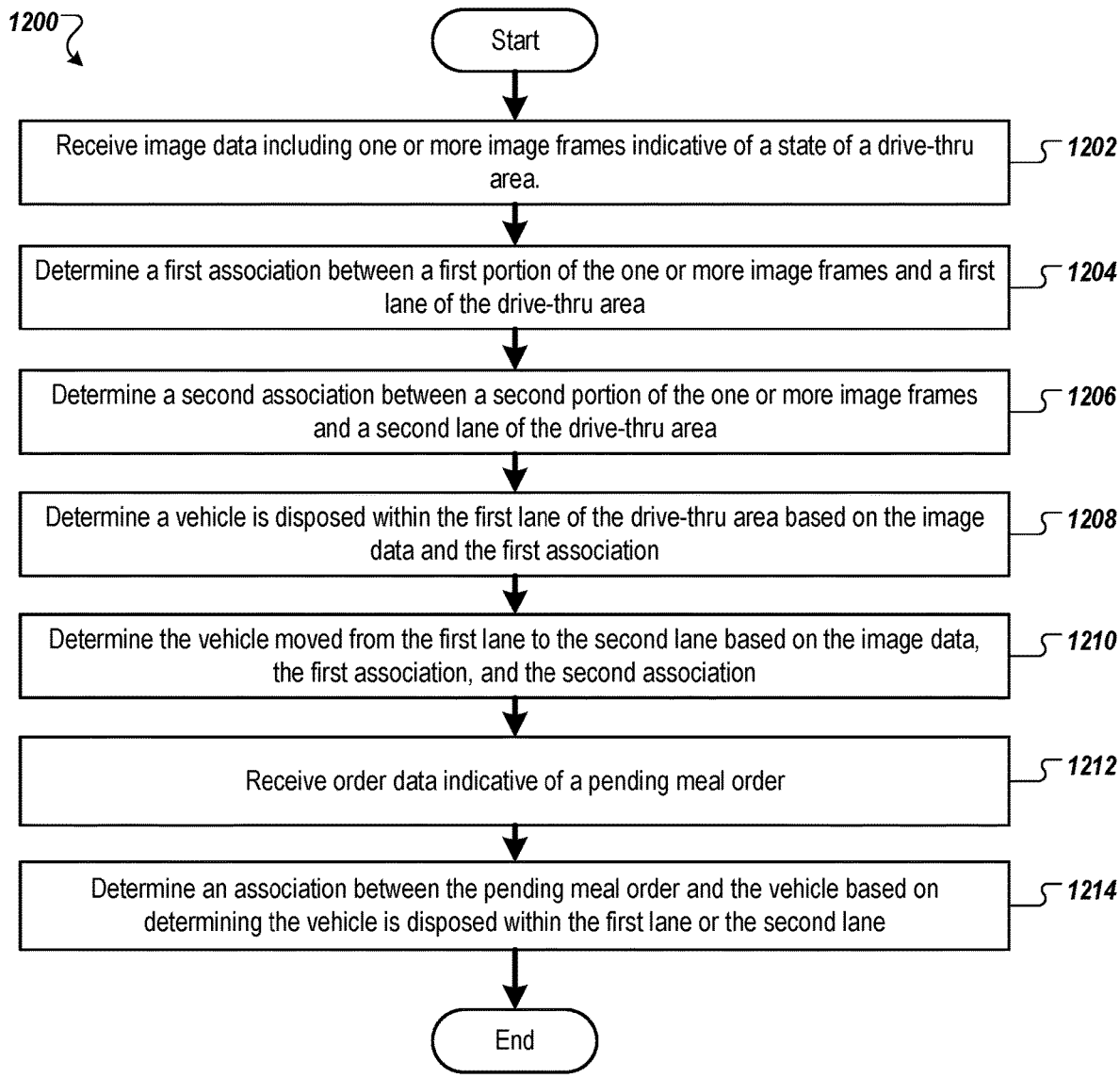
FIG. 12 depicts a flow diagram of one example method for lane tracking of a vehicle within a drive-thru area, in accordance with some implementations of the present disclosure.

FIG. 12 depicts a flow diagram of one example method for lane tracking of a vehicle within a drive-thru area, in accordance with some implementations of the present disclosure. Referring to FIG. 12, at block 1202, processing logic receives image data including one or more image frames indicative of a state of a drive-thru area. As described in association with other embodiments, the image data may include one or more image frames captured by one or more cameras disposed at or proximate a drive-thru area. For example, one or more cameras may be disposed at an elevated location and oriented to capture image frames of a drive-thru area (e.g., outside a boundary of a meal preparation area denoted by one or more lane markers to route vehicles through one or more order placement, payment processing, and/or meal delivery areas). The one or more image frames of the image data may be sequential image frames taken by the same camera with a similar field of view. In some embodiments, the image data may include one or more non-sequential image frames (e.g., images not temporally connected or otherwise temporally associated with other image frames). In some embodiments, the image data may include one or more image frames capture by different cameras with different points of view of a meal preparation area (e.g., simultaneously or at different times). For example, one camera may be positioned at an order placement area while another camera is positioned at a payment processing area.

At block 1204, processing logic determines a first association between a first portion of the one or more image frames and a first lane of the drive-thru area. At block 1206, processing logic determines a second association between a second portion of the one or more image frames and a second lane of the drive-thru area. Processing logic may segment the image data into regions associated with one or more drive-thru lanes (e.g., lanes 826A-C of FIG. 8). For example, a drive-thru area may include multiple lanes used to route vehicles through a meal order placement, payment, and/or delivery process. Processing logic may determine first boundaries of a first drive-thru lane within the drive-thru area and determine second boundaries of a second drive-thru lane within the drive-thru area. A first portion of one or more of the image frames may be associated with the first lane and a second portion of the one or more image frames may be associated with the second lane.

At block 1208, processing logic determines a vehicle disposed within the first lane of the drive-thru area based on the image data and the first association. As discussed in association with other embodiments, the image data may include various image frames of a state of the drive-thru area. In some embodiments, the image frame may include various objects disposed within a drive-thru (e.g., objects such as vehicles, lane boundaries, order kiosks, building boundaries, and the like). The image data may be processed (e.g., using image processing tool 310) to determine individual objects (e.g., a vehicle), track objects (e.g., track a vehicle through a drive-thru route), recognize actions (e.g., detect movement of a vehicle within or across one or more drive-thru lanes). Processing logic may detect a first vehicle proximate (e.g., within the first lane boundaries) and determine the first vehicle is disposed within the first lane.

In some embodiments, the image data is used as input into a machine learning model. Processing logic may receive one or more outputs from the machine learning model. The one or more outputs from the machine learning model may include data indicative of a detected object (e.g., a vehicle, a lane boundary, etc.) and a level of confidence that the detected object is accurately classified (e.g., actually is disposed at an identified location of the drive-thru area).

At block 1210, processing logic determines the vehicle moved from the second lane to the first lane based on the image data, the first association, and the second association. For example, processing logic may determine a vehicle disposed within an original lane. From the image data, processing logic can determine that the vehicle moved from the original lane to a new lane. Processing logic can detect one or more intermediate actions that are indicative of the vehicle leaving the original lane and entering the new lane. For example, a drive-thru area may include a division of one lane into two lanes and a vehicle may be tracked as they enter one of the two new lanes. In another example, processing logic may determine a merging area of the drive-thru and may track a vehicle as it merging from an original lane into a new combined lane with another merging lane.

At block 1212, processing logic receives order data indicative of a pending meal order. As discussed in association with other embodiments, the order data may include a list of one or more meal components to prepare and/or one or more meal preparation procedures to perform to complete the pending meal order. In some embodiments, order data is received via a POS system (e.g., POS system 802). For example, a customer may place an order at an order placement location (e.g., using kiosks 836A-B) disposed within a drive-thru area. In another example, an order may be received remotely (e.g., from an endpoint device associated with a customer such as through a browser and/or application). Order data may include data associated with orders previously filled and/or currently needing to be filled. In some embodiments, processing logic is integrated with a kitchen display system (KDS). For example, the first order may be displayed on the KDS, responsive to receiving the data indicative of the first order.

At block 1214, processing logic determines an association between the pending meal order and the vehicle based on determining the vehicle is disposed within the first lane or the second lane. Actions associated with the new lane (e.g., ordering through a kiosk associated with the new lane, performing payment within the new lane, awaiting delivery of a meal within the new lane, etc.) may be tracked and associated with the vehicle based on determining the vehicle has moved into the new lane. For example, a meal delivery procedure, such as those suggested in association with block 1012 of FIG. 10, may be determined based on the processing device determining the vehicle is disposed in a particular lane.

In some embodiments, processing logic tracks the first order through one or more meal preparation procedures. Processing logic may continue to track the pending meal order through a meal preparation area by detecting relocation of one or more meal preparation items associated with the first order and detecting further meal preparation procedures (e.g., cooking the pizza, boxing the pizza, delivering the pizza, etc.).

In some embodiments, tracking of vehicles within the drive-thru area occurs frame by frame as the one or more vehicles relocates within the drive-thru area. Alternatively or additionally, meals may be tracked based on predicted locations a vehicle is expected to traverse. Processing logic may predict a time duration a vehicle may be occluded from a view of a camera. For example, as a car passing between two fields of view between two interactive points of the drive-thru (e.g., between the order placement order, order payment area, and/or order delivery area). Processing logic may predict a future location of a meal preparation item. For example, a customer associated with a vehicle may be disposed within a first lane. Processing logic may predict the vehicle will traverse within the lane and merge with a second lane to form a third lane. In a further example, processing logic may infer that the vehicle may be occluded from the view of a camera when traveling between the order placement area and a merging zone of the drive-thru area. Processing logic may infer the absence of object detections of the vehicle for a duration and may infer the presence of object detections of the first item at a second location (e.g., at the merging zone).

In some embodiments, processing logic may determine an order of vehicles after a merge. For example, multiple order may be employed after which the multiple lanes associated with the multiple order kiosks merge. Processing logic may determine which vehicle arrived at a payment window first and which associated order that vehicle is paying for.

In some embodiments, processing logic may filter the received image data based on the one or more associations between portions of the image data and one or more lanes. For example, processing logic may determine a boundary of a first lane associated with one or more image frames. Processing logic may perform image processing procedures (e.g., object detection, action detection, object tracking, etc.) only within the identified portion of the image data associated with an area of the drive-thru disposed within the bounds of the first lane. Processing logic may reduce processing time and load by performing image processing logic on portions of the image data only associated with areas of the drive-thru where cars are disposed. For example, in an image of a drive-thru area, one or more image frames captured by a camera may include one or more parked cars in a parking lot proximate the drive-thru area. The one or more parked cars may add unnecessary processing load by detecting and tracking vehicles that are not associated with the drive-thru area.

Figure 13:
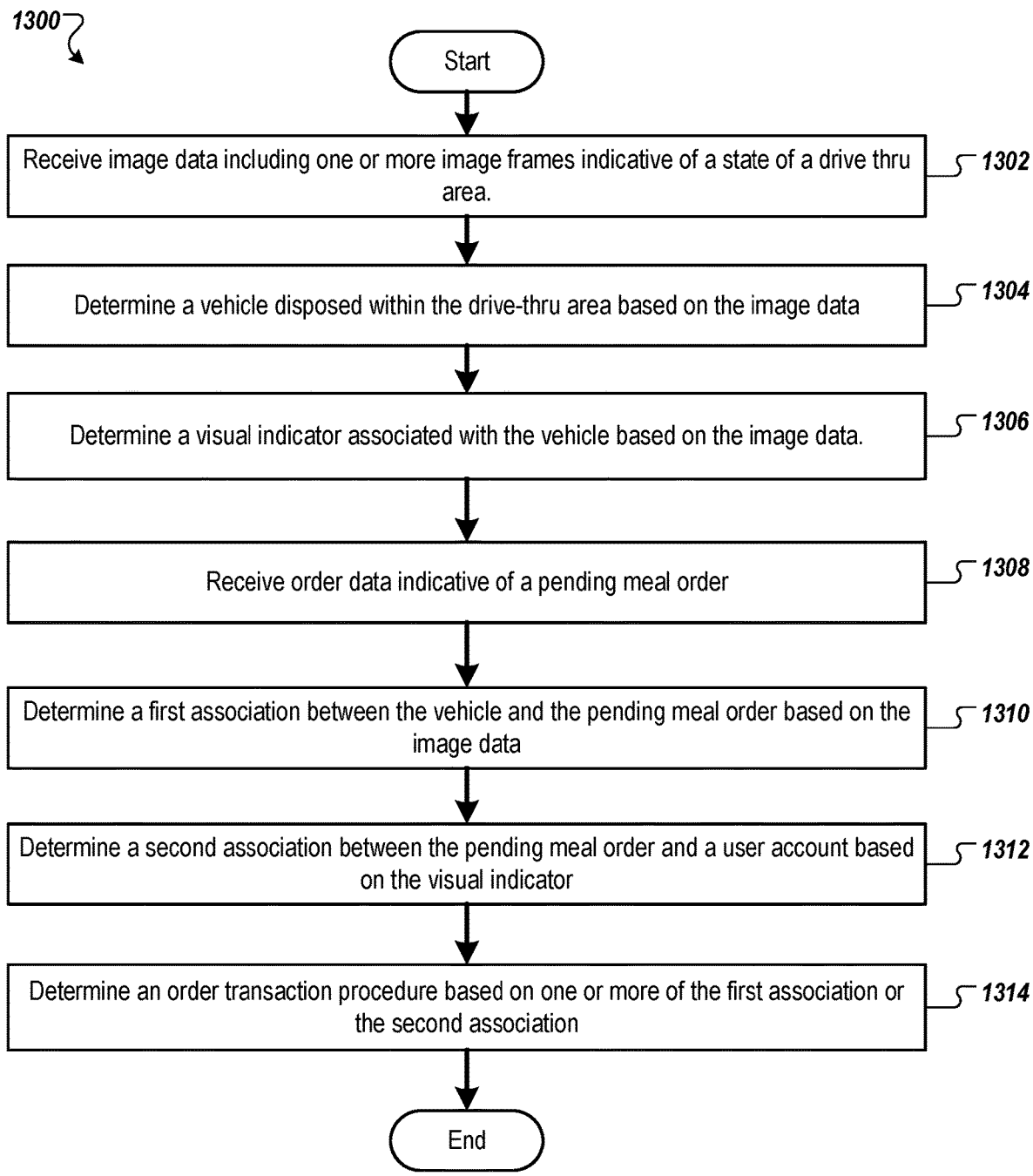
FIG. 13 depicts a flow diagram of one example method for determining an order transaction procedure based on a state of a drive-thru area, in accordance with some implementations of the present disclosure.

FIG. 13 depicts a flow diagram of one example method for determining an order transaction procedure based on a state of a drive-thru area, in accordance with some implementations of the present disclosure. Referring to FIG. 13, at block 1302, processing logic receives image data including one or more image frames indicative of a state of a drive-thru area. As described in association with other embodiments, the image data may include one or more image frames captured by one or more cameras disposed at or proximate a drive-thru area. For example, one or more cameras may be disposed at an elevated location and oriented to capture image frames of a drive-thru area (e.g., outside a boundary of a meal preparation area denoted by one or more lane markers to route vehicles through one or more order placement, payment processing, and/or meal delivery areas). The one or more image frames of the image data may be sequential image frames taken by the same camera with a similar field of view. In some embodiments, the image data may include one or more non-sequential image frames (e.g., images not temporally connected or otherwise temporally associated with other image frames). In some embodiments, the image data may include one or more image frames captured by different cameras with different points of view of a meal preparation area (e.g., simultaneously or at different times). For example, one camera may be positioned at an order placement area while another camera is positioned at a payment processing area.

At block 1304, processing logic determines a vehicle disposed within the drive-thru area based on the image data. As discussed in association with other embodiments, the image data may include various image frames of a state of the drive-thru area. In some embodiments, the image frame may include various objects disposed within a drive-thru (e.g., objects such as vehicles, lane boundaries, order kiosks, building boundaries, and the like). The image data may be processed (e.g., using image processing tool 310) to determine individual objects (e.g., a vehicle), track objects (e.g., track a vehicle through a drive-thru route), recognize actions (e.g., detect movement of a vehicle within or across one or more drive-thru lanes).

In some embodiments, the image data is used as input into a machine learning model. Processing logic may receive one or more outputs from the machine learning model. The one or more outputs from the machine learning model may include data indicative of a detected object (e.g., a vehicle, a lane boundary, etc.) and a level of confidence that the detected object is accurately classified (e.g., actually is disposed at an identified location of the drive-thru area).

At block 1306, processing logic determines a visual indicator associated with the vehicle based on the image data. As discussed in association with other embodiments, the visual indicator may include one or more features of the vehicle that identify the vehicle from other vehicles. For example, processing logic may determine a color of the vehicle, make and/or model of the vehicle, a license plate number of the vehicle, and/or one or more objects detected on, within, or otherwise proximate the vehicle.

At block 1308, processing logic receives order data indicative of a pending meal order. As discussed in association with other embodiments, the order data may include a list of one or more meal components to prepare and/or one or more meal preparation procedures to perform to complete the pending meal order. In some embodiments, order data is received via a POS system (e.g., POS system 802). For example, a customer may place an order at an order placement location (e.g., using kiosks 836A-B) disposed within a drive-thru area. In another example, an order may be received remotely (e.g., from an endpoint device associated with a customer such as through a browser and/or application). Order data may include data associated with orders previously filled and/or currently needing to be filled. In some embodiments, processing logic is integrated with a kitchen display system (KDS). For example, the first order may be displayed on the KDS, subsequent to receiving the data indicative of the first order.

At block 1310, processing logic determines a first association between the vehicle and the pending meal order. As discussed in association with other embodiments, processing logic may determine a location associated with the vehicle based on the image data. For example, one or more pixels of the one or more image frames may be associated with a specific location of the drive-through area. A vehicle may be depicted in a first portion of one or more image frames that is associated with a location proximate an order placement area of the drive-thru area. The association between the vehicle and the pending meal order may be based on a proximity of the vehicle to an order placement location when the order data is received (e.g., entered into the POS system). For example, a vehicle that is ordering is likely near the order placement area of the drive (e.g., a kiosk) and can be associated with an order that is entered while or shortly after the vehicle is determined to be located proximate the order placement area of the drive-thru area.

In some embodiments, as discussed previously, an order may be associated with a vehicle based on which lane the vehicle is determined to be located. For example, a drive-thru area may include multiple meal order areas (e.g., multiple order kiosks) and an order entered into the POS may be associated with a specific lane of the drive-thru. The received order may be associated with a kiosk disposed proximate a first lane. A vehicle may be determined to be located in the first lane and can further be associated with the received order.

At block 1312, processing logic determines a second association between the pending meal order and a user account based on the visual indicator. Processing logic may associate the visual indicator with a customer/subscriber account. For example, a color of the vehicle, make and/or model of the vehicle, a license plate number of the vehicle, and/or the vehicle identification number may correspond to a subscriber account.

At block 1314, processing logic determines an order transaction procedure based on one or more of the first association or the second association. Processing logic may send a request to an endpoint device associated with a customer/subscriber account. The request may include data indicative of the pending meal order and a payment authorization request to complete payment of the pending meal order. For example, a customer may receive the request through a browser and/or application associated with a client device. The browser and/or application may notify the customer and request authorization to fulfill payment of the pending meal order.

In some embodiments, a payment processing area may include a payment display board. For example, a customer within a vehicle may place an order at an order placement area. Processing logic may determine when the associated vehicle is proximate the payment processing area. Processing logic may cause data indicative of the pending meal order to be displayed on the payment display board. The payment display board may display an icon (e.g., a QR code) that is capable of being received by a customer endpoint device. The endpoint device may identify the icon and direct the customer through an order transaction procedure. For example, the icon may direct the customer to an associated browser location and/or application stored on the phone and may prompt the customer with instructions to pay for the pending meal order through the browser and/or application on the associated endpoint device. In some embodiments, the scanning of the icon by the endpoint device may cause automatic payment of the pending meal order associated with the vehicle.

In some embodiments, a customer may place and purchase an order outside of the drive-thru area. For example, a customer may place an order through a browser and/or application on an endpoint device in advance of entering the drive-thru area. Processing logic may receive data indicative of a vehicle associated with the order. Processing logic may determine the vehicle within the drive-thru and associate the vehicle with the pre-ordered and/or prepaid pending meal order.

Figure 14:
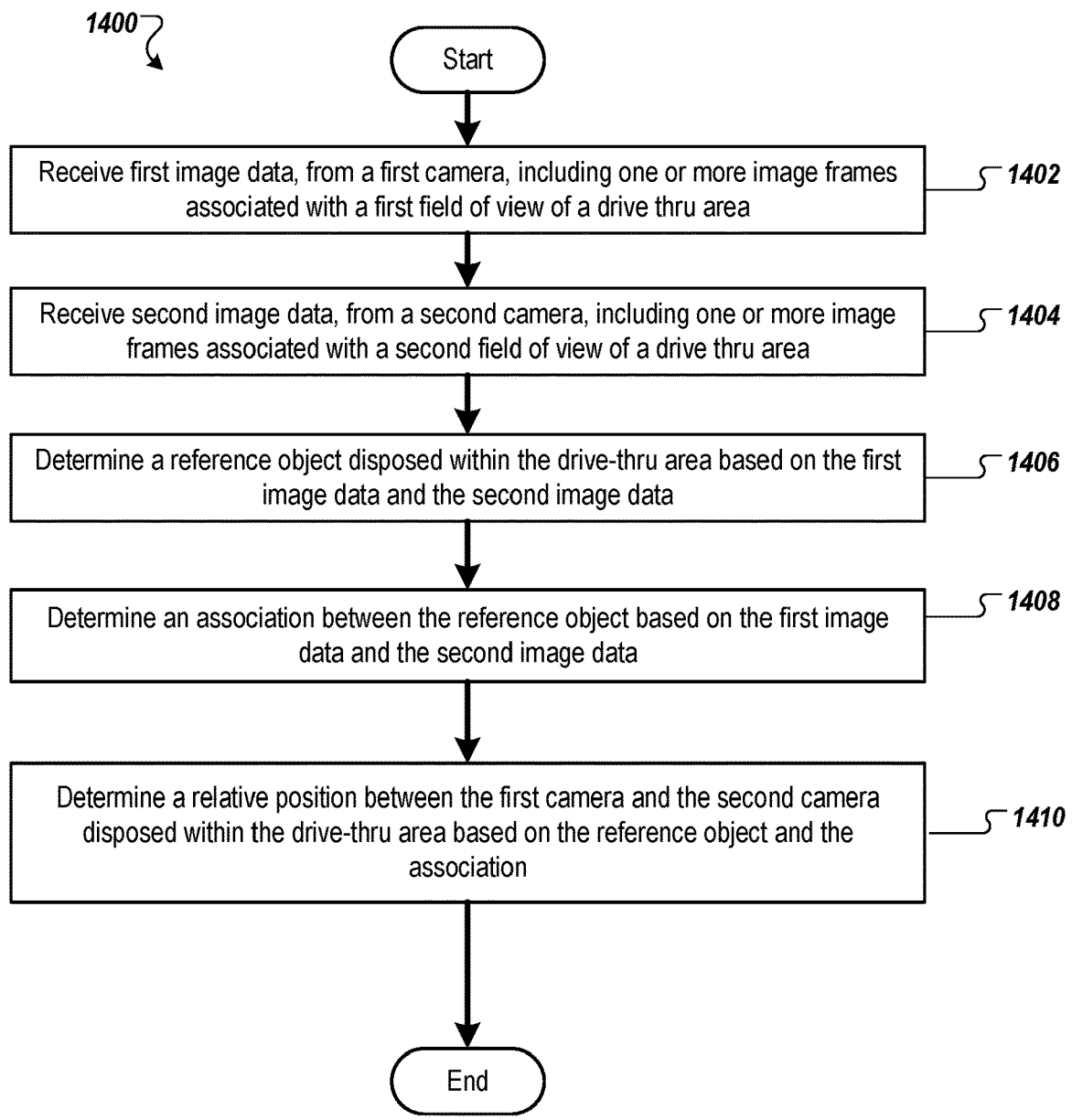
FIG. 14 depicts a flow diagram of one example method for determining relative positions between cameras disposed within a drive-thru area, in accordance with some implementations of the present disclosure.

FIG. 14 depicts a flow diagram of one example method for determining relative positions between cameras, in accordance with some implementations of the present disclosure. Referring to FIG. 14, at block 1402, processing logic receives first image data, from a first camera. The first image data is indicative of one or more image frames associated with a first field of view of a drive-thru area. At block 1404, processing logic receives second image data, from a second camera, including one or more image frames associated with a second field of view of a drive-thru area. As described in association with other embodiments, the image data (e.g., first image data and/or second image data) may include one or more image frames captured by one or more cameras disposed at or proximate a drive-thru area. For example, the first camera and the second camera may be disposed at an elevated location and oriented to capture image frames of a drive-thru area (e.g., outside a boundary of a meal preparation area denoted by one or more lane markers to route vehicles through one or more order placement, payment processing, and/or meal delivery areas). The one or more image frames of the image data may be sequential image frames taken by the same camera with a similar field of view. In some embodiments, the image data may include one or more non-sequential image frames (e.g., images not temporally connected or otherwise temporally associated with other image frames). In some embodiments, the image data may include one or more image frames captured by different cameras with different points of view of a meal preparation area (e.g., simultaneously or at different times). For example, the first camera may be positioned at an order placement area while the second camera may be positioned at a payment processing area.

At block 1406, processing logic determines a reference object disposed within the drive-thru area based on the first image data and the second data. The reference object may include an object captured by the first camera and the second camera in an overlapping field of views associated with both cameras. The reference object may be captured at a different angle based on the orientation of the first and the second camera. For example, the reference object may include a part of a vehicle such as a side-view mirror. The first camera may capture a first image frame including the side-view mirror taken from a first orientation while second camera may capture a second image frame including the side-view mirror taken from a second orientation.

In some embodiments, the reference object(s) (sometimes referred to as "key points") include common subsets of objects captured by the multiple cameras. For example, the reference object may include the top left hand side of a windshield or a location where a mirror comes in contact with a body of a vehicle. Each image may capture the reference object from a different angle and/or different distance away.

At block 1408, processing logic determines an association between the reference object based on the first image data and the second image data. Processing logic may determine relative fields of view of the first camera based on a first orientation of the reference object captured by the first camera and a second orientation of the reference object captured by the second camera. In some embodiments, the relative size of the reference object captured by the first camera and the second camera may be used to further associate the relative fields of view of the first camera and the second camera disposed within the drive-thru area.

At block 1410, processing logic determines a relative position between the first camera and the second camera disposed within the drive-thru area based on the reference object and the association. Processing logic may determine where the first camera is located relative to the second camera. In some embodiments, the relative locations may be associated with a mapping of the drive-thru area. For example, the processing logic may determine a first location of the first camera and a second location of the second camera within a drive-thru area (e.g., relative to a boundary of a structure associated with a meal preparation area corresponding to the drive-thru area). The relative location may also be referred to as the relative pose, or simply pose of each camera. The pose of each camera may include a disposed location of the drive-thru, an orientation of the field of view of each associated camera, and relative distance to key points of the drive-thru area (e.g., order placement area, order payment area, order delivery area, etc.)

In some embodiments, method 1400 may be used in conjunction with more than two cameras using one or more references objects each associated between two or more cameras of a drive-thru area. Processing logic may determine relative positions between multiple cameras. For example, processing logic may automatically configure a geometric relationship between different cameras and may reduce the amount of per-site or per-location processing to synchronize and/or configure a system of one or more cameras for a drive-thru management system.

In some embodiments, the relative positions of the cameras are encoded using method 1400. For example, one or more key points (e.g., order placement area, order payment area, meal delivery area, etc.) to determine association (e.g., automatically) between the different camera views to configures (e.g., automatically) geometric relationship between different cameras in the drive-thru (e.g., to reduce configuration load on a restaurant basis). The geometric relationship may be used by one or more models described herein to predict object detection, action determination, pace determination, object tracking, among other thing in area not overlapped by one or more view of the one or more cameras.

Figure 15:
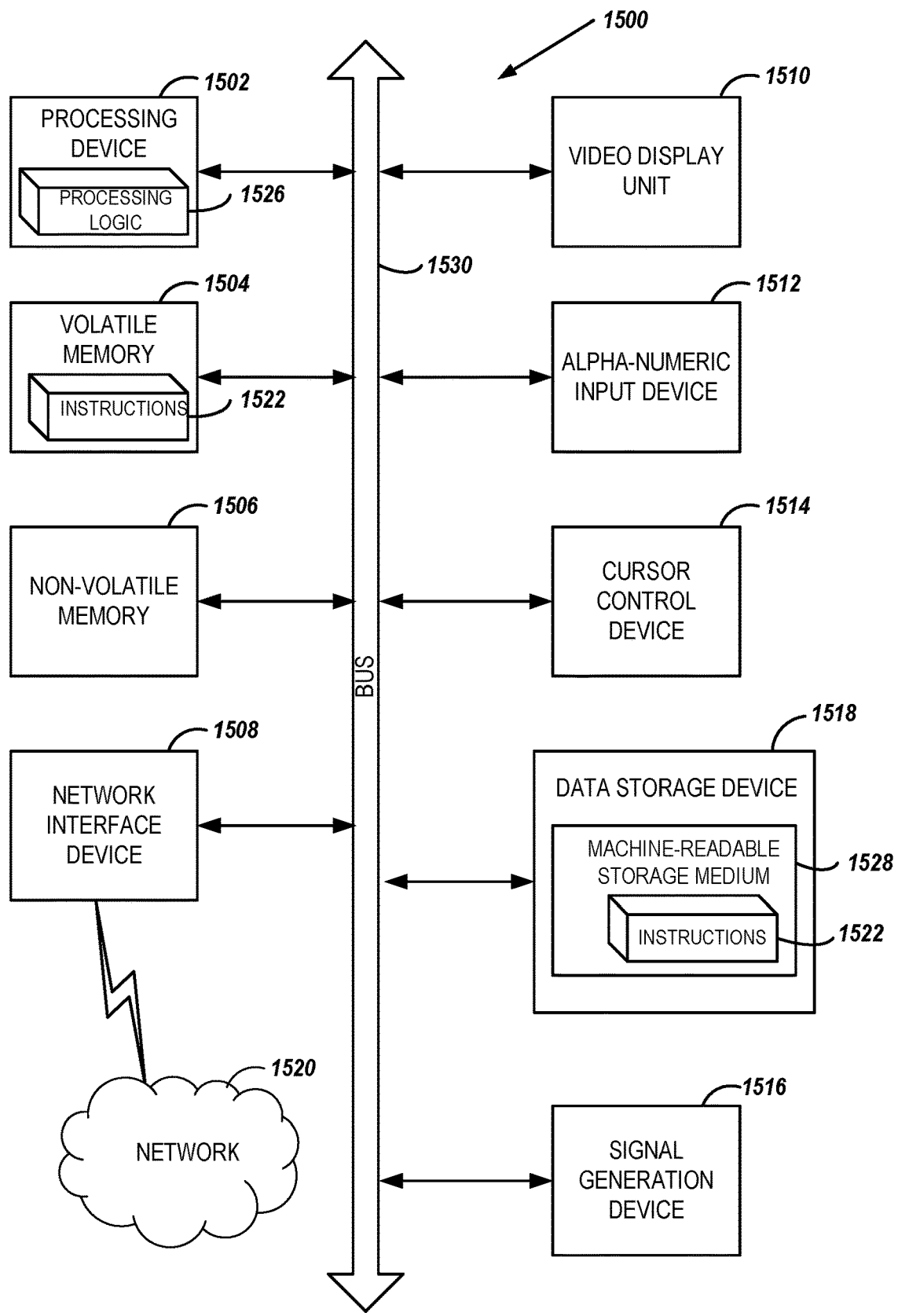
FIG. 15 depicts a block diagram of an example computing device, operating in accordance with one or more aspects of the present disclosure.

FIG. 15 depicts a block diagram of an example computing device 1500, operating in accordance with one or more aspects of the present disclosure. In various illustrative examples, various components of the computing device 1500 may represent various components of the POS 102, KDS 104 server 116, illustrated in FIG. 1 and machine learning system 210, data integration system 202, client device 207, data acquisition system 230, kitchen management system 220, illustrated in FIG. 2.

Example computing device 1500 may be connected to other computer devices in a LAN, an intranet, an extranet, and/or the Internet. Computing device 1500 may operate in the capacity of a server in a client-server network environment. Computing device 1500 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 1500 may include a processing device 1502 (also referred to as a processor or CPU), a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.), and a secondary memory (e.g., a data storage device 1518), which may communicate with each other via a bus 1530.

Processing device 1502 represents one or more general-purpose processing devices such as a microprocessor, central processing unit, or the like. More particularly, processing device 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1502 may be configured to execute instructions implementing methodology described in association with FIGS. 1-14.

Example computing device 1500 may further comprise a network interface device 1508, which may be communicatively coupled to a network 1520. Example computing device 1500 may further comprise a video display 1510 (e.g., a liquid crystal display (LCD), a touch screen, or a cathode ray tube (CRT)), an alphanumeric input device 1512 (e.g., a keyboard), a cursor control device 1514 (e.g., a mouse), and an acoustic signal generation device 1516 (e.g., a speaker).

Data storage device 1518 may include a machine-readable storage medium (or, more specifically, a non-transitory machine-readable storage medium) 1528 on which is stored one or more sets of executable instructions 1522. In accordance with one or more aspects of the present disclosure, executable instructions 1522 may comprise executable instructions associated with methodology associated with FIGS. 1-14.

Executable instructions 1522 may also reside, completely or at least partially, within main memory 1504 and/or within processing device 1502 during execution thereof by example computing device 1500, main memory 1504 and processing device 1502 also constituting computer-readable storage media. Executable instructions 1522 may further be transmitted or received over a network via network interface device 1508.

While the computer-readable storage medium 1528 is shown in FIG. 13 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a processing device, image data comprising one or more image frames indicative of a state of a drive-thru area;
determining, by the processing device, a vehicle disposed within the drive-thru area based on the image data;
receiving, by the processing device, order data indicative of a pending meal order;
determining, by the processing device, a first association between the vehicle and the pending meal order based on the image data;
receiving second image data comprising one or more image frames indicative of a state of a meal preparation area;
determining a meal preparation status of the pending meal order based on the second image data;
determining, by the processing device, from a plurality of meal delivery areas, a first meal delivery area associated with the vehicle based on the first association and the meal preparation status of the pending meal order; and
performing, by the processing device, at least one of a) causing performance of a meal delivery procedure using the first meal delivery area or b) communicating a notification associated with the first meal delivery area.

2. The method of claim 1, further comprising:
determining a predicted completion time of the pending meal order based on the second image data, wherein the meal preparation status of the pending meal order is further determined based on the predicted completion time.

3. The method of claim 2, further comprises:
determining an expected arrival time of the vehicle at the first meal delivery area based on the image data; and
directing the vehicle to a second meal delivery area of the plurality of meal delivery areas responsive to determining the predicted completion time is later than the expected arrival time, wherein the second meal delivery area corresponds to a waiting bay.

4. The method of claim 1, further comprising:
determining a second association between a first portion of the one or more image frames and a first lane of the drive-thru area; and
determining the vehicle is disposed within the first lane of the drive-thru area based on the image data and the second association, wherein the first association is determined responsive to determining the vehicle is disposed within the first lane.

5. The method of claim 4, further comprising:
determining a third association between a second portion of the one or more image frames and a second lane of the drive-thru area;
determining the vehicle is disposed within the second lane of the drive-thru area based on the image data and the second association; and
determining the vehicle moved from the second lane to the first lane based on the image data, the second association, and the third association.

6. The method of claim 5, wherein the first lane is a lane created by merging the second lane and a third lane within the drive-thru area.

7. The method of claim 1, wherein determining the vehicle disposed within the drive-thru area further comprises:
using the image data as input to a machine learning model; and
obtaining one or more outputs of the machine learning model, the one or more outputs indicative of the vehicle disposed within the drive-thru area.

8. A method, comprising:
receiving, by a processing device, image data comprising one or more image frames indicative of a state of a drive-thru area;
determining, by the processing device, a vehicle disposed within the drive-thru area based on the image data;
receiving, by the processing device, order data indicative of a pending meal order;
determining, by the processing device, a first association between the vehicle and the pending meal order based on the image data;

determining, by the processing device, from a plurality of meal delivery areas, a first meal delivery area associated with the vehicle based on the first association;
performing, by the processing device, at least one of a) causing performance of a meal delivery procedure using the first meal delivery area or b) communicating a notification associated with the first meal delivery area;
determining a visual vehicle identifier corresponding to the vehicle disposed within the drive-thru area based on the image data;
determining a menu display update based on the visual vehicle identifier; and
providing the menu display update for presentation on an order display device.

9. A method, comprising:
receiving, by a processing device, image data comprising one or more image frames indicative of a state of a drive-thru area;
determining, by the processing device, a vehicle disposed within the drive-thru area based on the image data;
receiving, by the processing device, order data indicative of a pending meal order;
determining, by the processing device, a first association between the vehicle and the pending meal order based on the image data;
determining, by the processing device, from a plurality of meal delivery areas, a first meal delivery area associated with the vehicle based on the first association;
performing, by the processing device, at least one of a) causing performance of a meal delivery procedure using the first meal delivery area or b) communicating a notification associated with the first meal delivery area;
determining a visual vehicle identifier corresponding to the vehicle disposed within the drive-thru area based on the image data;
determining a second association between the pending meal order and a user account based on the visual vehicle identifier; and
determining an order transaction procedure based on the second association.

10. A system comprising:
a first camera to capture first image data comprising one or more image frames of a first field of view of a drive-thru area, the one or more image frames indicative of a current state of the drive-thru area;
a memory; and
a processing device, coupled to the memory; to:
receive, from the first camera, the first image data;
determine a vehicle disposed within the drive-thru area based on the first image data;
receive, by the processing device, order data indicative of a pending meal order;
determine a first association between the vehicle and the pending meal order based on the first image data;
receive second image data from a second camera comprising one or more image frames indicative of a state of a meal preparation area;
determine a meal preparation status of the pending meal order based on the second image data;
determine, from a plurality of meal delivery areas, a first meal delivery area associated with the vehicle based on the first association and the meal preparation status of the pending meal order; and
perform at least one of a) causing performance of a meal delivery procedure using the first meal delivery area or b) communicating a notification associated with the first meal delivery area.

11. The system of claim 10, wherein the processing device is further to:
determine a predicted completion time of the pending meal order based on the second image data, wherein the meal preparation status of the pending meal order is further determined using the predicted completion time.

12. The system of claim 10, wherein the processing device is further to:
determine a second association between a first portion of the one or more image frames and a first lane of the drive-thru area; and
determine the vehicle is disposed within the first lane of the drive-thru area based on the first image data and the second association, wherein the first association is determined responsive to determining the vehicle is disposed within the first lane.

13. The system of claim 12, wherein the processing device is further to:
determine a third association between a second portion of the one or more image frames and a second lane of the drive-thru area;
determine the vehicle is disposed within the second lane of the drive-thru area based on the first image data and the second association; and
determine the vehicle moved from the second lane to the first lane based on the first image data, the second association, and the third association.

14. The system of claim 10, further comprising a second camera to capture second image data comprising one or more image frames of a second field of view of the drive-thru area, wherein the processing device is further to:
determine a reference object disposed within the drive-thru area based on the first image data and the second image data;
determine a second association between the reference object from the first image data and the reference object from the second image data; and
determine a relative position between the first camera and the second camera based on the second association.

15. A system comprising:
a first camera to capture first image data comprising one or more image frames of a first field of view of a drive-thru area, the one or more image frames indicative of a current state of the drive-thru area;
an order display device;
a memory; and
a processing device, coupled to the memory; to:
receive, from the first camera, the first image data;
determine a vehicle disposed within the drive-thru area based on the first image data;
receive, by the processing device, order data indicative of a pending meal order;
determine a first association between the vehicle and the pending meal order based on the first image data;
determine, from a plurality of meal delivery areas, a first meal delivery area associated with the vehicle based on the first association; and
perform at least one of a) causing performance of a meal delivery procedure using the first meal delivery area or b) communicating a notification associated with the first meal delivery area;
determine a visual vehicle identifier corresponding to the vehicle disposed within the drive-thru area based on the first image data;

determine a menu display update based on the visual vehicle identifier; and provide the menu display update for presentation on the order display device.

16. A system comprising:
a first camera to capture first image data comprising one or more image frames of a first field of view of a drive-thru area, the one or more image frames indicative of a current state of the drive-thru area;
a memory; and
a processing device, coupled to the memory; to:
receive, from the first camera, the first image data;
determine a vehicle disposed within the drive-thru area based on the first image data;
receive, by the processing device, order data indicative of a pending meal order;
determine a first association between the vehicle and the pending meal order based on the first image data;
determine, from a plurality of meal delivery areas, a first meal delivery area associated with the vehicle based on the first association; and
perform at least one of a) causing performance of a meal delivery procedure using the first meal delivery area or b) communicating a notification associated with the first meal delivery area;
determine a visual vehicle identifier corresponding to the vehicle disposed within the drive-thru area based on the first image data;
determine a second association between the pending meal order and a user account based on the visual vehicle identifier; and
determine an order transaction procedure based on the second association.

17. A non-transitory machine-readable storage medium comprising instructions that, when executed by a processing device, cause the processing device to perform operations comprising:
receiving image data comprising one or more image frames indicative of a state of a drive-thru area;
determining a vehicle disposed within the drive-thru area based on the image data;
receiving order data indicative of a pending meal order;
determining a first association between the vehicle and the pending meal order based on the image data;
receiving second image data comprising one or more image frames indicative of a state of a meal preparation area;
determining a meal preparation status of the pending meal order based on the second image data;
determining, from a plurality of meal delivery areas, a first meal delivery area associated with the vehicle based on the first association and the meal preparation status of the pending meal order; and
performing at least one of a) causing performance of a meal delivery procedure using the first meal delivery area or b) communicating a notification associated with the first meal delivery area.

18. A non-transitory machine-readable storage medium comprising instructions that, when executed by a processing device, cause the processing device to perform operations comprising:
receiving image data comprising one or more image frames indicative of a state of a drive-thru area;
determining a vehicle disposed within the drive-thru area based on the image data;
receiving order data indicative of a pending meal order;
determining a first association between the vehicle and the pending meal order based on the image data;
determining, from a plurality of meal delivery areas, a first meal delivery area associated with the vehicle based on the first association;
performing at least one of a) causing performance of a meal delivery procedure using the first meal delivery area or b) communicating a notification associated with the first meal delivery area;
determining a visual vehicle identifier corresponding to the vehicle disposed within the drive-thru area a based on the image data;
determining a menu display update based on the visual vehicle identifier; and
providing the menu display update for presentation on an order display device.

19. A non-transitory machine-readable storage medium comprising instructions that, when executed by a processing device, cause the processing device to perform operations comprising:
receiving image data comprising one or more image frames indicative of a state of a drive-thru area;
determining a vehicle disposed within the drive-thru area based on the image data;
receiving order data indicative of a pending meal order;
determining a first association between the vehicle and the pending meal order based on the image data;
determining, from a plurality of meal delivery areas, a first meal delivery area associated with the vehicle based on the first association;
performing at least one of a) causing performance of a meal delivery procedure using the first meal delivery area or b) communicating a notification associated with the first meal delivery area;
determining a visual vehicle identifier corresponding to the vehicle disposed within the drive-thru area a based on the image data;
determining a second association between the pending meal order and a user account based on the visual vehicle identifier; and
determining an order transaction procedure based on the second association.

\* \* \* \* \*